(12) United States Patent
Sheldon-Coulson et al.

(10) Patent No.: US 12,492,673 B2
(45) Date of Patent: Dec. 9, 2025

(54) RECIRCULATING INERTIAL HYDRODYNAMIC PUMP AND WAVE ENGINE

(71) Applicant: Lone Gull Holdings, Ltd., Portland, OR (US)

(72) Inventors: Garth Alexander Sheldon-Coulson, Portland, OR (US); Brian Lee Moffat, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 19/253,607

(22) Filed: Jun. 27, 2025

(65) Prior Publication Data
US 2025/0327434 A1   Oct. 23, 2025

Related U.S. Application Data

(63) Continuation of application No. 18/946,827, filed on Nov. 13, 2024, now Pat. No. 12,366,223, which is a
(Continued)

(51) Int. Cl.
| | |
|---|---|
| *F03B 13/14* | (2006.01) |
| *F03B 13/22* | (2006.01) |
| *F04F 7/00* | (2006.01) |

(52) U.S. Cl.
CPC ............ *F03B 13/142* (2013.01); *F03B 13/22* (2013.01); *F04F 7/00* (2013.01); *F05B 2220/61* (2013.01)

(58) Field of Classification Search
CPC ....... F03B 13/14; F03B 13/22; F05B 2240/93
See application file for complete search history.

(56) References Cited

U.S. PATENT DOCUMENTS

| | | | | |
|---|---|---|---|---|
| 1,220,411 | A | * | 3/1917 | Garner et al. .......... C01B 7/012 423/487 |
| 3,200,255 | A | * | 8/1965 | Masuda ............... H02K 7/1853 290/53 |

(Continued)

FOREIGN PATENT DOCUMENTS

WO    2012125111 A1    9/2012

OTHER PUBLICATIONS

Office Action for U.S. Appl. No. 18/946,827, dated Dec. 16, 2024, pp. 18.
(Continued)

*Primary Examiner* — Thomas E Lazo
(74) *Attorney, Agent, or Firm* — Schwabe, Williamson & Wyatt, P.C.

(57) ABSTRACT

Embodiments include a buoyant wave energy converter. In an embodiment, the wave energy converter comprises an upper chamber having a first fluid reservoir and a first gas pocket, and a lower chamber having a second fluid reservoir and a second gas pocket. In an embodiment, an injection tube is between and fluidly coupled to the upper chamber and the lower chamber, where the injection tube is to impel a fluid from the second fluid reservoir into the first fluid reservoir when the upper chamber, the lower chamber and the injection tube oscillate about a waterline with the upper chamber adjacent to the waterline and the lower chamber submerged below the waterline and vertically beneath the upper chamber. An effluent tube is fluidly coupled to the upper chamber and the lower chamber, where the effluent tube is to return the fluid from the first fluid reservoir to the injection tube.

30 Claims, 32 Drawing Sheets

Related U.S. Application Data continuation of application No. 18/597,749, filed on Mar. 6, 2024, now Pat. No. 12,173,682.

(60) Provisional application No. 63/452,676, filed on Mar. 16, 2023.

(56) References Cited

U.S. PATENT DOCUMENTS

| | | | | |
|---|---|---|---|---|
| 4,009,396 | A * | 2/1977 | Mattera | F03B 13/20 290/53 |
| 4,139,984 | A * | 2/1979 | Moody | F03B 13/142 417/100 |
| 4,193,265 | A * | 3/1980 | Ootsu | F03B 13/24 417/334 |
| 6,647,716 | B2 * | 11/2003 | Boyd | F03B 13/1815 60/413 |
| 9,234,495 | B2 * | 1/2016 | Anteau | F03B 17/025 |
| 9,464,620 | B2 * | 10/2016 | Rainey | F03B 13/148 |
| 10,605,226 | B2 * | 3/2020 | Sheldon-Coulson | B63B 35/44 |
| 11,118,559 | B2 * | 9/2021 | Sheldon-Coulson | B63B 35/44 |
| 11,384,727 | B2 * | 7/2022 | Sheldon-Coulson | F03B 17/06 |
| 11,635,057 | B2 * | 4/2023 | Sheldon-Coulson | F03B 13/142 60/497 |
| 11,680,554 | B2 * | 6/2023 | Sheldon-Coulson | F03B 13/142 60/497 |
| 11,891,975 | B2 * | 2/2024 | Sheldon-Coulson | H02K 7/1823 |
| 12,173,681 | B2 * | 12/2024 | Sheldon-Coulson | F03B 13/20 |
| 12,173,682 | B2 * | 12/2024 | Sheldon-Coulson | F04F 7/00 |
| 12,366,223 | B2 * | 7/2025 | Sheldon-Coulson | F03B 13/142 |
| 2002/0157398 | A1 | 10/2002 | Boyd | |
| 2004/0131479 | A1 | 7/2004 | Welch, Jr. et al. | |
| 2015/0192102 | A1 | 7/2015 | Rainey | |
| 2015/0266549 | A1 * | 9/2015 | Qu | F03B 13/189 248/550 |
| 2018/0073482 | A1 | 3/2018 | Sheldon-Coulson et al. | |
| 2019/0353139 | A1 * | 11/2019 | Sheldon-Coulson | F03B 13/142 |
| 2020/0056578 | A1 * | 2/2020 | Sheldon-Coulson | H02K 44/085 |
| 2020/0400113 | A1 * | 12/2020 | Kling | F03B 17/062 |
| 2021/0354791 | A1 * | 11/2021 | Sheldon-Coulson | B67D 7/04 |
| 2022/0047993 | A1 * | 2/2022 | Mundon | F04B 17/00 |
| 2022/0235732 | A1 | 7/2022 | Barrett et al. | |

OTHER PUBLICATIONS

Non-Final Office Action from U.S. Appl. No. 18/412,198 dated Apr. 24, 2024, 14 pgs.
International Search Report and Written Opinion from PCT/US2024/011501 dated Apr. 24, 2024, 25 pgs.
International Search Report and Written Opinion from PCT/US2024/018922 dated Aug. 2, 2024, 19 pgs.
International Search Report and Written Opinion from PCT/US2025/010496 dated Feb. 27, 2025, 9 pgs.
Non-Final Office Action from U.S. Appl. No. 18/945,404 dated Feb. 25, 2025, 17 pgs.
International Preliminary Report on Patentability from PCT Application No. PCT/US2024/011501 dated Jul. 31, 2025, 13 pgs.
International Preliminary Report on Patentability from PCT Application No. PCT/US2024/018922 dated Sep. 25, 2025, 10 pgs.

* cited by examiner

RECIRCULATING INERTIAL HYDRODYNAMIC PUMP AND WAVE ENGINE

CROSS-REFERENCE TO RELATED APPLICATIONS

This application is a continuation of U.S. patent application Ser. No. 18/946,827, filed Nov. 13, 2024, which is a continuation of U.S. patent application Ser. No. 18/597,749, filed Mar. 6, 2024, now U.S. Pat. No. 12,173,682, issued Dec. 24, 2024, which claims benefit of U.S. Provisional Application No. 63/452,676, filed on Mar. 16, 2023, the entire contents of which are hereby incorporated by reference herein.

BACKGROUND

Waves traveling across the surface of the sea tend to move relatively slowly. Likewise, their oscillations tend to have relatively long periods, e.g., on the order of ten to twenty seconds. However, despite their relatively slow movement, waves tend to possess and/or manifest substantial amounts of energy. For these reasons, it is both desirable and difficult to extract energy from ocean waves. Embodiments of the current disclosure efficiently extract energy from ocean waves with a robust and relatively inexpensive design possessing few moving parts.

SUMMARY OF THE DISCLOSURE

Disclosed herein are embodiments of a type of wave energy converter that incorporates upper and lower air pockets enclosed within respective upper and lower chambers. These upper and lower gas pockets are typically both pressurized above atmospheric pressure and function as springs. Also enclosed within the upper and lower chambers are, respectively, upper and lower liquid reservoirs. At least one "inertial tube" connects these chambers. The inertial tube tends to be at least partially filled with liquid that is fluidly continuous with liquid in lower chamber reservoir. The liquid in the inertial tube tends to be "suspended," or elevated, by the elevated pressure of the lower air pocket (relative to the pressure of the upper air pocket). Wave-induced vertical oscillations of the embodiment cause the liquid mass thus suspended in the inertial tube to oscillate. As this mass, i.e., the liquid within the inertial tube, oscillates, it captures and stores energy (as kinetic and gravitational potential energy) and parts of that liquid mass can be ejected from the upper mouth of the inertial tube. During this process, liquid tends to be drawn up and into the inertial tube from the lower liquid reservoir via the lower inertial tube mouth to replace liquid ejected from the upper inertial tube mouth.

Embodiments of wave energy converters disclosed herein capture energy from incident waves, and the captured energy lifts fluid from a lower reservoir to an upper reservoir where its elevated head pressure (relative to at least one reference reservoir within the embodiment) causes that fluid to flow through, and energize, a turbine.

In preferred embodiments, the liquid lifted by the inertial tube, and discharged from its fluid turbine as effluent, never leaves an interior of the embodiment. Thus, specialized fluids may be utilized within embodiments. For example, embodiments may utilize an alkaline solution, seawater, or fresh water, and embodiments may use a portion of the electrical power produced by their respective generators to perform electrolysis on the same liquid that is lifted and caused to flow through those embodiments' turbines.

Embodiments of the present disclosure dramatically reduce, if not eliminate, the risk of biofouling and corrosion on the inner surfaces, structures, mechanisms, and/or other components thereof.

All potential variations in sizes, shapes, thicknesses, materials, orientations, and/or other embodiment-specific variations of the general inventive designs, structures, systems, and/or methods disclosed herein are included within the scope of the present disclosure, and will be obvious to those skilled in the art.

Scope of the Disclosure

The embodiments illustrated and discussed in relation to the figures included herein are provided for the purpose of explaining some of the basic principles of the disclosure. However, the scope of this disclosure covers all embodiments, even those differing from the idealized and/or illustrative examples presented. This disclosure covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

Any "generator" mentioned, discussed, and/or specified, in this disclosure includes, but is not limited to, any device, machine, module, and/or system, that generates electrical power, pressurized hydraulic fluid, compressed air, and/or performs some other useful work or produces some other useful product by harnessing the mechanical energy of a rotating shaft. Any "generator" mentioned, discussed, and/or specified, in this disclosure may be a generator, and alternator, or any other mechanism, device, and/or component, that converts energy from one form to another, including, but not limited to, any mechanism, device, and/or component, that converts the rotary motion of a turbine's shaft into electrical power. Also included within the scope of this disclosure, are magnetohydrodynamic generators, which generate electricity directly from a flow of liquid without the need for connection with a turbine and associated rotating shaft. It is to be understood that a combination of a turbine and a shaftably connected generator can be replaced, in appropriate circumstances and with an appropriate choice of working fluid, with a magnetohydrodynamic generator.

The scope of this disclosure includes embodiments possessing, incorporating, including, and/or utilizing, any number of inertial tubes, and inertial tubes of any and all shapes, sizes, diameters, drafts, tapers, cross-sectional areas, and possessing and/or incorporating any number of constrictions, and constrictions of any and all absolute and/or relative cross-sectional areas, shapes, profiles, and relative positions, within and/or along the length of an inertial tube. The scope of this disclosure includes embodiments possessing, incorporating, including, and/or utilizing, inertial tubes made of any and all materials. The scope of this disclosure includes inertial tubes that are entirely cylindrical and incorporate no constrictions or bends. The scope of this disclosure includes inertial tubes that are non-cylindrical and include curvature and/or constrictions along their lengths.

The scope of this disclosure includes embodiments possessing, incorporating, including, and/or utilizing, fluid and/or hydrokinetic turbines of any and all types, any and all diameters, any and all efficiencies, any and all power ratings, and made of any and all materials.

The scope of this disclosure includes embodiments possessing, incorporating, including, and/or utilizing, multiple fluid turbines in series, e.g., multiple turbines extracting energy from a same flow of fluid and/or within a same effluent tube.

The scope of this disclosure includes embodiments possessing, incorporating, including, and/or utilizing, any number of fluid chambers, and fluid chambers of any design, size, shape, volume, relative and/or absolute position within an embodiment. The scope of this disclosure includes embodiments possessing, incorporating, including, and/or utilizing, fluid chambers made of any and all materials.

The scope of this disclosure includes generators, alternators, etc., in which the amount, degree, and/or magnitude, of the resistive torque imparted by to the fluid turbines operably connected to those generators, alternators, etc., may be actively controlled so as to optimize the extraction of energy from the fluid flowing through the respective turbines.

The scope of this disclosure includes the use of adjustable guide vanes, dampers, and/or other flow-control surfaces, and/or other obstructions to flow, that may be used to adjust the rate at which fluid flows through the respective fluid turbines, especially so as to optimize the extraction of energy from the fluid flowing through the turbines and their respective inertial fluid tubes. A portion of many embodiments of the present disclosure include, incorporate, and/or utilize, at least one buoyant portion. These buoyant portions may be referred to as hollow flotation modules, buoys, buoyant capsules, buoyant chambers, buoyant compartments, buoyant enclosures, buoyant vessels, hollow balls, and/or hollow spheroids. Many terms, names, descriptors, and/or labels, could adequately distinguish an embodiment's buoyant portion from among its other components, features, and/or elements, and the scope of the present disclosure incorporates any naming convention and/or choice, and is not limited by the nomenclature used to describe an embodiment or its parts.

DETAILED DESCRIPTIONS OF THE DRAWINGS

For a fuller understanding of the nature and objects of the disclosure, reference should be made to the preceding detailed description, taken in connection with the accompanying drawings. The following figures, and the illustrations offered therein, in no way constitute limitations, either explicit or implicit, on the scope of the current disclosure. Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

Figure 1:
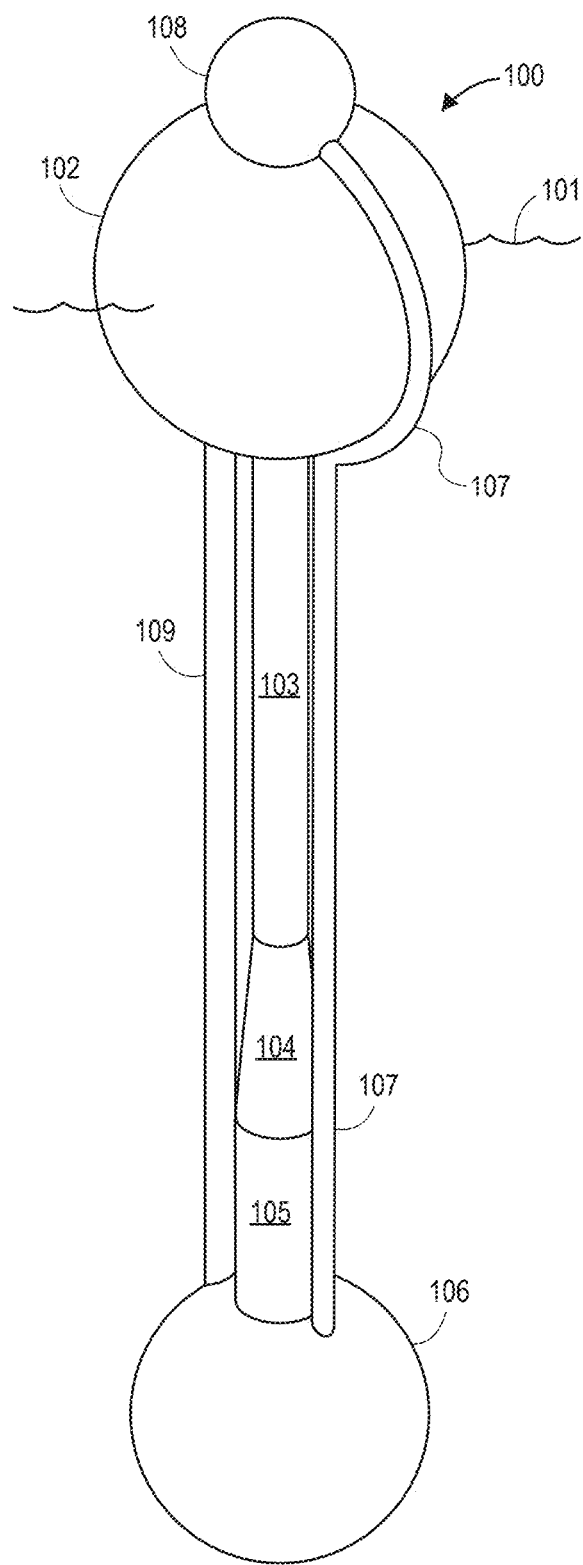
FIG. 1 is a side perspective view of a first embodiment of the current disclosure.

FIG. 1 shows a side perspective view of an embodiment 100 of the current disclosure. The embodiment floats adjacent to an upper surface 101 of a body of water over which waves pass.

The embodiment comprises an upper hollow chamber 102, a constricted tube 103-105, and a lower hollow chamber 106. In the illustration of FIG. 1, the upper hollow chamber 102 and the lower hollow chamber 106 are spherical, spheroidal, or spherical segments. However, in other instances one or both of the upper hollow chamber 102 and/or the lower hollow chamber 106 may comprise different geometries, such as cuboidal, pyramidal, conical, frustoconical, or any other three-dimensional chamber. Constricted tube 103-105, which is variety of inertial tube, is adapted to permit oscillations of a column of water within it and to move water (on net) from the lower hollow chamber 106 to the upper hollow chamber 102. The constricted tube is comprised of a relatively small diameter upper tube portion 103, a frustoconical constriction portion 104, and a relatively large diameter lower tube portion 105. Though, in some similar embodiments, tube 103-105 may have a substantially constant diameter through an entire length.

In some embodiments, the embodiment 100 may include an upper hollow chamber 102 and a lower hollow chamber 106 with diameters that are approximately 20 meters or smaller, approximately, 10 meters or smaller, or approximately 1 meter or smaller. Though, larger diameters may also be used. A length of the constricted tube 103-105 may be approximately 100 meters or less, approximately 50 meters or less, approximately 20 meters or less, or approximately 1 meter or less. Though, larger lengths may also be used in some embodiments. More generally, a length of the constricted tube 103-105 may be related to a diameter of the one or both of the hollow chamber 102 or 106 by a ratio of (tube length:chamber diameter) that is 3:1 or greater, 5:1 or greater, or 10:1 or greater. Though, smaller ratios may also be used in some embodiments.

A pressurized gas pocket (not visible) within the lower hollow chamber 106 is fluidly connected, by an effluent gas pocket pipe 107, to an extended lower effluent gas pocket (not visible) within an interior of a hollow extended lower effluent gas chamber 108.

An upper effluent fluid reservoir (not visible) within an interior of the upper hollow chamber 102 is fluidly connected to a lower effluent fluid reservoir (not visible) within the lower hollow chamber 106 by a liquid effluent pipe 109.

The embodiment 100 illustrated in FIG. 1 utilizes a working fluid comprised of hypersaline water. Other similar embodiments utilize working fluids comprised of water and/or aqueous solutions, of various concentrations, of other solutes, including, but not limited to, solutions of: potassium carbonate, sodium chloride, and sodium hydroxide.

More generally, the embodiment 100 may use a working fluid is capable of being one of many different materials in cases when the embodiment is sealed from the body of water. That is, the working fluid within the liquid effluent pipe 109, and discharged from its fluid turbine (not shown) as effluent, never leaves an interior of the embodiment 100. Thus, specialized fluids may be utilized within embodiments. Accordingly, embodiment 100 reduces, if not eliminates, the risk of biofouling and corrosion on the inner surfaces, structures, mechanisms, and/or other components thereof.

In a particular embodiment, the working fluid may comprise a solution, a suspension, a colloid, an emulsion, or the like. In cases where particles may tend to separate (e.g., precipitate, settle, etc.) out of the working fluid, the motion of the working fluid due to wave oscillation may be sufficient to prevent or mitigate precipitation and/or settling. However, some embodiments may be chosen due to a resistance to settling and/or precipitation.

One such working fluid is an iron ore suspension. An iron ore suspension may comprise water (e.g., fresh water, salt water, deionized water, etc.) or an aqueous solution (e.g., with solutes such as one or more of potassium carbonate, sodium chloride, and sodium hydroxide) that is combined with iron ore particles. The iron ore particles may comprise any suitable iron ore, such as, for example, hematite ($Fe_2O_3$) or magnetite ($Fe_3O_4$). The iron ore particles may be any suitable size. For example, average particle diameters of 30 µm or less have been shown to provide excellent performance with respect to staying in the suspension without settling out. Iron ore particles for the working fluid may also include average particle diameters between 50 nm and 1,000 nm. Though, iron ore particles with a diameter smaller than 50 nm may be used, and/or iron ore particles with a diameter larger than 30 µm may be used. The concentration of iron ore particles within the suspension may be up to a solubility maximum of the solution. While iron ore suspensions have been shown to be beneficial for several purposes, it is to be appreciated that other metal oxide particles may be held in a solution to generate a suitable working fluid in different embodiments.

The use of an iron ore suspension may be particularly beneficial in the construction of the embodiment 100 since the iron ore significantly increases a density of the working fluid. A denser working fluid increases the mass of the working fluid compared to when the working fluid is water only. Oscillating an increased mass with the embodiment provides more kinetic energy (while keeping other dimensions consistent). In the alternative, an equal amount of energy (compared to a water based system) can be generated with an embodiment with smaller dimensions. That is, the embodiment 100 may be fabricated with less material and/or transport of the embodiment 100 may be easier, among other benefits.

Figure 2:
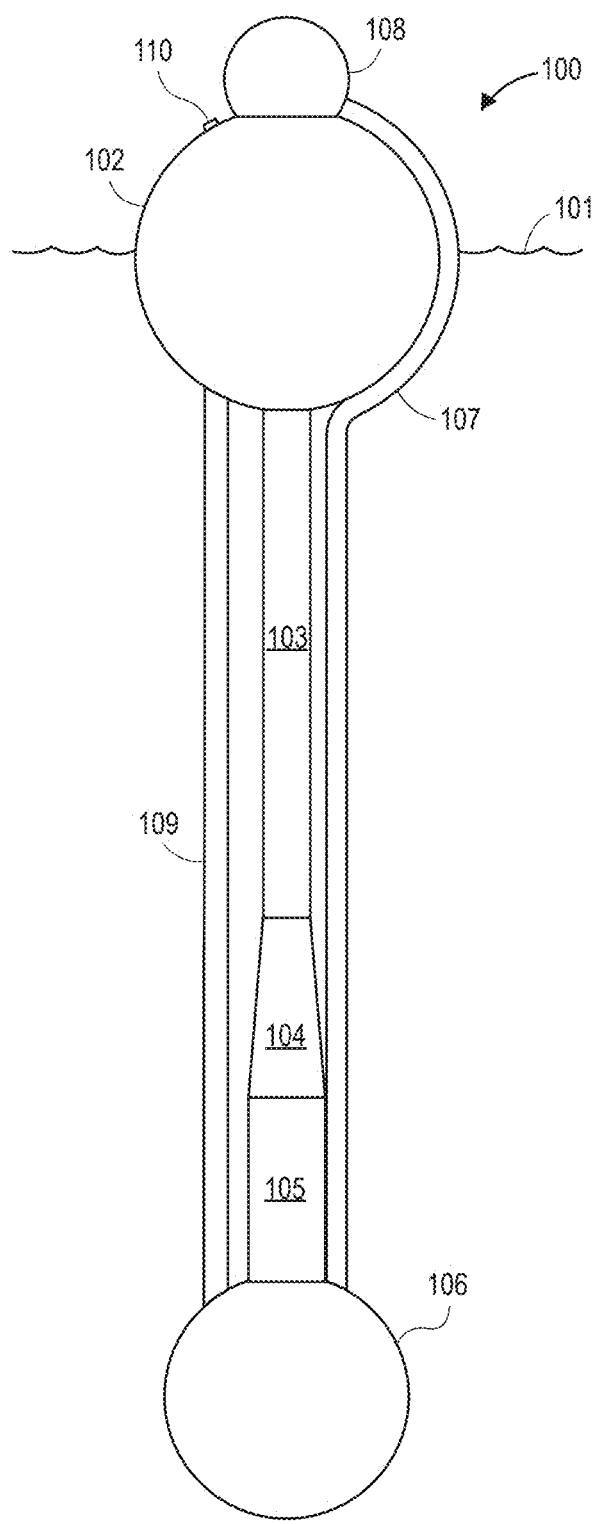
FIG. 2 is a side view of the first embodiment of the current disclosure that is illustrated in FIG. 1.

FIG. 2 shows a side view of the same embodiment 100 of the current disclosure that is illustrated in FIG. 1.

An atmospheric equilibration aperture 110 fluidly connects the upper effluent gas pocket (not visible) within an interior of the upper hollow chamber 102 to the atmosphere.

As used herein, "fluidly connects" may be used interchangeably with "fluidically couples", "fluidly couples", or derivatives thereof. More generally "fluidly connected", "fluidly coupled", "fluidically connected", or "fluidically coupled" may refer to two components that are configured to allow for the transfer of one or more fluids (e.g., gas and/or liquid) between the two components. For example, a first chamber may be fluidly coupled to a second chamber, when a gas from the first chamber is capable of flowing (either actively (e.g., through pumping) or passively (e.g., through pressure differentials)) from the first chamber to the second chamber and/or from the second chamber to the first chamber. Fluidly coupled components may be directly connected to each other. That is, there may not be any intervening components between the first component and the second component. In other instances, one or more additional intervening components (e.g., pipes, valves, chambers, reactors, etc.) may be provided between the first component and the second component so long as the one or more fluids are capable of being transferred between the first chamber and the second chamber along a path that includes the one or more intervening components. Additionally, while "components" may be fluidly coupled with each other, the concept of fluidly coupling is not limited to structures such as chambers, containers, and the like. That is, a first volume of a liquid or gas may be fluidly coupled to a second volume of a liquid or gas even if one or both of the first volume and the second volume are not confined by any specific structure. For example, a volume of fluid within a chamber may be fluidly coupled to a generally unconfined volume (e.g., a body of water or the atmosphere) surrounding the chamber through a pipe, tube, port, opening or other passage through a surface of the chamber.

Figure 3:
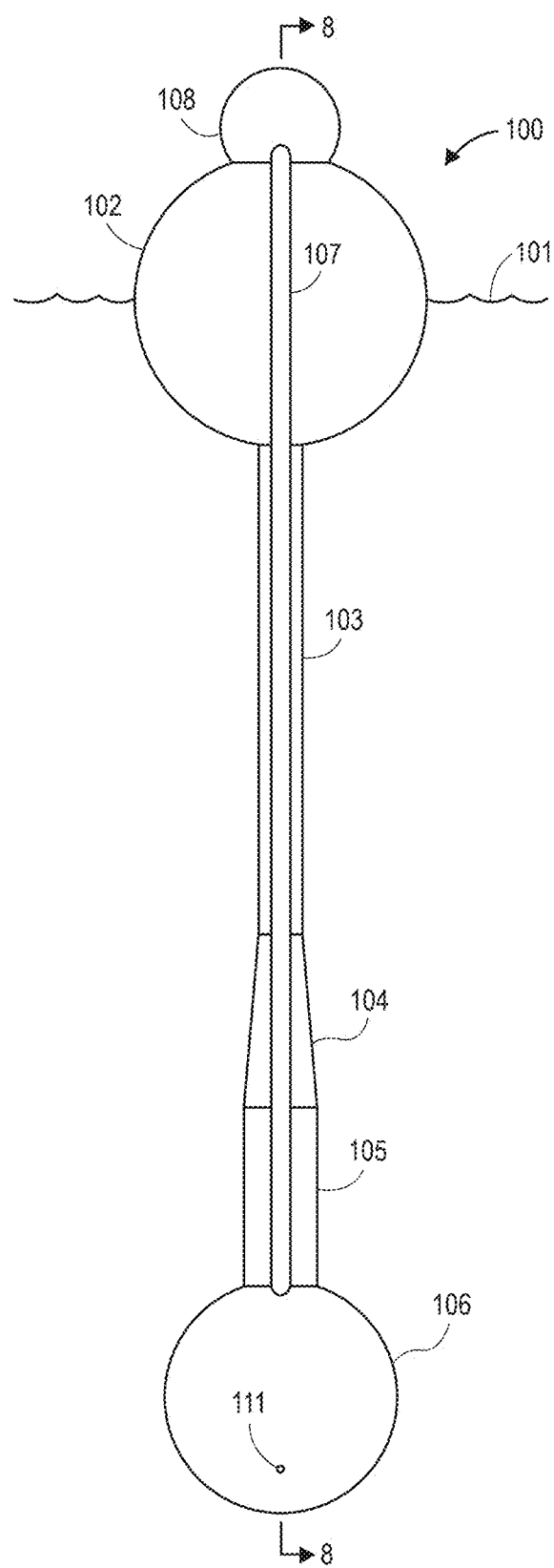
FIG. 3 is a side view of the first embodiment of the current disclosure that is illustrated in FIGS. 1 and 2.

FIG. 3 shows a side view of the same embodiment 100 of the current disclosure that is illustrated in FIGS. 1 and 2.

When opened, a water refresh valve (not visible) within a water refresh pipe 111 within the lower hollow chamber 106 fluidly connects the lower effluent fluid reservoir (not visible), within an interior of the lower hollow chamber, to a forward osmosis membrane (not shown), which, in turn, is fluidly connected to the body of water 101 on which the embodiment floats. The forward osmosis membrane allows relatively fresh water to flow from the body of water into the lower effluent fluid reservoir, under osmotic pressure, thereby refreshing, and/or restoring, the volume, mass, and/or quantity, of water within that lower effluent fluid reservoir.

Figure 4:
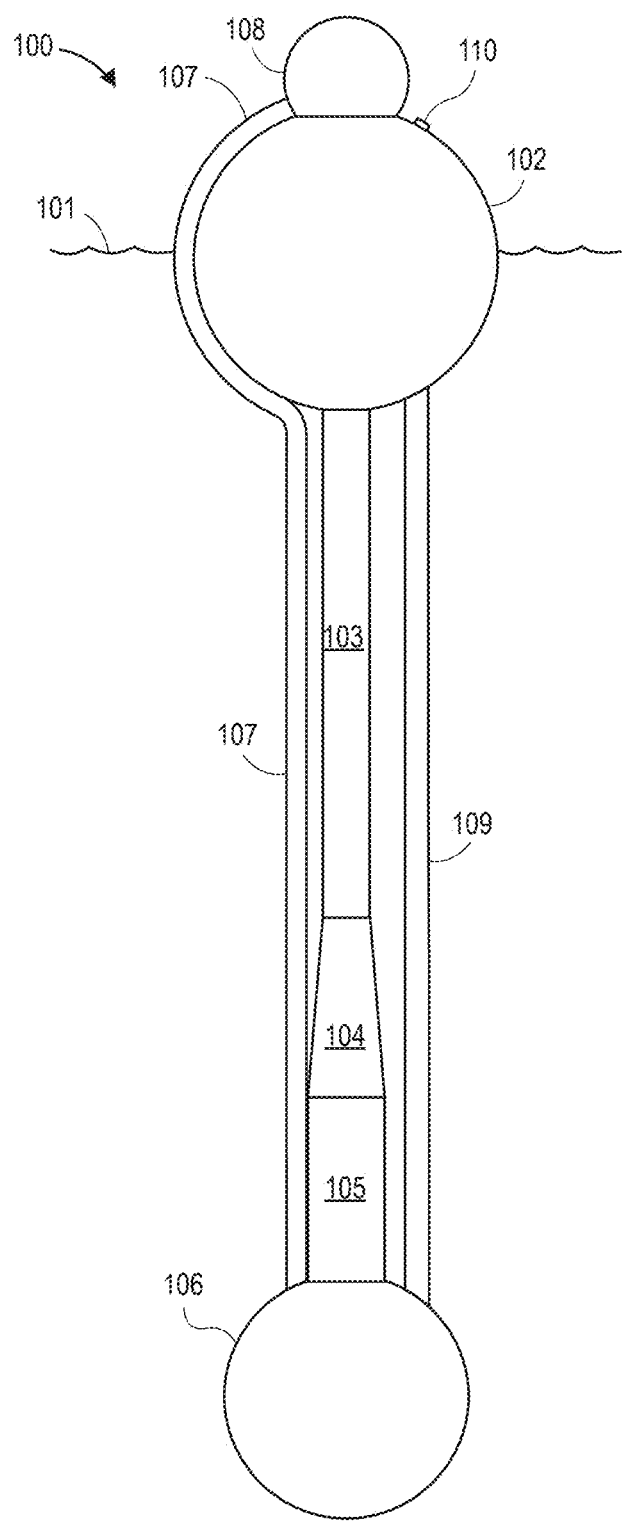
FIG. 4 is a side view of the first embodiment of the current disclosure that is illustrated in FIGS. 1-3.

FIG. 4 shows a side view of the same embodiment 100 of the current disclosure that is illustrated in FIGS. 1-3.

Figure 5:
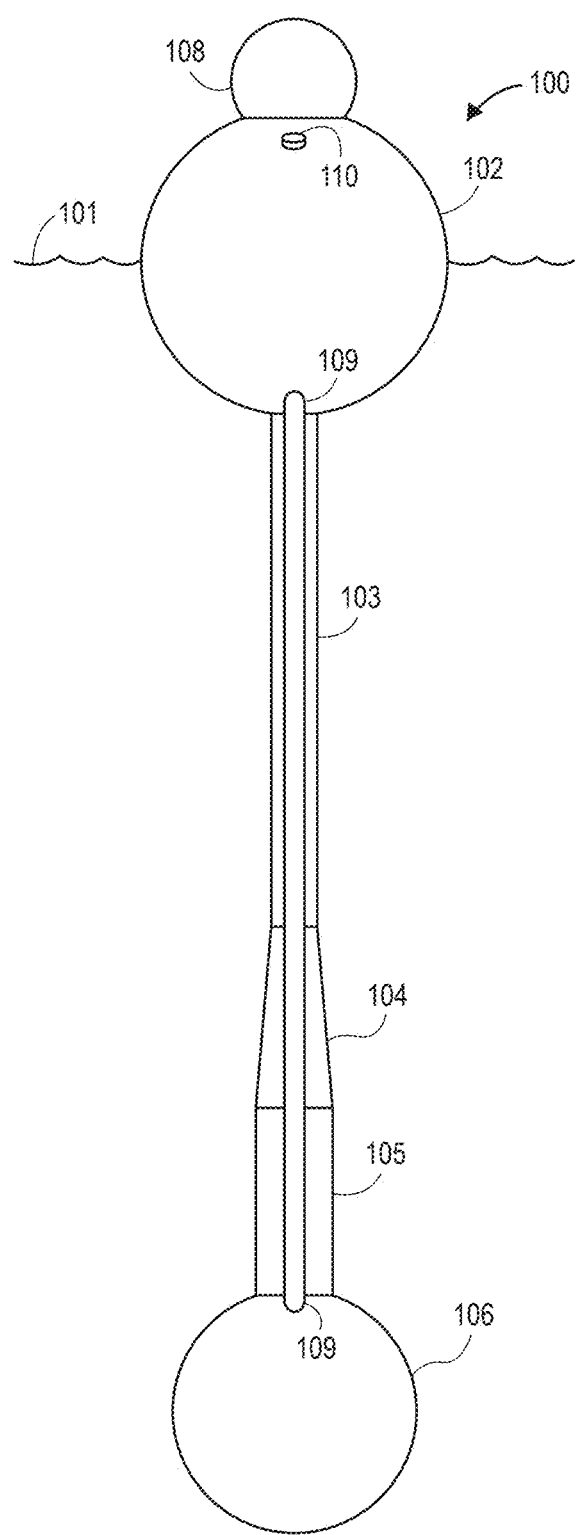
FIG. 5 is a side view of the first embodiment of the current disclosure that is illustrated in FIGS. 1-4.

FIG. 5 shows a side view of the same embodiment 100 of the current disclosure that is illustrated in FIGS. 1-4.

Figure 6:
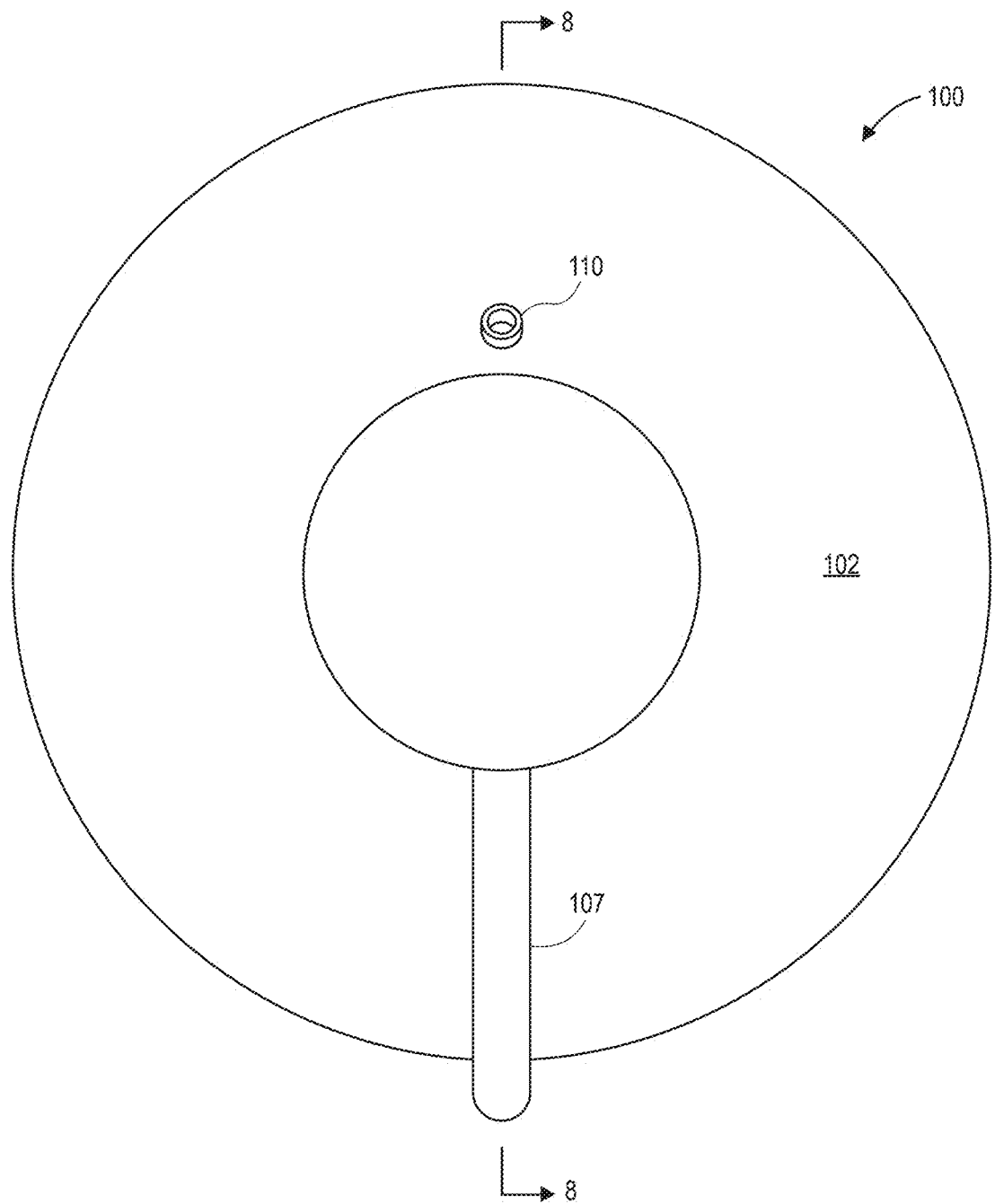
FIG. 6 is a top-down view of the first embodiment of the current disclosure that is illustrated in FIGS. 1-5.

FIG. 6 shows a top-down view of the same embodiment 100 of the current disclosure that is illustrated in FIGS. 1-5.

Figure 7:
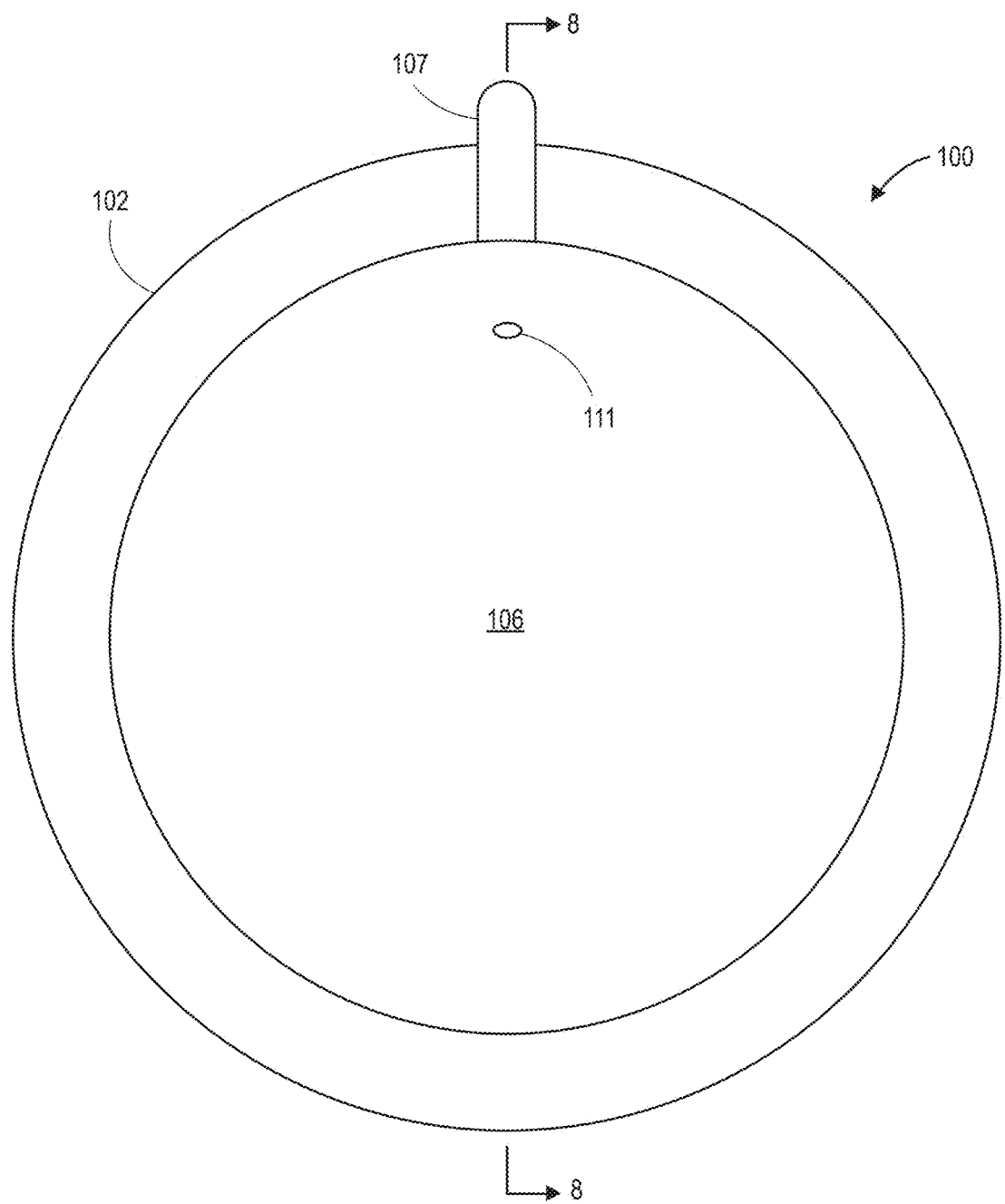
FIG. 7 is a bottom-up view of the first embodiment of the current disclosure that is illustrated in FIGS. 1-6.

FIG. 7 shows a bottom-up view of the same embodiment 100 of the current disclosure that is illustrated in FIGS. 1-6.

Figure 8:
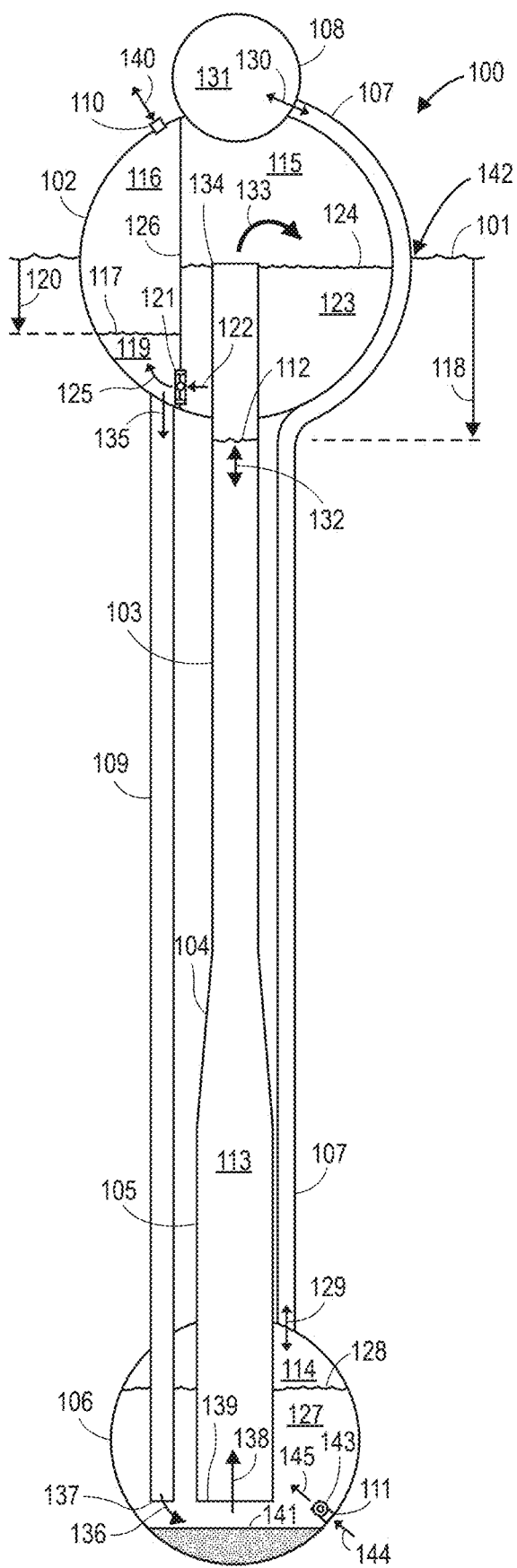
FIG. 8 is a cross-sectional view of the first embodiment of the current disclosure that is illustrated in FIGS. 1-7.

FIG. 8 shows a side sectional view of the same embodiment 100 of the current disclosure that is illustrated in FIGS. 1-7 wherein the vertical section plane is specified in FIGS. 3, 6, and 7, and the section is taken across line 8-8.

The embodiment 100 illustrated in FIGS. 1-8 floats adjacent to an upper surface 101 of a body of water over which waves pass.

An interior of the constricted tube 103-105 is fluidly connected to an interior of the lower hollow chamber 106 via a lower constricted tube mouth 139. And, in response to a gas pressure imparted to a free surface 128 of a lower effluent fluid reservoir 127 by a pressurized lower effluent gas pocket 114, a portion of the fluid within that lower effluent fluid reservoir flows up into the embodiment's constricted tube 103-105 such that a free surface 112 of the fluid 113 within the embodiment's constricted tube 103-105 is raised to a height 118 above the free surface 128 of the lower effluent fluid reservoir, and below an upper mouth 134 of the constricted tube. The depth 118 of the free surface 112 of fluid within the embodiment's constricted tube is determined by a combination of forces, including, but not limited to: a gas pressure exerted by the pressurized lower effluent gas pocket 114 pushing down upon the free surface 128 of the lower effluent fluid reservoir (and tending to elevate the free surface 112); the gravitational weight of the fluid 113 within the constricted tube (tending to lower the free surface 112); and a gas pressure of an ejection gas pocket 115 pushing down upon the free surface 112 of fluid within the embodiment's constricted tube (and tending to lower the free surface 112).

Similarly, an interior of the liquid effluent pipe 109 is fluidly connected to the interior of the lower hollow chamber 106 via a lower mouth 137 of the liquid effluent pipe. And, in response to a gas pressure imparted to the free surface 128 of the lower effluent fluid reservoir 127, the fluid within liquid effluent pipe 109 is positioned at a nominal, and/or resting, depth 120 that places it above the free surface 128 of the lower effluent fluid reservoir, and above the fluid turbine and generator assembly 121. The depth 120 of the free surface 117 of the embodiment's upper effluent fluid reservoir 119 is determined by a combination of forces, including, but not limited to: a gas pressure exerted by the pressurized lower effluent gas pocket 114 pushing down upon the free surface 128 of the lower effluent fluid reservoir (and tending to elevate the free surface 117); the gravitational weight of the fluid within the liquid effluent pipe (tending to lower the free surface 117); and a gas pressure of an upper effluent gas pocket 116 (which is approximately equal to 1 atmosphere, and/or the pressure of the atmospheric air outside and/or above the embodiment 100).

When at rest, the position of the free surface 117 of the embodiment's respective upper effluent fluid reservoir 119, as well as the free surface 112 of the fluid within the embodiment's constricted tube 103-105, are positionally stable, and their relative separations, i.e., the relative difference between their respective depths 120 and 118, correspond to, and/or arise from (at least in part), the relative difference between the pressure of the respective upper effluent gas pocket 116 and the pressure of the ejection gas pocket 115.

Similarly, the pressure of the fluid at, and/or flowing 122 into, the embodiment's fluid turbine 121, from the embodiment's ejection fluid reservoir 123, is a combination of the hydrostatic head pressure of the fluid flowing into the fluid turbine (resulting from, and/or relative to, the depth of the fluid turbine relative to a free surface 124 of the ejection fluid reservoir) and the pressure of the gas within the ejection gas pocket 115. And, the pressure resisting the flow of fluid through the fluid turbine, and into the embodiment's upper effluent fluid reservoir 119, is a combination of the hydrostatic head pressure of the fluid adjacent to the effluent side of the fluid turbine, where effluent fluid flows from that fluid turbine (resulting from, and/or relative to, the depth of the fluid turbine relative to the free surface 117 of the upper effluent fluid reservoir 119), and the atmospheric pressure of the gas within the upper effluent gas pocket 116.

Thus, the net and/or delta pressure of the fluid flowing through the embodiment's fluid turbine 121 is equal to the pressure of the fluid that flows 122 into the fluid turbine, less the pressure of the fluid that flows 125 out of that fluid turbine. And, thus, the pressure driving fluid to flow through the embodiment's fluid turbine 121 is a result of a combination of a net hydrostatic and/or head pressure equal to a difference, and/or a net, in the relative heights of the free surfaces of the fluids within the ejection fluid reservoir 123 and the upper effluent fluid reservoir 119, and a difference in, and/or a net, gaseous pressure equal to a difference in the gas pressures of the ejection gas pocket 115 and the upper effluent gas pocket 116.

The embodiment's fluid turbine 121 is embedded within, and/or attached to, a vertical separation wall 126 that separates the ejection fluid reservoir 123 from the upper effluent fluid reservoir 119, and which also separates the ejection gas pocket 115 from the upper effluent gas pocket 116. The fluid turbine within the vertical separation wall fluidly connects the ejection 123 and upper effluent 119 fluid reservoirs, and fluid from the ejection fluid reservoir flows through the fluid turbine and therethrough flows into the upper effluent fluid reservoir.

As waves lift and let fall the embodiment, the inertia of the fluid 113 within the embodiment's constricted tube 103-105 resists the wave-driven up-and-down accelerations causing that fluid to move down and up opposite the up and down movements of the embodiment and the constricted tube surrounding that fluid.

When the embodiment 100 accelerates up, e.g., in response to an approaching wave crest, the fluid 113 within the embodiment's constricted tube 103-105 experiences, in the embodiment's frame of reference, an acceleration downward (e.g., as a result of its inertia resisting an upward vertical movement and thereby moving downward relative to the upwardly-moving constricted tube), thereby typically causing its free surface 112 to likewise move 132 downward in the embodiment's frame of reference, and thereby increasing the volume of fluid within the lower effluent fluid reservoir 127, which causes the free surface 128 of that fluid to rise, which, in turn, compresses the pressurized gas within the pressurized lower effluent gas pocket 114, which increases an "over-pressurized" pressure potential energy within that pressurized lower effluent gas pocket. In response to an increase in the pressure of the gas within the pressurized lower effluent gas pocket (i.e., to a pressure greater than its nominal, and/or resting, pressure), a portion of the gas within the pressurized lower effluent gas pocket may flow 129 into the effluent gas pocket pipe 107, and therethrough flow 130 into a complementary effluent pocket 131 of pressurized gas within an interior of the extended lower effluent gas chamber 108.

When the free surface 112 of the fluid 113 within the constricted tube 103-105 moves 132 down in the embodiment's frame of reference, the volume available to the pressurized ejection gas pocket 115 expands, thereby causing the pressure of that gas within the pressurized ejection gas pocket to decrease, which increases an "under-pressurized" pressure potential energy within that pressurized ejection gas pocket.

When the embodiment 100 accelerates down, e.g., in response to an approaching wave trough, the fluid 113 within the constricted tube 103-105 experiences, in the embodiment's frame of reference, an acceleration upward (e.g., as a result of its inertia resisting a downward vertical movement and thereby moving upward relative to the downwardly-moving constricted tube), thereby causing its free surface 112 to likewise move 132 upward in the embodiment's frame of reference. If the embodiment is at rest prior to moving downward, then the upward movement of the fluid 113 within the constricted tube compresses the gas within the pressurized ejection gas pocket 115, and, similarly, reduces the volume of fluid within the lower effluent fluid reservoir 127, thereby reducing the pressure of the gas within the lower effluent gas pocket 114, in an analogous but opposite transfer of pressure between the pressurized ejection gas pocket and the lower effluent gas pocket that occurs in response to an upward movement of the embodiment.

However, when the embodiment 100 falls, following the embodiment's rise, then not only does the fluid 113 within the constricted tube 103-105 move upward (in the embodiment's frame of reference) as a result of its own inertia resisting the downward movement of the embodiment, it also moves upward, and its rise is accelerated, by the imbalanced, and/or non-nominal difference in, the pressures of the lower effluent gas pocket 114 and the ejection gas pocket 115. A non-nominal, and/or surplus, pressurization of the gas within the lower effluent gas pocket, such as that caused by a prior rise of the embodiment, applies an upward "pushing from below" force to the fluid within the constricted tube, thereby accelerating the rise of that fluid in response to the embodiment's subsequent fall. And, the non-nominal, and/or deficient, pressurization of the gas within the pressurized ejection gas pocket, such as that caused by a prior rise of the embodiment, applies an upward "pulling from above" force to the fluid within the constricted tube, thereby further accelerating the rise of that fluid in response to the embodiment's fall.

Regardless of whether an embodiment's falling follows the embodiment's rising, or occurs relative to an embodiment at rest, the resulting rise of the fluid 113 within the embodiment's constricted tube 103-105 results in a compression, and a relative pressurization, of the gas within the pressurized ejection gas pocket 115, and a relative depressurization of the gas within the lower effluent gas pocket 114, thereby storing potential energy in each gas pocket. Any deviation of the pressure of either the ejection gas pocket or the lower effluent gas pocket from its nominal, and/or resting, pressure represents a potential energy of the respective gas pocket. And, due to their respective effects on the position of the free surface 112 of the fluid within the constricted tube, the pressures of both gas pockets tend to be inversely related, i.e., an increase the pressure of one is typically correlated with, and/or accompanied by, a decrease in the pressure of the other.

When, during its wave-induced, and/or wave-driven, oscillations, fluid 113 within the embodiment's constricted tube 103-105 rises fast enough, and/or far enough, a portion of that elevated fluid will tend to be ejected 133, and/or flow out of, an upper mouth 134 of the constricted tube, with such ejected fluid thereafter tending to flow onto and through the free surface 124 of the ejection fluid reservoir 123, thereby flowing into and joining with, and/or merging with, the contents of that ejection fluid reservoir.

Fluid that flows 122 from the ejection fluid reservoir 123 and into and through the embodiment's fluid turbine 121, thereafter flows 125 out of the turbine as effluent into the upper effluent fluid reservoir 119. And, as effluent from the fluid turbine increases the volume of fluid within the upper effluent fluid reservoir, thereby raising the free surface 117 of that upper effluent fluid reservoir, portions of that fluid tend to flow 135 into, and downward through, the embodiment's liquid effluent pipe 109, which fluidly connects the upper effluent fluid reservoir to the lower effluent fluid reservoir 127, thereafter flowing 136 out of a lower mouth 137 of the liquid effluent pipe and flowing into the lower effluent fluid reservoir, whereafter, e.g., in response to a descent of the embodiment, fluid within the lower effluent fluid reservoir flows 138 through the lower mouth 139 of the constricted tube 103-105 and into the lower portion 105 of the constricted tube.

Thus, as the embodiment 100 moves up and down in response to waves impinging upon it, fluid 113 from within the embodiment's constricted tube 103-105 is elevated periodically and/or occasionally to a sufficient degree to cause a portion of that fluid to be ejected 133 from an upper mouth 134 of the constricted tube and thereby added to the ejection fluid reservoir 123. And fluid in the ejection fluid reservoir flows through the embodiment's fluid turbine 121 thereby causing the operably connected fluid-turbine generator to produce electrical power. The fluid turbine 121 may comprise any structure configured to translate kinetic motion of a fluid into rotational energy. For example, the fluid turbine 121 may comprise a fluid or hydrokinetic turbine. In some instances, the fluid turbine 121 may be considered a pressure-regulator. Any kind of pressure regulator may be used in place of the fluid turbine 121 or used in conjunction with the fluid turbine 121. Pressure-regulators may also comprise a filter and/or a membrane. In some instances the vertical separation wall 126 may comprise a fluid turbine 121, a filter, or a fluid turbine 121 and a filter. More generally, a pressure regulator through the vertical separation wall 126 may be used in order to execute useful work such as, but not limited to, energy generation, filtering, purification, desalination, element extraction, or the like. The pressure regulator may maintain a pressure differential with a pressure on one side of the pressure regulator (e.g., in the ejection gas pocket 115) that is higher than a pressure on the other side of the pressure regulator (e.g., in the effluent gas pocket 116 and/or the gas pocket 114). Effluent from the fluid turbine is added to the upper effluent fluid reservoir 119 from where it flows 135 downward through the liquid effluent pipe 109 after which it joins the lower effluent fluid reservoir 127. And, fluid within the lower effluent fluid reservoir is drawn 138 up and through a lower mouth 139 of the constricted tube and into the constricted tube wherein it will again be elevated, and will again be ejected 133 from the upper mouth 134 of the constricted tube. Thus, the fluid within the embodiment is recirculated through a vertical fluid circuit that increases its potential energy, and then dissipates that added fluid potential energy to energize a fluid turbine and operably connected generator, thereby converting a portion of the fluid potential energy added to, and/or invested in, the elevated fluid into electrical power.

Because the fluid within the embodiment 100 tends to remain within the embodiment, specialized, modified, and/or customized, fluids may be utilized within the embodiment. For example, fluids utilized within embodiments of the present disclosure may constitute, but are not limited to: fresh water, a concentrated brine solution, an alkaline aqueous solution (e.g., sodium hydroxide dissolved in fresh water), a carbonaceous liquid (e.g., oil), and/or a combination of such specialized fluids. In the embodiment 100 illustrated in FIGS. 1-8, the fluid utilized within the embodiment will be exposed to the atmosphere through atmospheric equilibration aperture 110 so particularly volatile fluids, or fluids whose introduction to the environment would be detrimental, would therefore not be preferred fluids for the illustrated embodiment 100.

An embodiment of the present disclosure similar to the one illustrated in FIGS. 1-8 omits the atmospheric equilibration aperture 110, thereby trapping the gases within the embodiment's gas pockets, in the same way that it traps the respective fluids. These embodiments may utilize a gas or combination of gases that are selected to reduce, if not eliminate, corrosion of internal surfaces, structures, and/or mechanisms. Such gases include, but are not limited to: hydrogen, ammonia, nitrogen, and carbon dioxide.

With respect to the embodiment illustrated in FIGS. 1-8, the pressure of the gas within the upper effluent gas pocket 116 is fluidly connected by an atmospheric equilibration aperture 110 to the atmosphere outside and above the embodiment. In response to differences in gas pressures, gas within the upper effluent gas pocket may flow 140 out to the atmosphere, or air in the atmosphere may flow 140 into the upper effluent gas pocket.

The embodiment illustrated in FIGS. 1-8 incorporates, utilizes, and/or includes, a block 141 of cement, concrete, and/or another cementitious material, positioned within, and/or affixed to, the embodiment within a lower portion of the interior of the lower hollow chamber 106. This cement block increases the density of the embodiment so as to adjust, calibrate, and/or position, its exterior waterline 142 to a favorable location on the embodiment, e.g., near the equator and/or widest horizontal cross-section of the upper hollow chamber 102. The cement block also lowers the embodiment's center of gravity thereby improving the positional stability of the embodiment (e.g., promoting a vertical orientation of the embodiment) when the embodiment is buffeted by waves. Other embodiments of the present disclosure, e.g., those utilizing thicker steel walls and/or other ballast materials disposed in the lower hollow chamber, omit a cement block. More generally, ballast materials (such as the block 141) may be coupled to the embodiment 100 at any location at or below a vertical midpoint of the embodiment 100. The vertical midpoint may be a midpoint along a line drawn from a top of the extended lower effluent chamber 108 and a bottom of the lower hollow chamber 106. In other instances, a mass of a portion of the embodiment 100 below the vertical midpoint may be greater than a mass of a portion of the embodiment 100 above the vertical midpoint.

The embodiment 100 illustrated in FIGS. 1-8 incorporates a secondary, complementary, and/or extension of, its "primary" pressurized lower effluent gas pocket 114. The complementary effluent gas pocket 131 within the interior of the extended lower effluent gas chamber 108, is fluidly connected to the gas pocket 114 within the interior of the lower hollow chamber 106 (i.e., to the pressurized lower effluent gas pocket 114). Because of this division of the effluent gas pocket into two fluidly-connected gas pockets, i.e., the lower effluent gas pocket 114 and the complementary effluent gas pocket 131, the buoyancy of the lower hollow chamber 106 is reduced, thereby increasing the vertical stability of the embodiment. The extended lower effluent gas chamber 108 may be located on the upper half of the embodiment 100. In some instances, the extended lower effluent gas chamber 108 may be coaxially located above the upper hollow chamber 102. Positioning the extended lower effluent gas chamber 108 in a coaxial arrangement at the top of the embodiment may reduce or eliminate the likelihood of the embodiment tipping over due to the redistribution of the buoyant force.

The embodiment illustrated in FIGS. 1-8 utilizes a fluid comprised of a concentrated, and/or hypersaline, water brine. It also utilizes a portion of the electrical power produced by its fluid turbine and generator assembly 121 to energize a brine electrolyzer (not shown) which converts water within the brine fluid into hydrogen and oxygen gases, thereby, over time, causing a loss of water from the brine solution. Regardless of the cause of water loss, the embodiment 100 may periodically, and/or as needed, replenish the water within its brine fluid, and/or thereby adjust and/or alter the concentration of that brine fluid, by opening a water refresh valve 143, the opening of which permits water (e.g., seawater) from the body of water 101 to flow 144 into the water refresh pipe 111 where that inflow of external water 101 is obstructed by a forward osmosis semipermeable membrane. Because the fluid of the illustrated embodiment is a concentrated brine, i.e., a brine with a greater solute concentration than that of seawater, an osmotic pressure exists across the membrane, and fresh water from the body of water 101 is able to flow 145 through the forward-osmosis membrane and into, and dilute, the concentrated brine solution within the embodiment, e.g., thereby replacing water consumed through the synthesis of hydrogen and oxygen gases. At the same time, salts, organic matter, and other solutes, that may be present in the body of water outside the embodiment are unable to pass, and/or flow, through the forward-osmotic membrane, such a passage risking a "pollution" of the purity of the concentrated brine solution within the embodiment. The avoidance of such brine pollution, and the maintenance of the purity of the embodiment's concentrated brine solution, is desirable as it tends to promote a long and maintenance-free operation of the embodiment.

Figure 9:
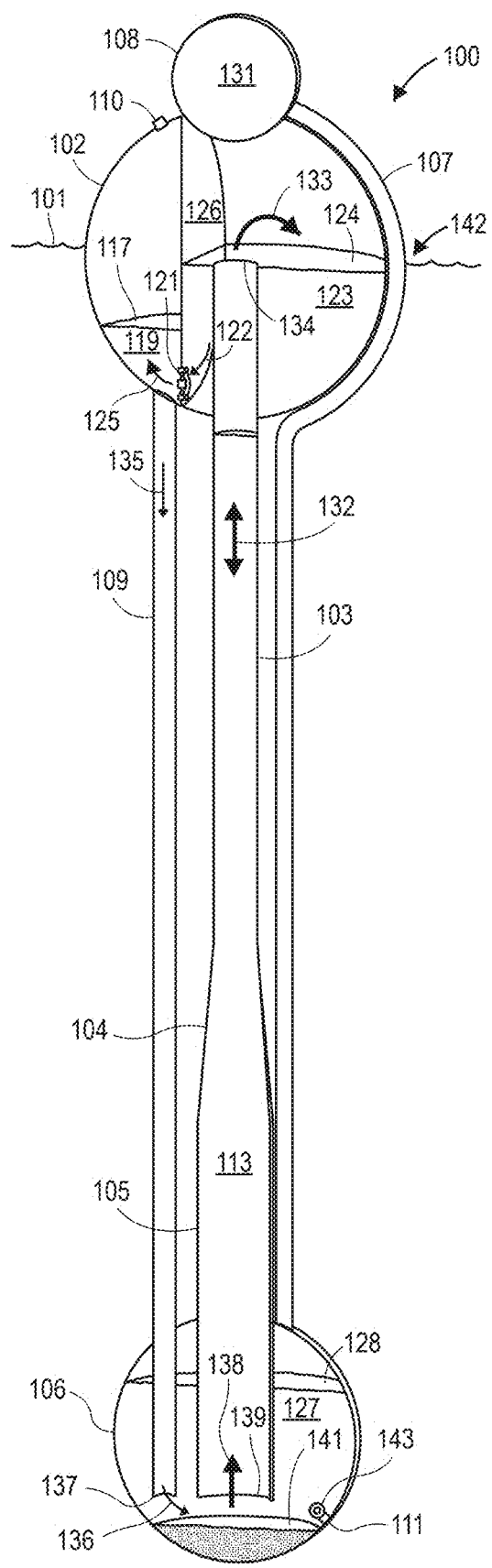
FIG. 9 is a perspective view of a side sectional view of the first embodiment of the current disclosure that is illustrated in FIGS. 1-8.

FIG. 9 shows a perspective view of the side sectional view of the embodiment 100 that is illustrated in FIG. 8, which sectional view is of the same embodiment 100 of the current disclosure that is illustrated in FIGS. 1-8 and wherein the vertical section plane is specified in FIGS. 3, 6, and 7, and the section is taken across line 8-8.

Figure 10:
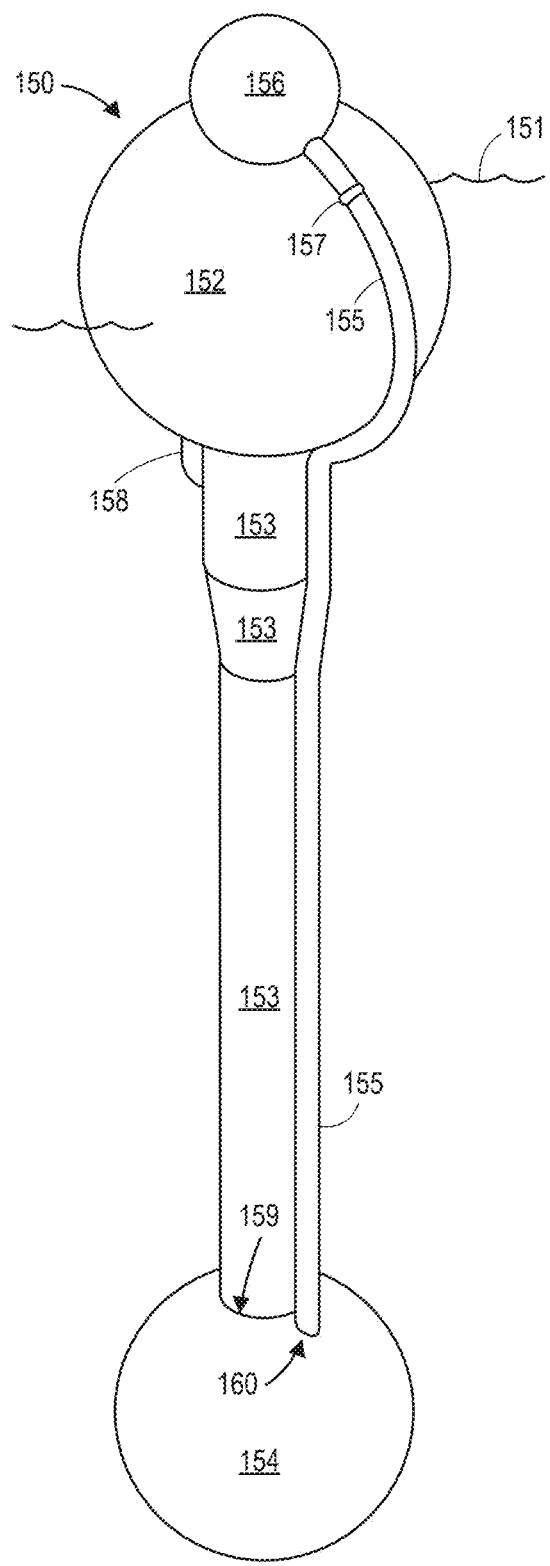
FIG. 10 is a side perspective view of a second embodiment of the current disclosure.

FIG. 10 shows a side perspective view of an embodiment 150 of the current disclosure.

The embodiment floats adjacent to an upper surface 151 of a body of water over which waves pass.

The embodiment comprises an upper hollow chamber 152, an annular working-fluid return channel 153, a constricted inertial tube (not visible) positioned coaxially within the annular working-fluid return channel, and a lower hollow chamber 154.

A pressurized gas pocket (not visible) within the lower hollow chamber 154 is fluidly connected, by an effluent gas pocket pipe 155, to a complementary effluent gas pocket (not visible) within an interior of a complementary effluent gas chamber 156. The flow of gas between the pressurized gas pocket within the lower hollow chamber and the complementary effluent gas pocket is regulated, altered, and/or controlled, by an effluent gas regulation valve 157. When the effluent gas regulation valve is open then gas may flow between the pressurized gas pocket within the lower hollow chamber and the complementary effluent gas pocket. When the effluent gas regulation valve is closed then gas may not flow between the pressurized gas pocket within the lower hollow chamber and the complementary effluent gas pocket, and those respective gas pockets are not fluidly connected.

Pressurized working fluid (not visible) within a pressurized working-fluid reservoir (not visible) within an interior of the upper hollow chamber 152 is fluidly connected to a working-fluid turbine and generator (not visible) within a working-fluid turbine pipe 158. Pressurized working fluid within the pressurized working-fluid reservoir flows from the pressurized working-fluid reservoir into an upper portion of the working-fluid turbine pipe through a working-fluid turbine pipe inlet (not visible) and therethrough flows to and through the working-fluid turbine causing a rotor of the working-fluid turbine to rotate which, in turn, causes an operably-connected generator to produce electrical power. In alternate embodiments, a magnetohydrodynamic generator replaces the turbine and generator.

The working fluid effluent from the working-fluid turbine flows into a lower portion of the working-fluid turbine pipe and thereafter flows out of the working-fluid turbine pipe through a working-fluid turbine pipe outlet (not visible). Effluent flowing out of the lower working-fluid turbine pipe outlet flows into an interior of the annular working fluid return channel 153 and therethrough flows down and into a working-fluid effluent reservoir (not visible) within an interior of the lower hollow chamber 154.

The annular working fluid return channel 153 passes into and through the hull and/or wall of the lower hollow chamber 154 at a location 159. The effluent gas pocket pipe 155 passes into and through the hull and/or wall of the lower hollow chamber at a location 160.

Wave action at the embodiment 150 causes working fluid within the constricted inertial tube (not visible) positioned coaxially within the annular working-fluid return channel 153 to oscillate. As that working fluid (not visible), and/or as a free surface (not visible) of that working-fluid, oscillates within the constricted inertial tube it occasionally and/or periodically rises above an upper mouth (not visible) of the constricted inertial tube thereby transferring a portion of the risen working fluid from the interior of the constricted frustoconical tube to the pressurized working-fluid reservoir (not visible). Over time, portions of the working fluid added to the pressurized working-fluid reservoir flow into and through the working-fluid turbine, thereby causing the operably-connected generator to produce electrical power. The working-fluid turbine effluent flows into and down through the annular working fluid return channel 153, thereafter flowing into the working-fluid effluent reservoir (not visible). And then, in response to additional wave action at the embodiment 150, the working fluid within the working-fluid effluent reservoir flows into and up through the constricted inertial tube, occasionally and/or periodically being ejected from that constricted frustoconical tube and into the pressurized working-fluid reservoir, and thereby continuing its cyclical flow through the embodiment.

The embodiment 150, converts wave action, and/or wave energy, into electrical power through a cyclic flow of working fluid through its constricted inertial tube (not visible) and its annular working-fluid return channel 153, with the working fluid flowing between the embodiment's upper (not visible) and lower (not visible) working fluid reservoirs, and with elevated and pressurized working fluid from the upper working fluid reservoir flowing back to the lower working fluid reservoir through the working-fluid turbine.

The embodiment 150 illustrated in FIG. 10 utilizes a working fluid comprised of water and a 25% weight/weight concentration of potassium hydroxide. Other similar embodiments utilize working fluids comprised of fresh water or aqueous solutions, of various concentrations, of other solutes, including, but not limited to, solutions of: sodium hydroxide, sodium chloride, etc. In another similar embodiment, the working fluid may comprise an iron ore suspension, such as those described in greater detail herein.

Figure 11:
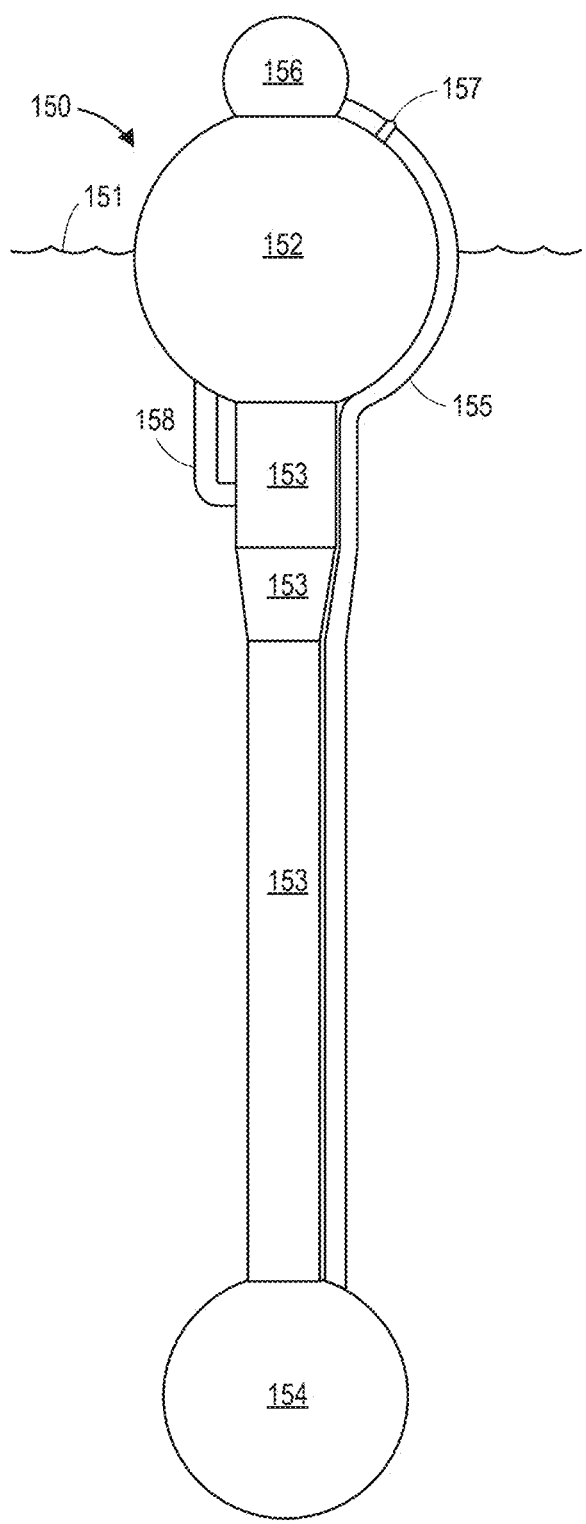
FIG. 11 is a side view of the second embodiment of the current disclosure that is illustrated in FIG. 10.

FIG. 11 shows a side view of the same embodiment 150 of the current disclosure that is illustrated in FIG. 10.

Figure 12:
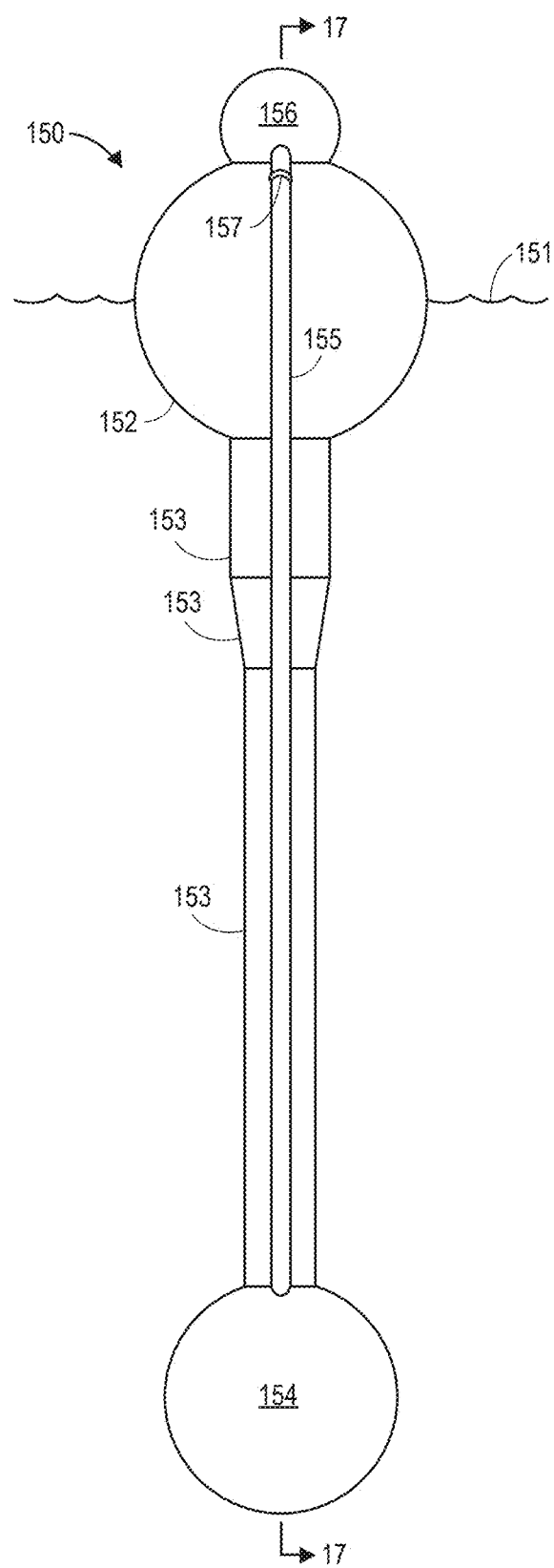
FIG. 12 is a side view of the second embodiment of the current disclosure that is illustrated in FIGS. 10 and 11.

FIG. 12 shows a side view of the same embodiment 150 of the current disclosure that is illustrated in FIGS. 10 and 11.

Figure 13:
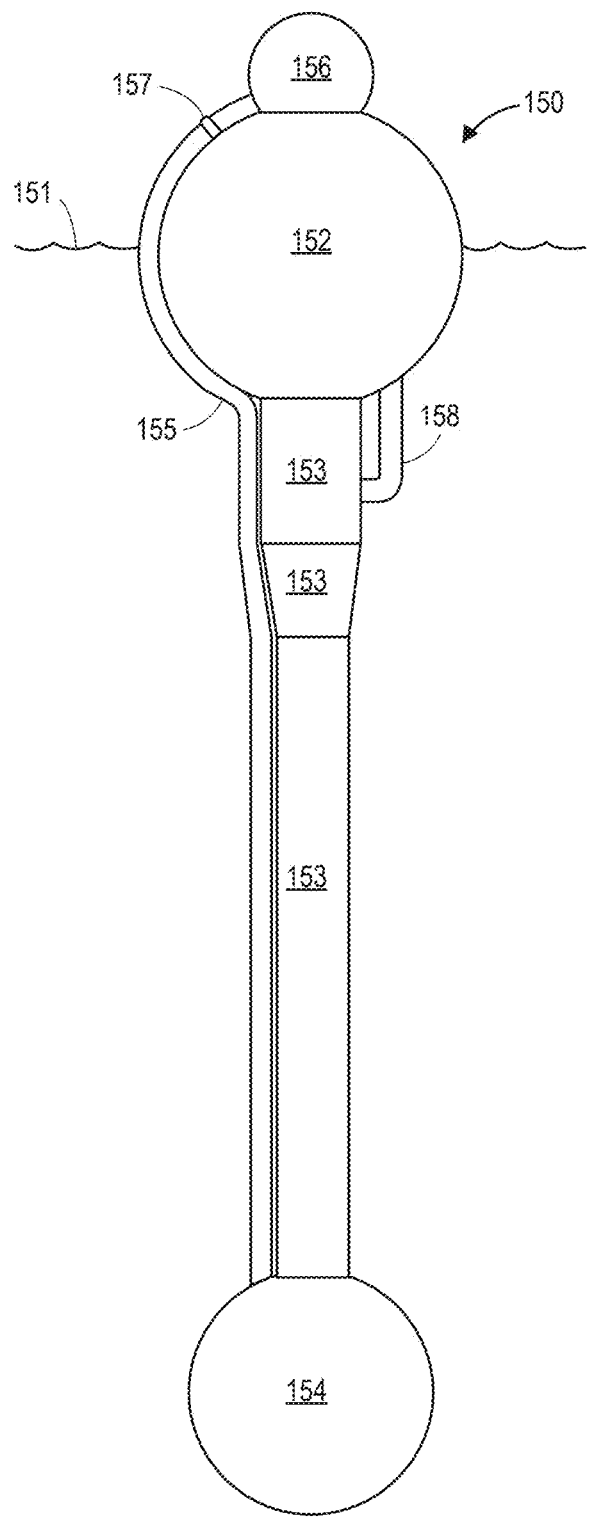
FIG. 13 is a side view of the second embodiment of the current disclosure that is illustrated in FIGS. 10-12.

FIG. 13 shows a side view of the same embodiment 150 of the current disclosure that is illustrated in FIGS. 10-12.

Figure 14:
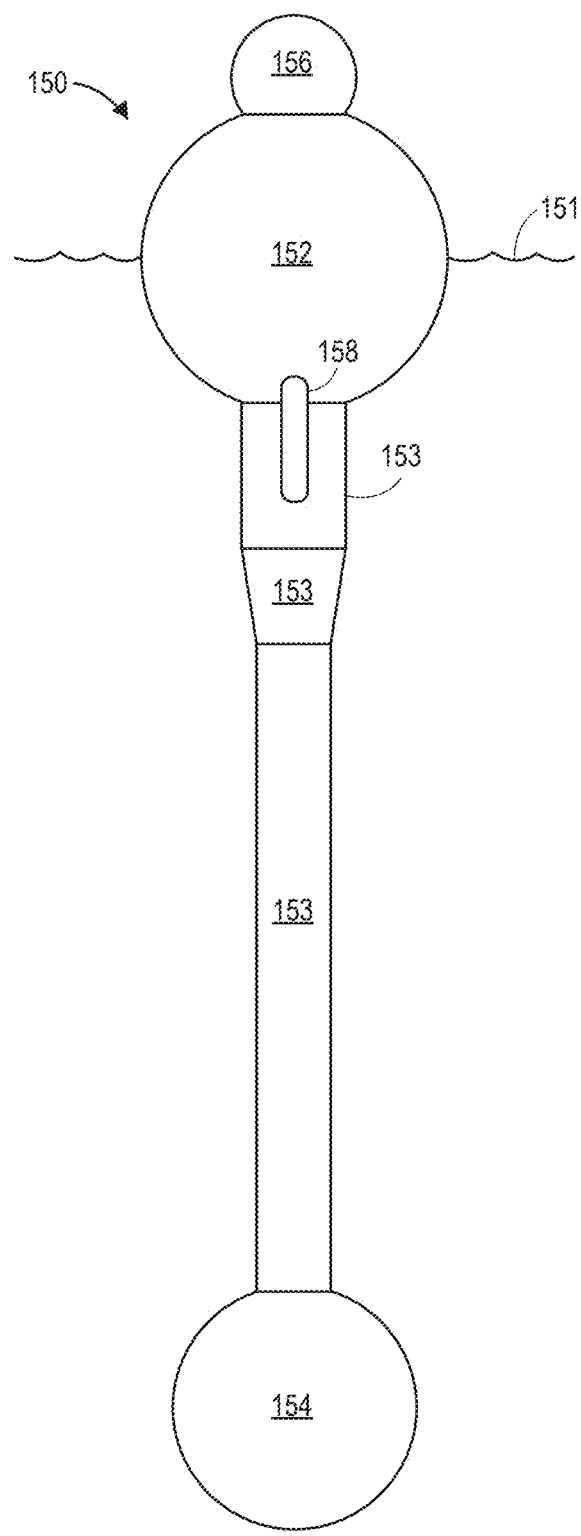
FIG. 14 is a side view of the second embodiment of the current disclosure that is illustrated in FIGS. 10-13.

FIG. 14 shows a side view of the same embodiment 150 of the current disclosure that is illustrated in FIGS. 10-13.

Figure 15:
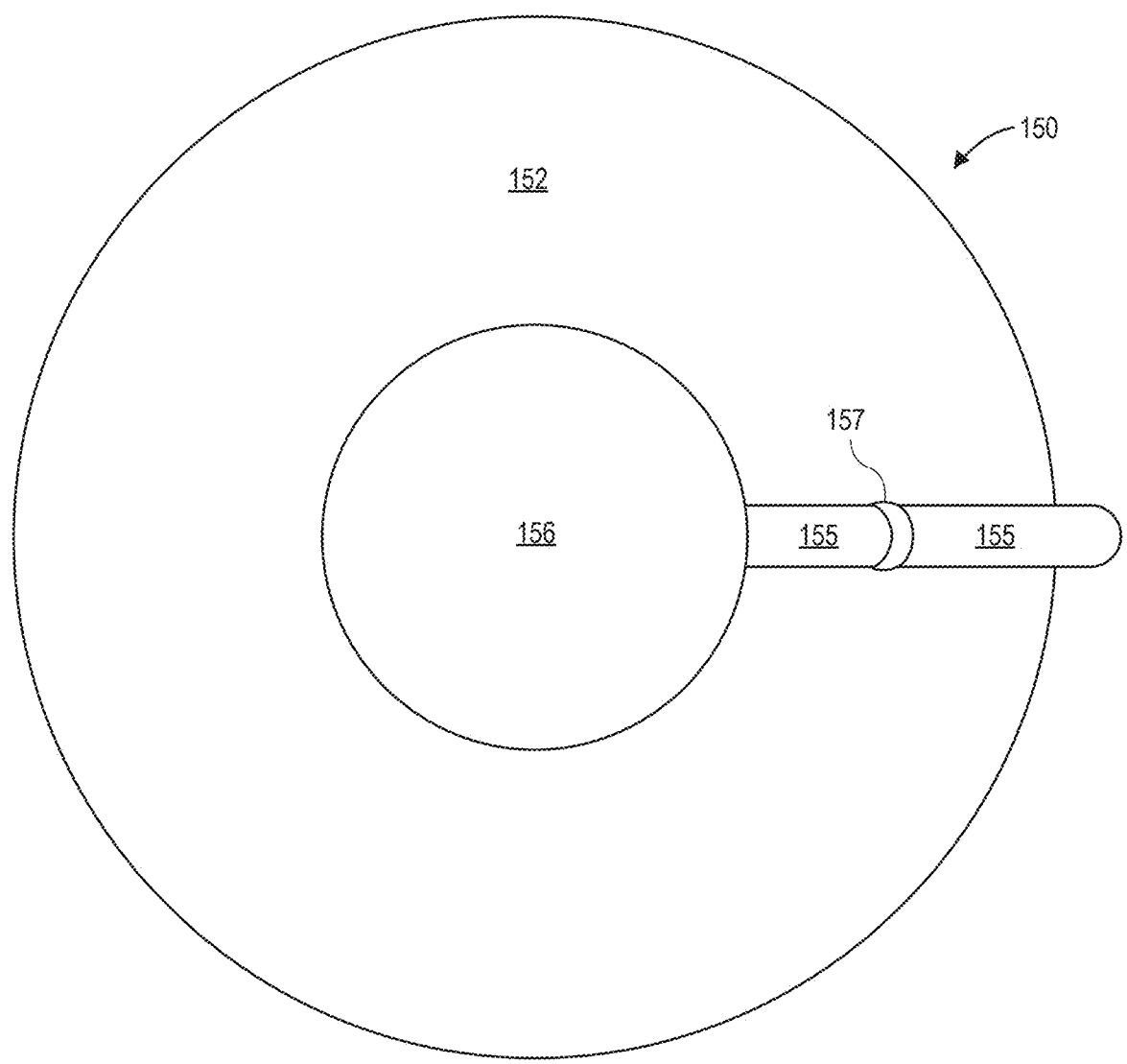
FIG. 15 is a top-down view of the second embodiment of the current disclosure that is illustrated in FIGS. 10-14.

FIG. 15 shows a top-down view of the same embodiment 150 of the current disclosure that is illustrated in FIGS. 10-14.

Figure 16:
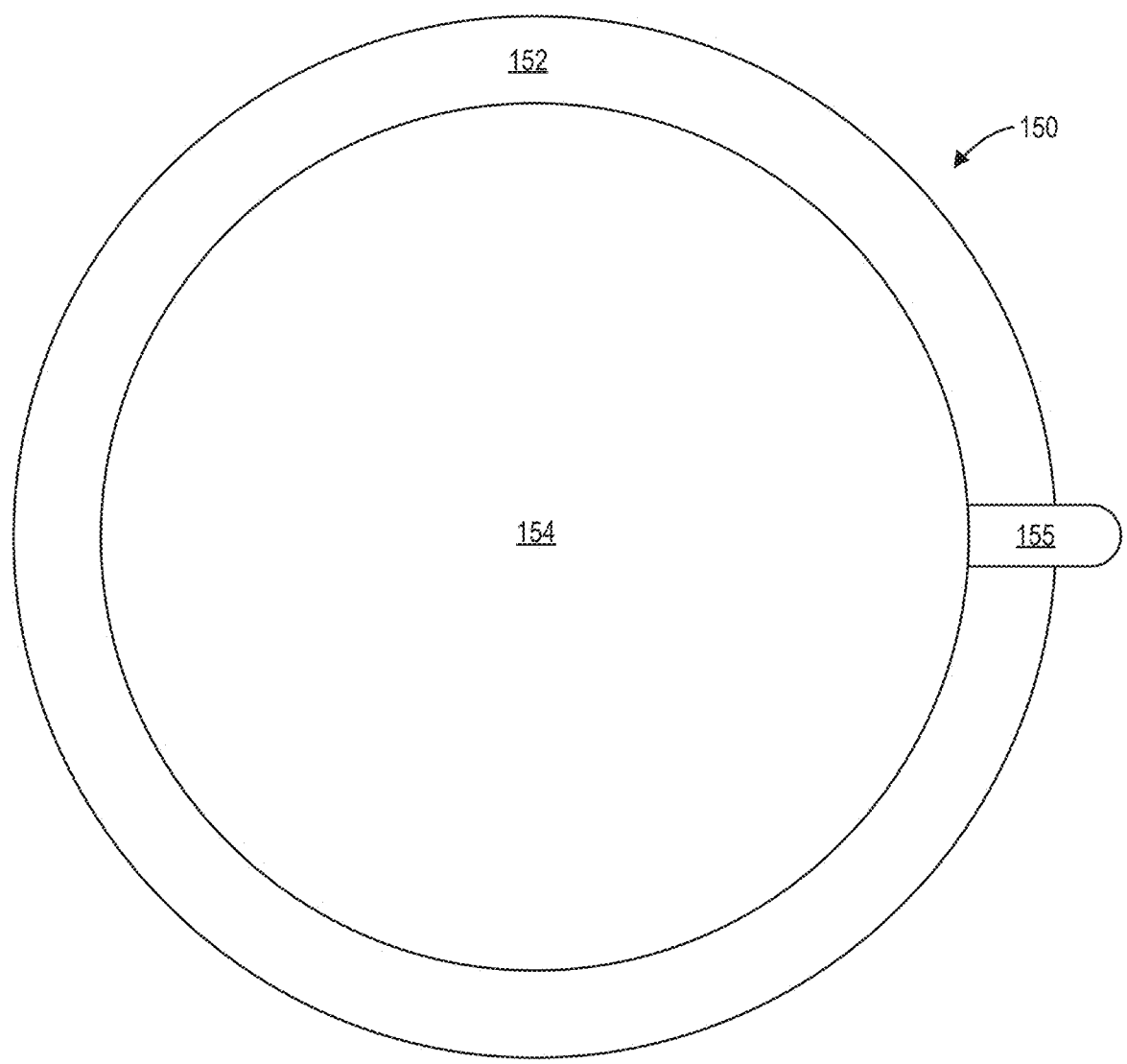
FIG. 16 is a bottom-up view of the second embodiment of the current disclosure that is illustrated in FIGS. 10-15.

FIG. 16 shows a bottom-up view of the same embodiment 150 of the current disclosure that is illustrated in FIGS. 10-15.

Figure 17A:
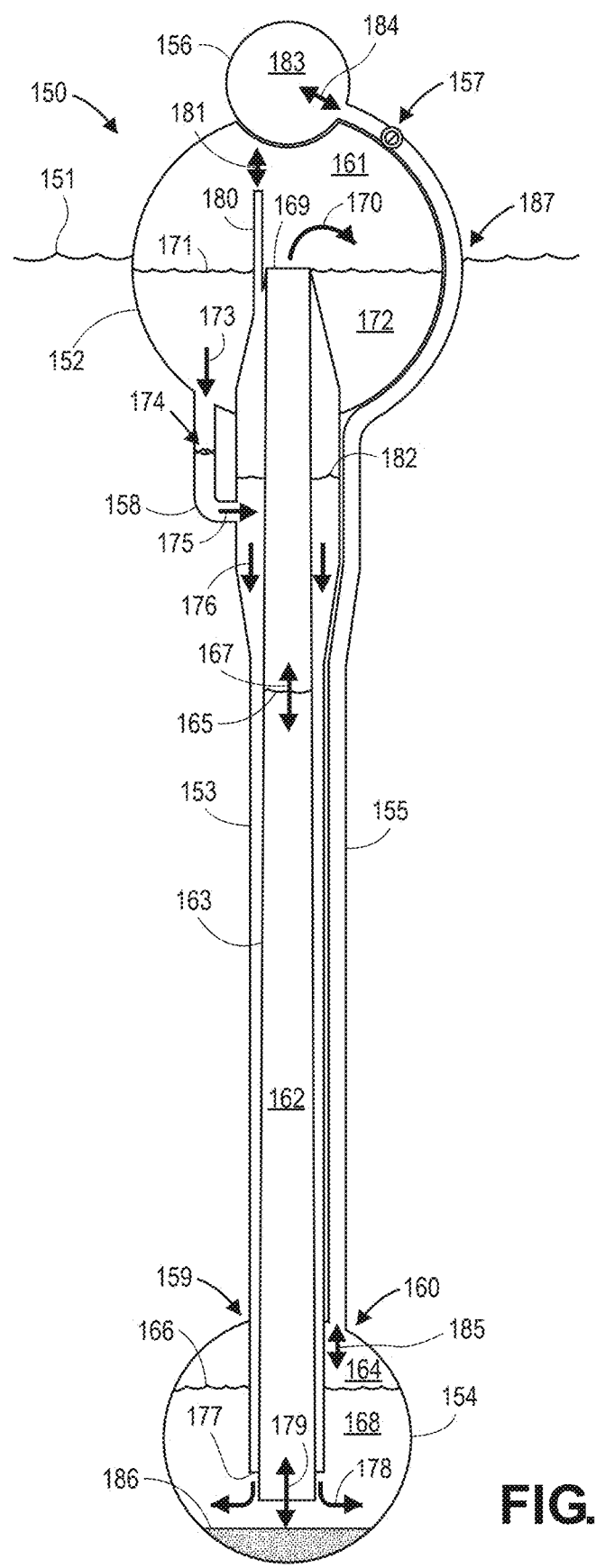
FIG. 17A is a cross-sectional view of the second embodiment of the current disclosure that is illustrated in FIGS. 10-16.
Figure 17B:
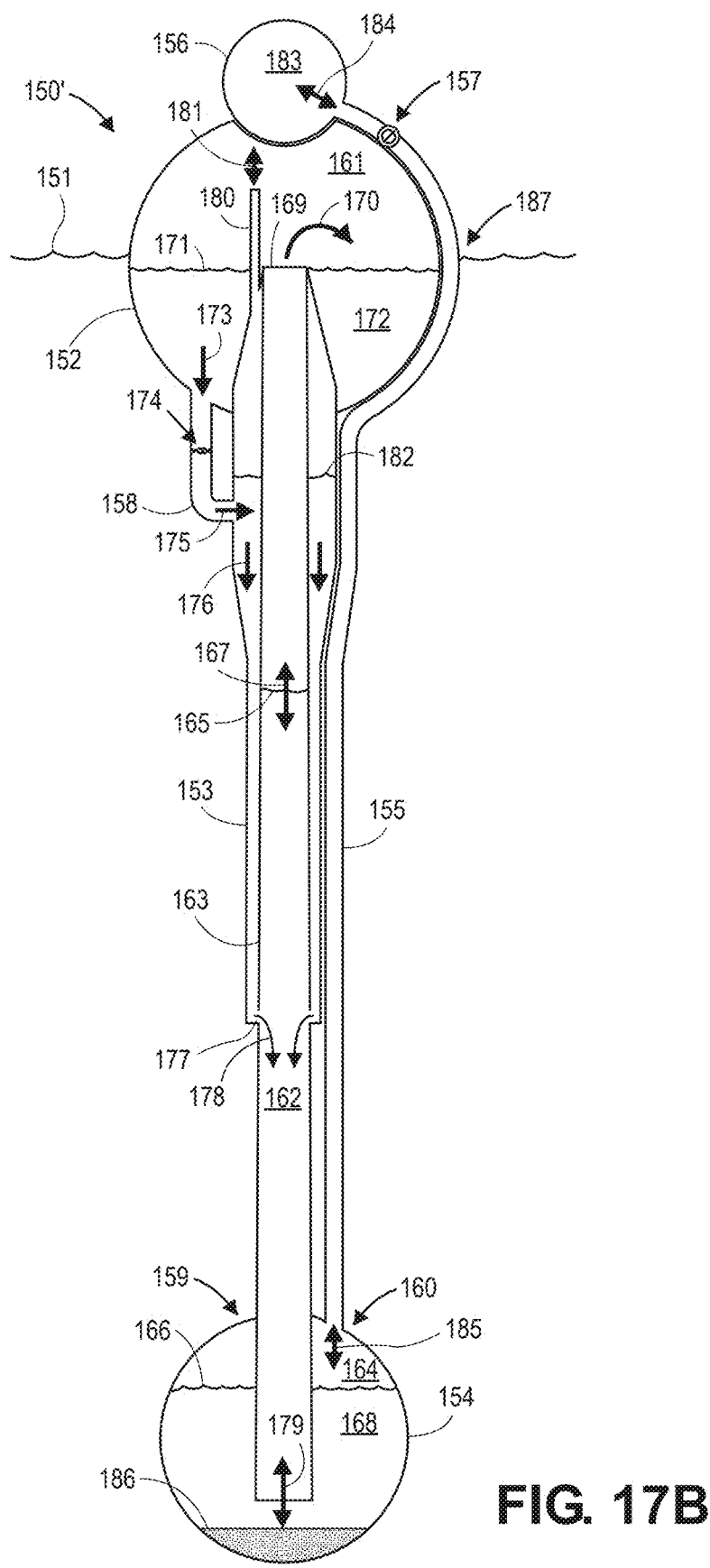
FIG. 17B is a cross-sectional view of a third embodiment of the current disclosure.
Figure 18:
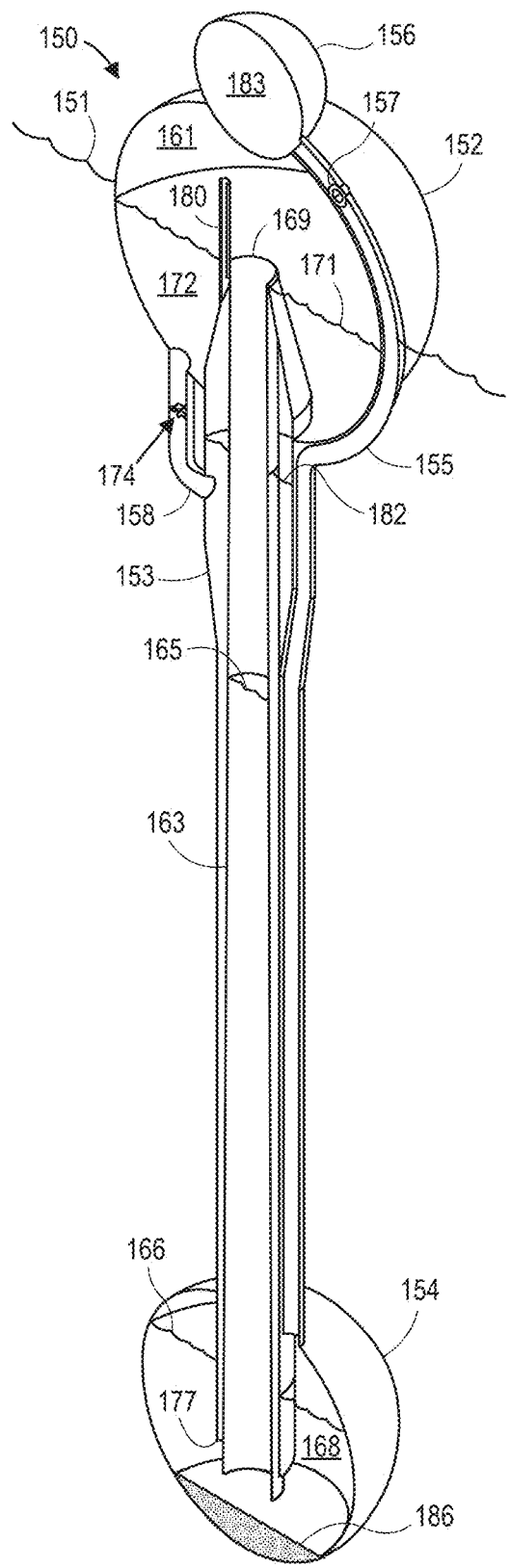
FIG. 18 is a side sectional view of the second embodiment of the current disclosure that is illustrated in FIGS. 10-17.

FIG. 17A shows a side sectional view of the same embodiment 150 of the current disclosure that is illustrated in FIGS. 10-16 wherein the vertical section plane is specified in FIG. 12, and the section is taken across line 17-17, and FIG. 18 shows a corresponding side sectional view of the same embodiment 150 of the current disclosure that is illustrated in FIGS. 10-17.

The embodiment 150 illustrated in FIGS. 10-18 floats adjacent to an upper surface 151 of a body of water over which waves pass.

An upper gas pocket 161 within an interior of the upper hollow chamber 152 pushes down upon the free surface 165 of the working fluid 162 within an interior of the embodiment's constricted inertial tube 163 (tending to decrease the elevation of the free surface 165 of the working fluid 162), while a lower gas pocket 164 within an interior of the lower hollow chamber 154 pushes down upon the free surface 166 of the effluent working-fluid reservoir 168, which, in turn, pushes up upon the working fluid 162 within the constricted inertial tube (tending to increase the elevation of the free surface 165 of the working fluid 162). The weight of the working fluid 162 within the constricted inertial tube adds a downward force to that working fluid (tending to decrease the elevation of the free surface 165 of the working fluid 162). When the embodiment is at rest, the relative height and/or position of an free surface 165 of the working fluid 162 within the interior of the constricted inertial tube is such that the downward forces on the working fluid 162 are approximately equal to the upward forces on that working fluid.

The downward forces influencing the relative height of the free surface 165 of the working fluid 162 within the interior of the constricted inertial tube 163, include, but are not limited to: the pressure of the gas within the gas pocket 161 within the interior of the upper hollow chamber 152; and the inherent weight of the working fluid 162 within the constricted inertial tube between the free surface 165 of that working fluid, and the free surface 166 of the effluent working-fluid reservoir 168.

The upward forces influencing the relative height of the free surface 165 of the working fluid 162 within the interior of the constricted inertial tube 163, include, but are not limited to, the pressure of the gas within the lower gas pocket 164 within the interior of the lower hollow chamber 154.

When the embodiment 150 accelerates, and/or is accelerated, up and down in response to the passage of waves at its buoyant upper hollow chamber 152, the inertia of the working fluid 162 within the interior of the constricted inertial tube 163 causes that working fluid to resist the vertical accelerations of the embodiment and the associated accelerations of the constricted inertial tube. Thus, in response to, and/or as a consequence of, wave action at the embodiment, the working fluid 162 within the embodiment's constricted inertial tube tends to develop oscillations 167 up and down.

When the free surface 165 of the working fluid 162 within the constricted inertial tube 163 moves upward 167 relative to its resting, and/or equilibrium, position, the nominal and/or resting volume of the gas within the upper gas pocket 161 is decreased, thereby causing the pressure of the gas within that gas pocket to increase relative to its nominal and/or resting pressure. And, as the free surface 165 of the working fluid 162 within the constricted inertial tube moves upward relative to its resting, and/or equilibrium, position, working fluid from the working-fluid reservoir 168 within the lower hollow chamber 154 is drawn up 179 into the constricted inertial tube, thereby lowering the free surface 166 of that working-fluid reservoir 168, which causes the pressure of the gas within the lower gas pocket 164 within the interior of the lower hollow chamber 154 to decrease. And, when the free surface 165 of the working fluid within the constricted frustoconical tube moves upward, while the free surface 166 of the working-fluid reservoir 168 moves downward, the resulting increase in the separation of the free surfaces of the working fluid 165 within the constricted inertial tube and the effluent working-fluid reservoir 168 causes the downward weight of the working fluid 162 within the constricted inertial tube to effectively increase.

Thus, when the free surface 165 of the working fluid 162 within the constricted inertial tube 163 moves upward 167 relative to its resting, and/or equilibrium, position, the increase in the pressure of the upper gas pocket 161, and the increase in the weight of the working fluid 162 within the constricted inertial tube 163, exert downward "pushing" forces on that working fluid 162, while the decrease in the pressure of the lower gas pocket 164 exerts a downward "pulling" force on that working fluid 162. These downward forces oppose the upward movement of the working fluid within the constricted inertial tube, and the relative strengths of those forces increase as the relative height of the free surface 165 of the working fluid 162 above its nominal and/or resting height increases. The forces opposing the upward movement of the free surface 165 of the working fluid within the constricted inertial tube, decelerate the upward movement of the working fluid 162, and eventually arrest and/or stop the upward movement of that free surface 165, thereafter causing the working fluid 162, and that free surface 165, to accelerate downward.

When the free surface 165 of the working fluid 162 within the constricted inertial tube 163 moves downward 167 relative to its resting, and/or equilibrium, position, the nominal and/or resting volume of the gas within the upper gas pocket 161 is increased, thereby causing the pressure of the gas within that gas pocket to decrease, relative to its nominal and/or resting pressure. And, as the free surface 165 of the working fluid within the constricted inertial tube moves downward relative to its resting, and/or equilibrium, position, working fluid 162 from the constricted inertial tube flows into the effluent working-fluid reservoir 168, thereby raising the free surface 166 of that effluent working-fluid reservoir, thereby causing the pressure of the gas within the lower gas pocket 164 to increase. And, when the free surface 165 of the working fluid within the constricted inertial tube moves downward, while the free surface 166 of the working-fluid reservoir 168 moves upward, the resulting decrease in the separation of the free surfaces of the working fluid 165 within the constricted inertial tube and the effluent working-fluid reservoir causes the downward weight of the working fluid 162 within the constricted inertial tube to decrease.

Thus, when the free surface 165 of the working fluid 162 within the constricted inertial tube 163 moves downward 167 relative to its resting, and/or equilibrium, position, the decrease in the pressure of the upper gas pocket 161, and the decrease in the weight of the working fluid 162 within the constricted inertial tube 163, and the increase in the upward force imparted to the working fluid 162 by the increased pressure of the gas within the lower gas pocket 164, combine to oppose the downward movement of the working fluid 162 within the constricted inertial tube, and the relative strengths of those forces increase as the relative distance of the free surface 165 of the working fluid 162 below its nominal and/or resting height increases. The forces opposing the downward movement of the free surface 165 of the working fluid within the constricted inertial tube, decelerate the downward movement of the working fluid 162, and eventually arrest and/or stop the downward movement of that free surface 165, thereafter causing that free surface 165 to accelerate upward.

Thus, the working fluid 162 within the interior of the embodiment's constricted inertial tube 163 acts as a central mass and/or weight (albeit of inconstant magnitude) operably connected and/or coupled to the upper 161 and lower 164 gas pockets which act as springs coupled to that central mass. As waves act upon the embodiment, driving it up and down, the central mass 162 oscillates up and down exchanging its kinetic and potential energies with the potential energies of the gas-pocket springs 161 and 164. The gas-pocket springs provide restoring forces to the central mass 162. And, displacements of the central mass alter the potential energies of the respective upper and lower gas-pocket springs. The embodiment 150 is in some ways analogous to a spring-mass oscillator.

Occasionally, and/or periodically, the oscillations 167 of the working fluid 162 within the constricted inertial tube 163 carry the free surface 165 of that working fluid to a position above an upper mouth 169 of the constricted inertial tube, resulting in an ejection 170 of working fluid from the interior of the constricted inertial tube onto the free surface 171 of a pressurized working-fluid reservoir 172 within the upper hollow chamber 152.

Working fluid, from the pressurized working-fluid reservoir 172, flows 173 into an inlet at an upper end of the working-fluid turbine pipe 158, whereafter that working fluid flows into and through a rotor of the embodiment's working-fluid turbine 174, thereby causing the turbine rotor to rotate, which, in turn, causes an operably-connected generator (embedded within the turbine and not visible) to produce electrical power. The working-fluid turbine 174 may comprise any structure configured to translate kinetic motion of a fluid into rotational energy. For example, the working-fluid turbine 174 may comprise a fluid or hydrokinetic turbine. In some instances, the working-fluid turbine 174 may be considered a pressure-regulator. Any kind of pressure regulator may be used in place of the working-fluid turbine 174 or used in conjunction with the working-fluid turbine 174. Pressure-regulators may also comprise a filter and/or a membrane. In some instances a working-fluid turbine pipe 158 may comprise a working-fluid turbine 174, a filter, or a working-fluid turbine 174 and a filter. More generally, a pressure regulator in the working-fluid turbine pipe 158 may be used in order to execute useful work such as, but not limited to, energy generation, filtering, purification, desalination, element extraction, or the like. The pressure regulator may maintain a pressure differential with a pressure above the pressure regulator (e.g., in the upper hollow chamber 152) that is higher than a pressure below the pressure regulator (e.g., in the lower hollow chamber 154).

Effluent working fluid flowing out of the working-fluid turbine 174 flows 175 from an outlet at a lower end of the working-fluid turbine pipe 158, and into the annular working-fluid return channel 153, whereupon it flows 176 downward through the annular working-fluid return channel. When it reaches a lower annular aperture and/or mouth 177, the working fluid flows 178 out of the annular working-fluid return channel, and flows into the effluent working-fluid reservoir 168, within the lower hollow chamber 154, thereby raising the free surface 166 of that effluent working-fluid reservoir 168.

As the embodiment 150, moves up and down in response to wave action at the buoyant upper hollow chamber 152, and as the free surface 165 of the working fluid 162 within the constricted inertial tube 163 moves 167 up and down, working fluid flows 179 back and forth between the working-fluid reservoir 168 and the interior of the constricted inertial tube, resulting in oscillatory raising and lowering of the free surface 166 of the effluent working-fluid reservoir 168, and in a corresponding oscillatory raising and lowering of the pressure of the gas within the lower gas pocket 164. While working fluid flows 179 back and forth between the working-fluid reservoir 168 and the interior of the constricted inertial tube, the net flow is upward and correlated with ejections 170 of working fluid from the constricted inertial tube and into the pressurized working-fluid reservoir 172.

The interior of the annular working-fluid return channel 153 is fluidly connected to the upper gas pocket 161 within the upper hollow chamber 152 by a pressure equalization pipe 180 through which gas flows 181 in and out between the gas pocket 161 and the interior of the annular working-fluid return channel. Thus, the hydraulic pressure of the working fluid 172 that flows into and through the working-fluid turbine 174 is related to the separation of the free surface 171 of the pressurized working-fluid reservoir 172, within the upper hollow chamber 152, and the free surface 182 of the working fluid within the annular working-fluid return channel. I.e., since both bodies of working fluid are exposed to, and pressurized by, the same gas pocket 161, the primary, if not the only, difference in their pressure potential energies is related to the vertical separation of their respective free surfaces, and is primarily, if not exclusively, a hydrostatic potential energy.

In order to reduce the buoyancy of the lower hollow chamber 154, a portion of its pressurizing lower gas pocket 164 is segregated into a complementary, secondary, and/or extended, effluent gas chamber 156. An effluent gas pocket pipe 155 fluidly connects the lower gas pocket 164, within the lower hollow chamber 154, with the extended gas pocket 183 within the complementary effluent gas chamber 156. When an effluent gas regulation valve 157 is open, gas is able to freely flow, e.g., 184 and 185, between the lower 164 and extended 183 gas pockets. When the effluent gas regulation valve is closed, then gas may not flow between the lower 164 and extended 183 gas pockets. The effluent gas regulation valve allows a control system (not shown) of the embodiment to adjust the rate at which alterations to the relative height of the free surface 166 of the effluent working-fluid reservoir 168 within the lower hollow chamber causes corresponding changes to the pressure of the gas within the lower gas pocket 164. This is analogous to altering the spring constant of the lower gas-pocket spring 164, wherein such alterations to the spring constant of the lower gas-pocket spring can be used by the embodiment's control system to alter the oscillatory behavior, and especially of the magnitude of the oscillations, of the working fluid 162 within the constricted inertial tube 163.

For example, in particularly vigorous wave conditions, when oscillations 167 of the working fluid 162 within the constricted inertial tube 163 may be, and/or become, excessive, the embodiment control system's (not shown) increase in the "stiffness" of the lower gas-pocket spring 164 (by adjusting the degree of openness or regulation valve 157) may reduce the magnitudes of the working-fluid oscillations within the constricted inertial tube and provide the embodiment's control system with a useful option to moderate such oscillations, e.g., reducing a risk of structural damage to the embodiment.

The embodiment 150 contains, incorporates, utilizes, and/or includes, a block 186, and/or slab, of cement, concrete, and/or another cementitious material, positioned within, and/or affixed to, the embodiment within a lower portion of the interior of the lower hollow chamber 154. This cement block increases the density of the embodiment so as to adjust and/or position its exterior waterline 187 to a favorable location on the embodiment, e.g., near the equator and/or widest horizontal cross-section of the upper hollow chamber 152. The cement block also lowers the embodiment's center of gravity thereby improving the positional stability of the embodiment (e.g., promoting a vertical orientation of the embodiment) when the embodiment is buffeted by waves. Other embodiments of the present disclosure, e.g., those utilizing thicker steel walls, smaller lower gas pockets 164, larger complementary effluent gas chambers 156, and/or working fluids of greater relative density, omit a cement block. Other embodiments employ another form of ballast, e.g., bulk iron ore disposed in lower hollow chamber 154.

FIG. 17B shows a side sectional view of an embodiment 150' of the current disclosure. The embodiment 150' is similar to the embodiment 150 described with respect to FIG. 17A with a modification to the effluent working-fluid return channel 153. Instead of the return channel 153 extending along an entire length of the inertial tube 163 (which may also be referred to as an injection tube 163) between the upper hollow chamber 152 and the lower hollow chamber 154, the return channel 153 ends between the upper hollow chamber 152 and the lower hollow chamber 154. For example, a bottom of the return channel 153 may be located at an approximate midpoint of the inertial tube 163.

In an embodiment, the bottom of the return channel 153 may comprise an opening 177 (or multiple openings 177) that allow the effluent working-fluid to flow 178 from the return channel 153 directly into the inertial tube 163. That is, the embodiment 150' may include a return channel 153 that flows the effluent working-fluid directly into the inertial tube 163, as opposed to into the reservoir 168 within the lower hollow chamber 154 (as is the case in embodiment 150 shown in FIG. 17A).

In an embodiment, the use of an opening 177 as opposed to an annular ring around the inertial tube 163 provides improved mechanical rigidity to the inertial tube 163. If an annular ring were used, the inertial tube 163 would be fully segmented into a lower portion that is spaced apart from an upper portion. In the embodiment 150' with one or more openings 177, an upper portion of the inertial tube 163 (above the openings 177) and a lower portion of the inertial tube 163 (below the openings 177) remain connected by portions of the inertial tube 163 (out of the plane of FIG. 17B) between the openings 177. In an embodiment, a single opening 177 is used. Other embodiments include a plurality of openings 177. For example, two or more openings 177 or four or more openings 177 may be used.

As shown, the effluent working-fluid, from the pressurized working-fluid reservoir 172, flows 173 into an inlet at an upper end of the working-fluid turbine pipe 158. The effluent working-fluid then flows into and through a rotor of the embodiment's 150' working-fluid turbine 174, thereby causing the turbine rotor to rotate, which, in turn, causes an operably-connected generator (embedded within the turbine and not visible) to produce electrical power. The effluent working-fluid flowing out of the working-fluid turbine 174 flows 175 from an outlet at a lower end of the working-fluid turbine pipe 158, and into the annular working-fluid return channel 153, whereupon the effluent working-fluid flows 176 downward through the annular working-fluid return channel 153. When the effluent working-fluid reaches one or more of the openings 177 at a bottom of the working-fluid return channel 153 (between a top and a bottom of the inertial tube 163), the effluent working-fluid flows 178 out of the annular working-fluid return channel 153, and flows into the inertial tube 163.

It is to be appreciated that the benefits provided by the inclusion of a recirculating inertial hydrodynamic pump as part of a buoyant wave energy converter (WEC) can lead to a more effective and environmentally sound production of energy products. For example, the sealed environment within the recirculating inertial hydrodynamic pump allows for the use of working fluids that can reduce corrosion, while also preventing non-naturally occurring elements, solutions, chemicals, etc. from being released into the surrounding body of water. As used herein, energy products may include, but are not limited to, fuels (e.g., hydrogen and/or carbon containing fuels), chemicals (e.g., HCl), biological species, digital goods and/or services, and the like. In some instances, "chemicals" may be used to refer to energy products that are fuels (e.g., hydrogen gas) and/or non-fuel chemistries (e.g., HCl). Since the WEC may be located at sea, the energy products may be transported back to land for consumption, use, storage, or the like. Examples of energy product generation at the WEC and transport schemes or processes are described with respect to FIGS. 19-32.

Figure 19:
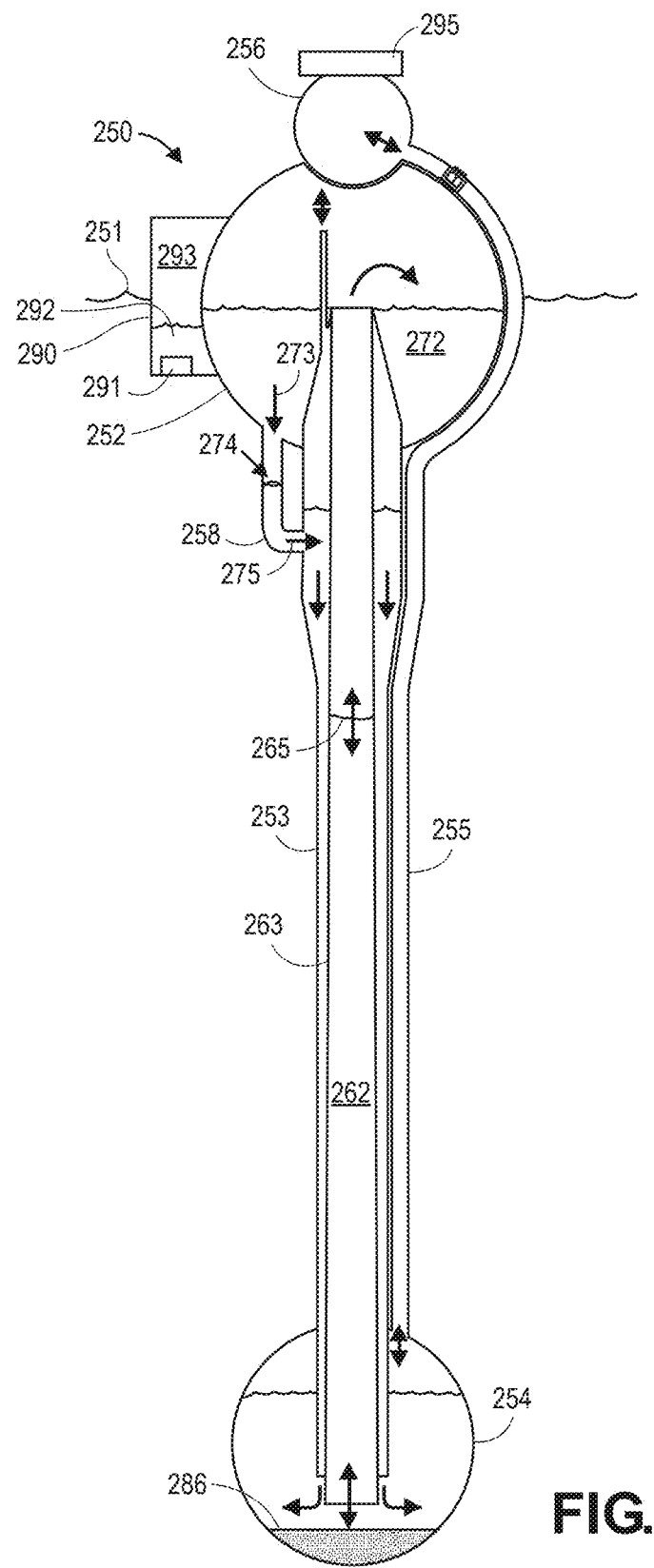
FIG. 19 is a cross-sectional view of a fourth embodiment of the current disclosure.

FIG. 19 shows a side sectional view of an embodiment 250 of the current disclosure. The embodiment 250 floats adjacent to an upper surface 251 of a body of water over which waves pass. The embodiment 250 in FIG. 19 may be similar to the embodiment 150 in FIG. 17, with the addition of an energy product generation chamber 290. For example, the embodiment 250 may comprise an upper hollow chamber 252 that is fluidly coupled to a lower hollow chamber 254 by an inertial tube 263. An annular fluid return channel 253 may surround the inertial tube 263. A working-fluid turbine pipe 258 may fluidly couple the upper hollow chamber 252 to the annular fluid return channel 253. A pressure regulator 274 (such as any pressure regulator described in greater detail herein) may be provided along the working-fluid turbine pipe 258. In a particular instance, the pressure regulator 274 is a turbine configured to generate electrical energy. A ballast 286 may be coupled to a lower half of the embodiment 250. An effluent gas chamber 256 may be provided above the upper hollow chamber 252, and the effluent gas chamber 256 may be fluidly coupled to the lower hollow chamber 254 by an effluent pipe 255. The operation of the embodiment 250 may be similar to the operation of the embodiment 150 described above. More generally, oscillation of the embodiment 250 in response to waves in the body of water may generate a pressure differential across the pressure regulator 274 in order to drive working fluid 272 across the pressure regulator 274 (as indicated by arrows 273 and 275) in order to provide useful work, such as electrical energy generation.

More particularly, pressure regulator 274 may comprise a hydropower turbine, such as a reaction turbine (e.g., a propeller turbine, a bulb turbine, a straflo turbine, a tube turbine, a Kaplan turbine, a Francis turbine, or a kinetic turbine) or an impulse turbine (e.g., a Pelton turbine, or a cross-flow turbine). In some instances, a single turbine is used for the pressure regulator 274, and in other instances, multiple turbines arranged in series are used for the pressure regulator 274. While a single pressure regulator 274 is shown in the embodiment 250, embodiments may include a plurality of pressure regulators 274.

The pressure regulator 274 may be coupled to an electrical generator (not shown). The pressure regulator 274 provides rotational energy which is converted into electrical energy by the electrical generator. The electrical energy may be stored (e.g., in a battery) or consumed for one or more purposes, which will be described in greater detail herein. While an electrical generator is one option, other generator types may also be used. For example, generators described herein may include any generator, alternator, other mechanism, device, and/or component that converts energy from one form into another. In some instances, one or more of the energy generation systems may be replaced with a magnetohydrodynamic (MHD) generator, which generates electricity directly from a flow of liquid without the need for connection with a turbine and associated rotating shaft. That is, a combination of a turbine connected to a generator by a shaft can be replaced, in some instances and with an appropriate choice of working fluid, with a MHD generator.

The embodiment 250 may generate significant amounts of energy that needs to be stored or used in a constructive manner. In some instances, energy generated from embodiment 250 may be stored in a battery. The battery may provide an accessible energy source in order to run one or more electrical components integrated into the embodiment. Alternatively (or in addition), the embodiment 250 may provide a material conversion process in order to "store" energy in a more transportable form. For example, energy generated by embodiment 250 can be stored in the form of an energy product, such as those described in greater detail herein.

In the case of the energy product being hydrogen gas, an electrolyzer 291 may be provided on the embodiment 250. The electrolyzer 291 may be fluidly coupled to a water source, such as water 292 within a chamber 290. Water 292 may be deionized, filtered, and/or otherwise purified. Water 292 may be provided to the embodiment 250 as a precursor material. Energy generated by the embodiment 250 may be consumed by the electrolyzer 291 to convert water into oxygen and hydrogen. The hydrogen gas may be stored in the internal volume 293 of the chamber 290, or any other confined space associated with the embodiment 250. The oxygen gas may be vented to the atmosphere. After hydrogen gas is produced, the gas may be collected (i.e., removed or offloaded from the embodiment 250) periodically be an external vessel, ship, air-ship, submersible, drone, or any other vehicle, as will be described in greater detail herein.

Embodiment 250 may be an autonomous device with the ability to move and/or navigate in a controlled manner about the body of water. Propulsion of the embodiment 250 may be driven through one or more different mechanisms using active and/or passive systems. One or more rudders (not shown) can be coupled to the embodiment 250 in order to provide directional control, rotational control, and/or the like to the embodiment 250.

In some embodiments, propulsion of the embodiment 250 may be provided through one or more active propulsion devices. For example, propellers or the like may be used in some instances. Energy to drive the active propulsion devices may be obtained through the energy generation of the embodiment 250, or from batteries that were charged through the wave-energy generation of the embodiment 250. In other instances, hydrogen or other gasses generated on the embodiment 250 can be consumed (e.g., through the use of a fuel cell) in order to power active propulsion devices.

The embodiment 250 may include an enclosure 295. The enclosure 295 may be a water proof chamber for securing one or more electrical components. For example, a computing system, a positioning system, and/or a communications system may be provided in the enclosure 295. The computing system may provide one or more processors and associated hardware and/or software that enables control of the embodiment 250. For example, the computing system may control power generation, such as by controlling flow rates of water to the energy generation device 290. The positioning system may include a GPS, a compass, an accelerometer, a gyroscope, or any other suitable navigational system. The positioning system may control propulsion and steering systems in order to navigate the embodiment 250. The communications system may include an antenna, a receiver, and associated circuitry, hardware, and/or software. The communications system may provide a communication link to external systems, other waver-energy generation systems, or the like. The systems described in the enclosure 295 on the embodiment 250 are exemplary in nature, and it is to be appreciated that many different systems, control apparatuses, and/or the like may be provided in the enclosure 295.

As will be described in greater detail below, the energy products produced by the embodiment 250 may be subsequently delivered to shore (or near shore) for use, storage, or the like. The energy product may be transported to shore through one or more vessels. In some instances, the energy product is transported to shore without further modification. For example, a hydrogen gas may be generated by the embodiment 250, and the hydrogen gas is transported to shore. In other instances, the energy product may be used to generate a different energy product. For example, the energy product may be a precursor that is used in the generation of an alternative energy product (e.g., an energy product that has a higher energy density). In one example, a hydrogen energy product may be converted into methanol or ammonia through a chemical reaction with one or more other precursor gasses. This additional conversion may occur at the embodiment 250 or during transport of the energy product to shore.

Figure 20:
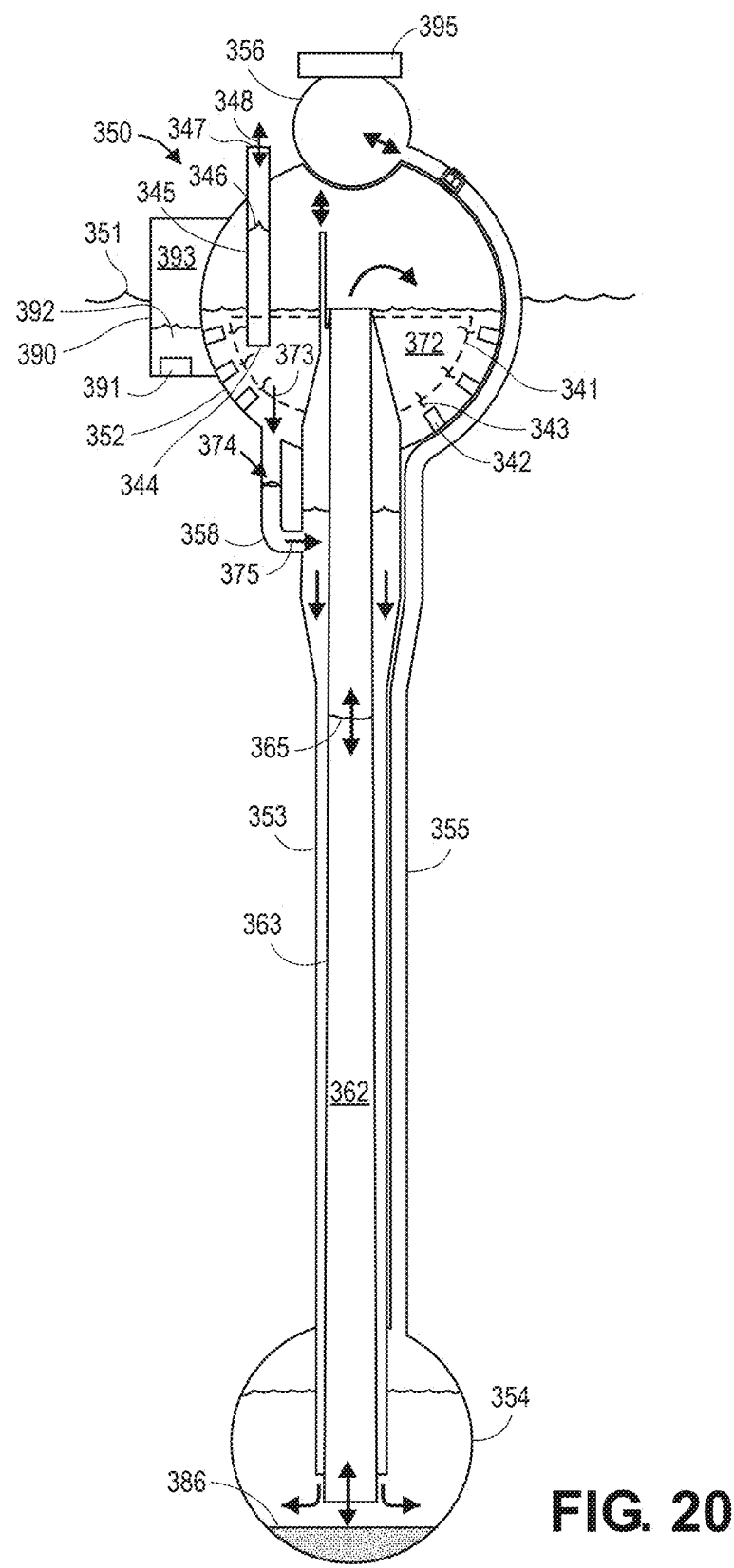
FIG. 20 is a cross-sectional view of a fifth embodiment of the current disclosure.

FIG. 20 shows a side sectional view of an embodiment 350 of the current disclosure. The embodiment 350 may be similar to the embodiment 250 described above, with the exception of the energy product that is being generated or produced by the embodiment 350. For example, The embodiment 350 floats adjacent to an upper surface 351 of a body of water over which waves pass. The embodiment 350 may comprise an upper hollow chamber 352 that is fluidly coupled to a lower hollow chamber 354 by an inertial tube 363. An annular fluid return channel 353 may surround the inertial tube 363. A working-fluid turbine pipe 358 may fluidly couple the upper hollow chamber 352 to the annular fluid return channel 353. A pressure regulator 374 (such as any pressure regulator described in greater detail herein) may be provided along the working-fluid turbine pipe 358. In a particular instance, the pressure regulator 374 is a turbine configured to generate electrical energy. A ballast 386 may be coupled to a lower half of the embodiment 350. An effluent gas chamber 356 may be provided above the upper hollow chamber 352, and the effluent gas chamber 356 may be fluidly coupled to the lower hollow chamber 354 by an effluent pipe 355. The operation of the embodiment 350 may be similar to the operation of the embodiment 150 described above. More generally, oscillation of the embodiment 350 in response to waves in the body of water may generate a pressure differential across the pressure regulator 374 in order to drive working fluid 372 across the pressure regulator 374 (as indicated by arrows 373 and 375) in order to provide useful work, such as electrical energy generation. Embodiment 350 may also comprise an enclosure 395 with a computing system or the like. In the case of the generation of hydrogen as one energy product, an electrolyzer 391 that is within water 392 in a chamber 390 may be used to convert the water 392 into oxygen and hydrogen. The hydrogen gas may be stored in the internal volume 393 of the chamber 390, and the oxygen gas may be vented to the atmosphere.

However, instead of producing only a fuel or chemical as an energy product, the embodiment 350 may produce a biological product. The biological product may comprise one or more of marine algae (e.g., micro-alae and/or macro-algae), seaweed, other marine plants, fish, krill, or other marine organisms. More specifically, electrical power generated through the operation of a pressure regulator 374 can be used to power lights 342, lamps, thermal devices (e.g., heaters), and/or the like. For example, lights 342 may be light emitting diode (LED) lights or any other suitable source for generating electromagnetic radiation 343. The electromagnetic radiation 343 can be consumed by the biological product within the embodiment 350 in order to induce growth of the biological product.

As shown in FIG. 20, the lights 342 may be arranged, attached, or otherwise coupled to interior surfaces of the upper hollow chamber 352. While shown as being coupled directly to interior wall surfaces, other embodiments may comprise suspending lights 342 within an interior volume of the upper hollow chamber 352. The lights 342 in FIG. 20 are all shown as being submerged in water 372. Though, in other embodiments, lights 342 may be provided above the surface of the water 377 within the upper hollow chamber 352.

In one instance, designed to promote the growth of biological products (e.g., algae and/or other marine based plant life), an approximately circular net 341 spans, and/or is adjacent to, an approximately flow-normal and/or horizontal cross-section of the water 342, adjacent to the surface of the water 372. Net 342 entrains the biological product within the lower portion of the water 372 thereby tending to reduce, if not prevent, the outflow and/or loss of that macroalgae through the pressure regulator 374 in the working-fluid turbine pipe 358. In other embodiments, other structures (e.g. a sieve, catchment, mesh, or grating) are positioned in the path of water flow to the pressure regulator 374 in order to prevent outflow or loss of biological products.

Periodically, biological products may be removed from the water 372 by a ship, platform, or other vessel. A ship may insert a suction tube into and through an access tube 345. Once inserted into and through access tube 345, an inserted suction tube can be positioned near the bottom of the embodiment's reservoir of water 372 and suck out a portion of the biological product therein. A complementary access tube (not shown), and/or a complementary channel within a single access suction tube 345, can return water to the reservoir while biological products, are being removed from the reservoir of water 372, thereby maintaining and/or preserving the original level of the water 372 in the reservoir.

The access tube 372 allows algae, water, nutrients, and/or other materials, to be added to, and/or withdrawn from, the reservoir of water 372 when that reservoir is otherwise sealed inside the upper hollow chamber 352. Because the access tube is open to the atmosphere (as indicated by arrow 348) at its upper mouth 347, and open to the water and biological product in the water 373 at its lower mouth 344, water 372 from the reservoir is free to rise up within the algae access tube 345. Because of the pressure of the air trapped within the air pocket of the interior of the upper hollow chamber 352, and the corresponding pressure of the water 372, the surface 346 of the water within the access tube 345 tends to rise to a height above the surface of the water 372 within the reservoir whose head pressure approximately corresponds to the pressure of the air within upper hollow chamber 352. Though, in other embodiments, the access tube 345 may be sealed in order to maintain an environmental seal within the embodiment 350.

The scope of the present disclosure includes a complementary ship to periodically harvest the biological products grown within the embodiment, as well as the facilities on a shore, floating platform, and/or other ship where the harvested algae are processed and/or stored, as well as a method for harvesting biological products wherein: a wave energy converter of a type herein disclosed is deployed on a body of water; electrical energy produced by said wave energy converter operating in waves is used to power LEDs, or other lamps, or other sources of light emissions, that are mounted on, within, inside, or outside, of said wave energy converter, and/or LEDs, or other lamps, or other sources of light emissions, that are suspended from walls, surfaces, and/or structural members, within, inside, or outside, of said wave energy converted; biological products are permitted to grow in an enclosure, cavity, or vicinity of said wave energy converter using light from said lamps as a source of metabolic energy; said biological products (or products or byproducts produced therefrom, e.g. algal oil, fish oil, etc.) is transferred to a ship or other floating vessel; said ship or floating vessel transfers said biological products (or products or byproducts produced therefrom, e.g. algal oil, fish oil, etc.) to a shore facility for processing and/or storage.

The aquaculture configuration embodiment illustrated in FIG. 20 may also include fish within the water 372. If one or more species of fish that are able to eat and/or consume the type(s) of algae being grown within the embodiment are selected and included within the respective growth areas prior to each growth cycle, then a portion of those fish may be harvested along with whatever algae remains uneaten. The scope of the present disclosure includes a method for harvesting fish wherein: a wave energy converter of a type herein disclosed is deployed on a body of water; electrical energy produced by said wave energy converter is used to power LEDs, or other lamps, or other sources of light emissions, that are mounted on, within, inside, or outside, of said wave energy converter, as well as LEDs, or other lamps, or other sources of light emissions, that are suspended from walls, surfaces, and/or structural members, within, inside, or outside, of said wave energy converter; algae are permitted to grow in an enclosure, cavity, or vicinity of said wave energy converter using light from said lamps as a source of metabolic energy; fish or other marine organisms are permitted to grow in an enclosure, cavity, or vicinity of said wave energy converter, feeding, at least in part, on said algae as a source of metabolic energy; said fish or other marine organisms are transferred to a ship or other floating vessel; said ship or floating vessel transfers said fish and/or other marine organisms (or products or byproducts produced therefrom, e.g. fish meal or fish oil) to a shore facility for processing and/or storage.

The scope of the present disclosure includes embodiments utilizing water reservoir lamps and/or inertial water tube lamps emitting light of any single wavelength, any range of wavelengths, and/or any combinations of wavelengths or ranges of wavelengths.

Figure 21:
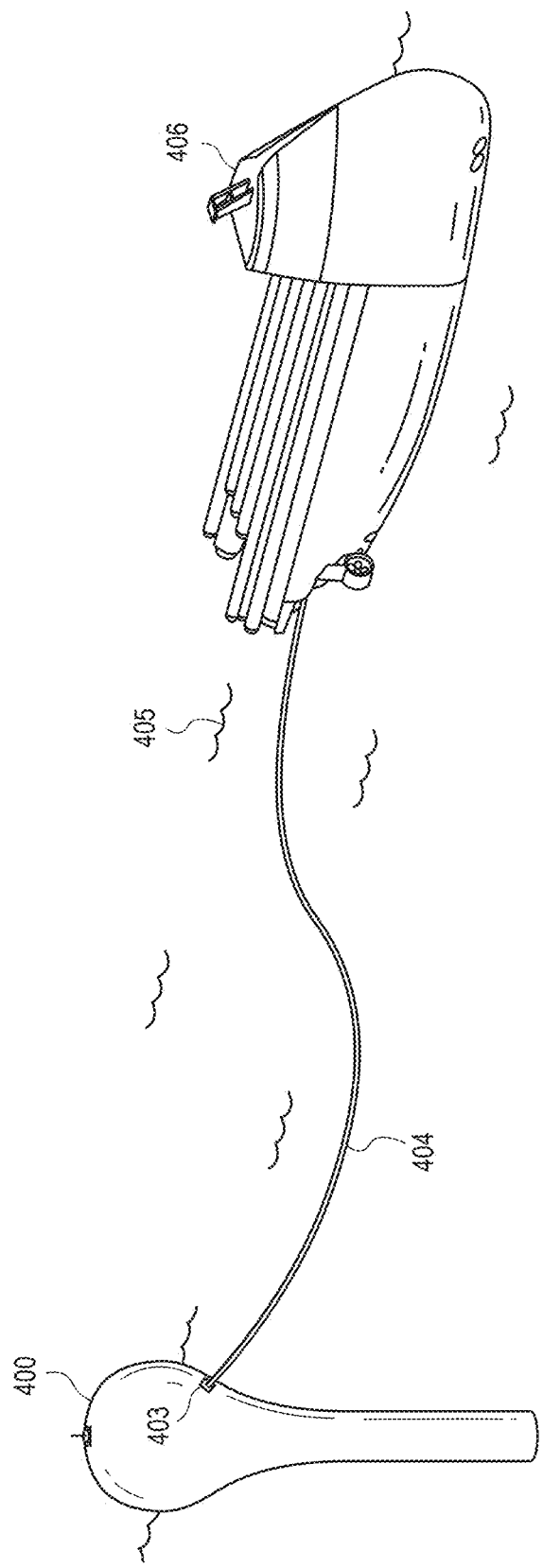
FIG. 21 is a perspective system view of a sixth embodiment of the current disclosure.

Referring now to FIG. 21 a perspective side view of a system including a WEC 400 that is fluidically coupled to a vessel 406 is shown, in accordance with an embodiment. In an embodiment, the WEC 400 may be similar to any of the embodiments described in greater detail herein. For example, the WEC 400 may comprise a recirculating inertial hydrodynamic pump. A WEC 400 obtains, extracts, harvests, receives, and/or collects, energy from waves moving across the surface 405 of a body of water on which the WEC 400 floats. A portion of the energy that the WEC 400 extracts from the passing waves is converted into electrical power by a water turbine (not visible) and generator (not visible). A portion of the generated electrical power is used to generate an energy product (e.g., a liquid fuel, a gas fuel, a chemical, a biological product, or the like). For example, a water electrolysis apparatus (not visible) inside the WEC 400 may be used for the conversion of a portion of water contained in a reservoir within the WEC 400 (not visible) into hydrogen gas. A portion of the synthesized hydrogen gas is captured within a hydrogen reservoir (not visible) within the WEC 400.

Periodically, a vessel 402 approaches the WEC 400 and positions itself near to the WEC device 400. When sufficiently proximate to the WEC 400, the vessel 400 deploys a hose connection remotely-operated vehicle (hose connection ROV) 403 that is attached to a first end of a transfer hose 404. The hose connection ROV 403 pulls the transfer hose 404 to the WEC 400. The hose connection ROV 403 attaches itself translatably to the hull of the WEC 400 and moves itself across the WEC hull until it is positioned above and/or over a port (not visible) of the WEC 400. The hose connection ROV 403 then connects itself, and the attached hydrogen transfer hose, to the hydrogen port of the WEC 400 thereby permitting the energy product to be removed, and/or to flow, from the WEC 400 to the vessel 406 where it is then stored within one of more of the storage containers (not shown) of and/or on the vessel 406. In other embodiments, a passive retractable offtake system is used to couple the hose 404 to the port on the WEC 400. In some instances, the transfer of energy product from the WEC 400 to the vessel 406 is passive (e.g., if a pressure differential drives product from the WEC 400 to the vessel 406). In other instances, a pump, winch, or other mechanical force can be used to actively transport energy product from the WEC 400 to the vessel 406.

Figure 28:
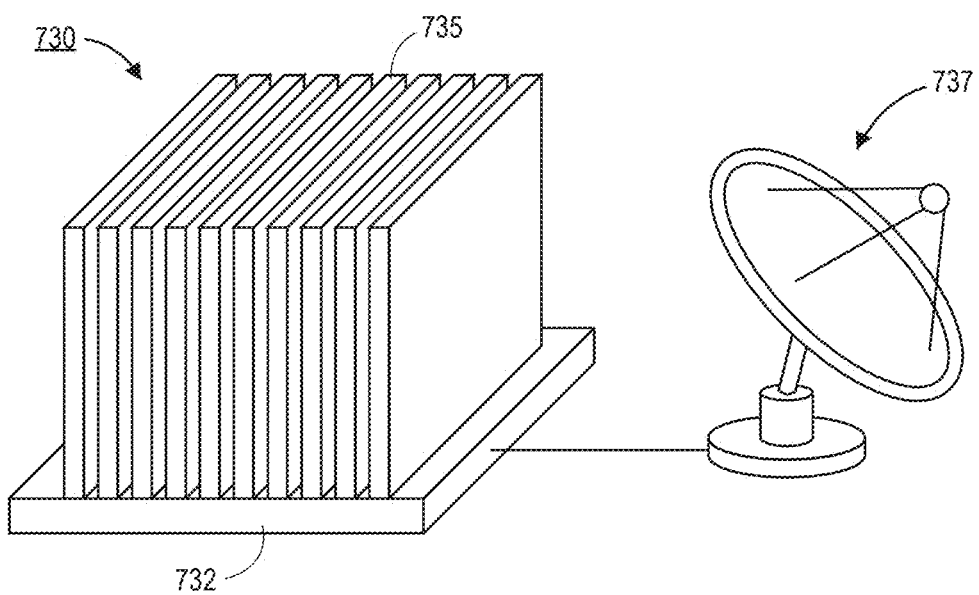
FIG. 28 is a perspective view of a server system that may be integrated with any of the embodiments of the current disclosure.

The vessel 406 in FIG. 28 is shown as a boat, but it is to be appreciated that any suitable transport vehicle may be used to offload energy product from the WEC 400. For example, a submersible vehicle, an aerial vehicle (e.g., helicopter, plane, dirigible airship, drone, etc.), or the like may also be used to offload energy product from the WEC 400. In an embodiment, the vessel 406 may transport the energy product directly to the shore, or the vessel 406 may be an intermediate transport that delivers the energy product to a second vessel, or a platform within the body of water on which the WEC 400 floats.

Figure 22:
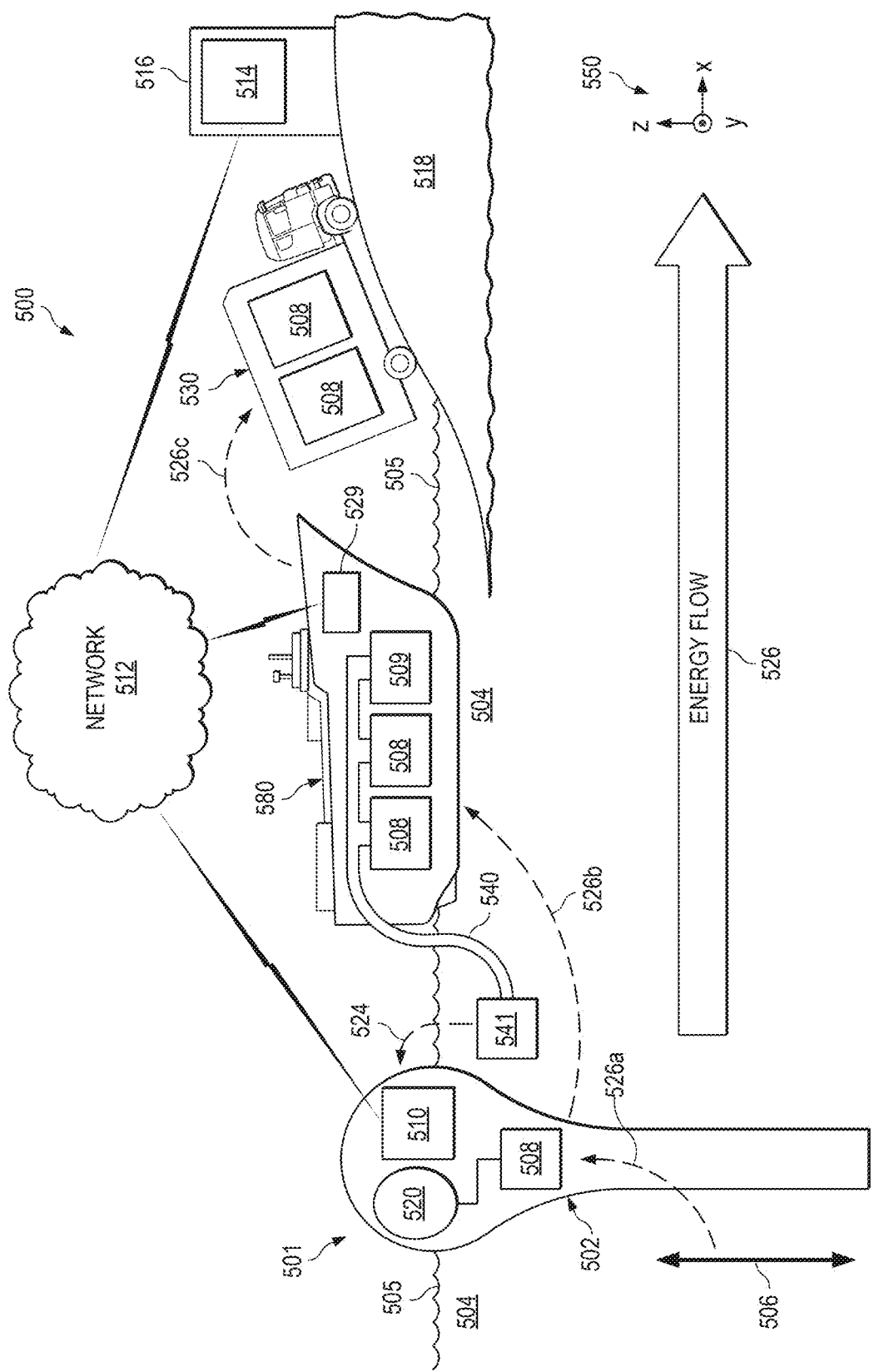
FIG. 22 is a schematic energy flow diagram of a seventh embodiment of the current disclosure.

Referring now to FIG. 22, a schematic diagram of a wave energy harvesting system 500 is shown. The wave energy harvesting system 500 may include a first free-floating body 501 and a second free-floating body 580 which may transiently couple to one another while floating on a surface 505 of a body of water 504. In an example embodiment, the first free-floating body 501 may be configured as a wave engine 501 (e.g., a WEC including a recirculating inertial hydrodynamic pump, such as those described herein) and the second free-floating body 580 may be a storage vessel 580, such as a tanker ship 580. In some embodiments, the wave engine 501 may include a receiving port 520 operable to receive a conduit assembly 541 in fluidic communication with a conduit 540 from the storage vessel 580 and thereby fluidly couple the wave engine 501 to the storage vessel 580 via the conduit 540 for transfer of one or more fluids therebetween. While fluidic communication and coupling between the wave engine 501 and the storage vessel 580 is described in greater detail with respect to FIG. 22, it is to be appreciated that non-fluid products may also be transmitted between the wave engine 501 and the storage vessel 580.

In an embodiment, the fluidic communication (or fluidic coupling) between the wave engine 501 and the storage vessel 580 may be enabled through the use of automated, autonomous, and/or passive systems. In some embodiments, for instance, the conduit assembly 541 may include one or more fluid nozzles (not shown at FIG. 29) operable to emit one or more fluid streams to direct the conduit assembly 541 to the receiving port 520.

A set of Cartesian coordinate axes 550 is shown in FIG. 22 for contextualizing positions of the various components of the wave energy harvesting system 500. Specifically, x-, y-, and z-axes are provided which are mutually perpendicular to one another, where the x- and z-axes define a plane of the schematic diagram shown in FIG. 22 and the y-axis is perpendicular thereto. In some embodiments, a direction of gravity may be parallel to and coincident with a negative direction of the z-axis.

Though exemplified herein in the context of wave engines, the first free-floating body 501 may be configured as any free-floating body capable of self-propulsion, e.g., by extracting energy from stored fuel, inducing a flow of pressurized water, and/or harnessing one or more ambient environmental forces, so as to translate along the surface 505 of the body of water 504. For example, the first free-floating body 501 may be a ship 501 (such as a deployment ship, a tanker ship or other storage vessel, or another transport vessel), a buoy 501, a wind turbine 501, an offshore platform 501, such as a data center, etc.

In embodiments where the first free-floating body 501 is configured as the wave engine 501 similar to embodiments disclosed herein, a working fluid may oscillate within the wave engine 501 in response to upward and downward motion 506 (e.g., in a positive direction of the z-axis and the negative direction of the z-axis, respectively) of water waves. As described in greater detail herein, the upward and downward motion 506 may induce the working fluid to pass through a pressure regulator (e.g., a turbine), and energy from which may be captured and converted to an energy product 508 (as indicated by a dashed arrow 526a). The energy product 508, for example, may include one or more of an electrolysis product or other fuel/chemical, such as $H_2$ gas, HCl, etc., removed carbon, minerals, a biological product, digital goods, or an executed computational algorithm, such as, but not limited to a proof-of-work mechanism for a cryptocurrency, a trained machine learning algorithm, or the like.

In some embodiments, the first free-floating body 501 may include a first onboard controller or other computing device 510 and/or the second free-floating body 580 may include a second onboard controller or other computing device 529, the first and second onboard controllers 510, 529 each including non-transitory memory on which executable instructions may be stored. The executable instructions may be executed by one or more processors of the first and second onboard controllers 510, 529 to respectively perform various functionalities of the first and second free-floating bodies 501, 580. Accordingly, the executable instructions may include various routines for operation, propulsion, maintenance, tracking, and testing of the first and second free-floating bodies 501, 580. The first and second onboard controllers 510, 529 may be communicably coupled to various components (e.g., valves, power supplies, etc.) of the first and second free-floating bodies 501, 580 to command actuation and use thereof (wired and/or wireless communication paths between the first and second onboard controllers 510, 529 and the various components are omitted from FIG. 22 for clarity). For instance, the first onboard controller 510 may command actuation of one or more first coupling elements annularly distributed on the receiving port 520 and the second onboard controller 529 may command actuation of one or more second coupling elements annularly distributed on the conduit assembly 541 so as to selectively engage and disengage the one or more first coupling elements with one or more second coupling elements (first and second coupling elements not shown at FIG. 22). Though, it is to be appreciated that passive self-alignment may be enabled through the use of a retractable offtake system.

In certain embodiments, the first and second onboard controllers 510, 529 may be communicably coupled to a remote controller or computing device 514 via a wireless network 512. The various controllers 510, 514, 529 may be configured in a substantially similar manner to one another, excepting, in some examples, one or more modifications or differences for a given use case. For example, the remote controller 514 may be positioned so as to be accessible to an operator of the wave energy harvesting system 500, e.g., on a ship or in a physical structure 516 on land 518 (as illustrated in FIG. 22). As such, even when one or both of the first and second free-floating bodies 501, 580 are not geographically located within a national or subnational jurisdiction, the one or both of the first and second free-floating bodies 501, 580 may nevertheless be in continuous (e.g., substantially uninterrupted) or periodic communication with the remote controller 514 which may be geographically located within a national or subnational jurisdiction (e.g., on the land 518).

In some embodiments, because the remote controller 514 may be configured for use by the operator, the remote controller 514 may include a user interface at which the operator may enter commands or otherwise modify operation of the wave energy harvesting system 500. The user interface may include various components for facilitating operator use of the wave energy harvesting system 500 and for receiving operator inputs (e.g., requests to direct the conduit assembly 541 to the receiving port 520), such as one or more displays, input devices (e.g., keyboards, touchscreens, computer mice, depressible buttons, mechanical switches, other mechanical actuators, etc.), lights, etc. In additional or alternative embodiments, one or both of the first and second onboard controllers 510, 529 may be configured with the user interface as described hereinabove.

An overall energy flow 526 of the wave energy harvesting system 500 is schematically depicted in FIG. 22, in which energy captured at the first free-floating body 501 from water induced therethrough by the upward and downward motion 506 of the water waves (as indicated by the dashed arrow 526a) may be converted to the energy product 508 and transferred to the second free-floating body 580 (as indicated by a dashed arrow 526b) and then transferred from the second free-floating body 580 to a land-based vehicle 530 (as indicated by a dashed arrow 526c) to be transported to a storage facility and/or an end user for consumption. For example, in some embodiments, the wave energy harvesting system 500 may include a plurality of nodes including a plurality of first free-floating bodies 501, one or more second free-floating bodies 580 to transport a plurality of energy products 508 from the plurality of first free-floating bodies 501 to the land 518, and one or more land-based vehicles 530 to transport the plurality of energy products 508 from the one or more second free-floating bodies 580 to the storage facility and/or the end user. In other instances, the energy products 508 may be directly transported from the second free-floating body 580 to a storage facility and/or end user on the land 518 or within a certain distance of the land 518 (e.g., up to 100 kilometers from land, up to 40 kilometers from land, up to 1 kilometer from land, up to 500 meters from land, or up to 50 meters from land). Though storage facilities or consumption locations may be further from land in other embodiments.

In an example embodiment, the energy product 508 may be a fluid (e.g., a liquid or a gas) which is transferred from the first free-floating body 501 to the second free-floating body 580 via the conduit 540, the conduit 540 being configured to transiently fluidly couple an internal reservoir of the second free-floating body 580 to an internal reservoir of the first free-floating body 501 via one or more internal passages extending at least a length of the conduit 540 (internal reservoirs and internal passage(s) not shown at FIG. 22). In certain embodiments, the conduit 540 may include a plurality of internal passages, each of which may convey a different fluid between the first and second free-floating bodies 501, 580. As an example, the conduit 540 may include a first internal passage configured to supply an energy product precursor 509 (e.g., an electrolysis reactant, such as deionized water) from the second free-floating body 580 to the first free-floating body 501 so as to replace the energy product 508 being transferred to the second free-floating body 580. Accordingly, in such an example, the conduit 540 may further include a second internal passage configured to siphon the energy product 508 (e.g., an electrolysis product, such as hydrogen gas) from the first free-floating body 501 to the second free-floating body 580. As such, the overall energy flow 526 may be maintained by periodically (e.g., once per week) replenishing a capacity of the first free-floating body 501 to convert captured energy into a chemical energy product.

In some embodiments, the adjustments to the position of the conduit assembly 541 may be executed based on a manual operator input, e.g., at the user interface of the remote controller 514. In additional or alternative embodiments, the adjustments to the position of the conduit assembly 541 may be automatically adjusted, e.g., based on feedback from one or more sensors and/or data received via the wireless network 512. As an example, one or both of the first and second free-floating bodies 501, 580 may include an accelerometer (e.g., an inertial measurement unit; not shown) configured to gather changes in local positional data, e.g., resulting from water wave motions. As an additional or alternative example, one or both of the first and second free-floating bodies 501, 580 may include a global positioning system (not shown) configured to gather geographic positional data. As an additional or alternative example, one or both of the first and second free-floating bodies 501, 580 may include a wind speed sensor (not shown) configured to measure wind speed. As an additional or alternative example, such data (e.g., the positional data and/or the wind speed) may be received via the wireless network 512, in addition to other data such as meteorological data (e.g., water wave height, direction of water wave propagation, water wave period, weather, etc.). In some embodiments, directions and magnitudes of applied forces may be inferred based on the feedback from the one or more sensors and/or the data received via the wireless network 512, such that specific operational parameters (e.g., the one or more continuously adjustable parameters) may be adjusted responsive such that changes in individual applied forces may be accounted for with specificity. Though, the use of a passive retractable offtake system may allow for a more passive and precise fluidic coupling between the free-floating bodies 501 and 508, even in the view of wave conditions, wind conditions, or other environmental factors.

Figure 24:
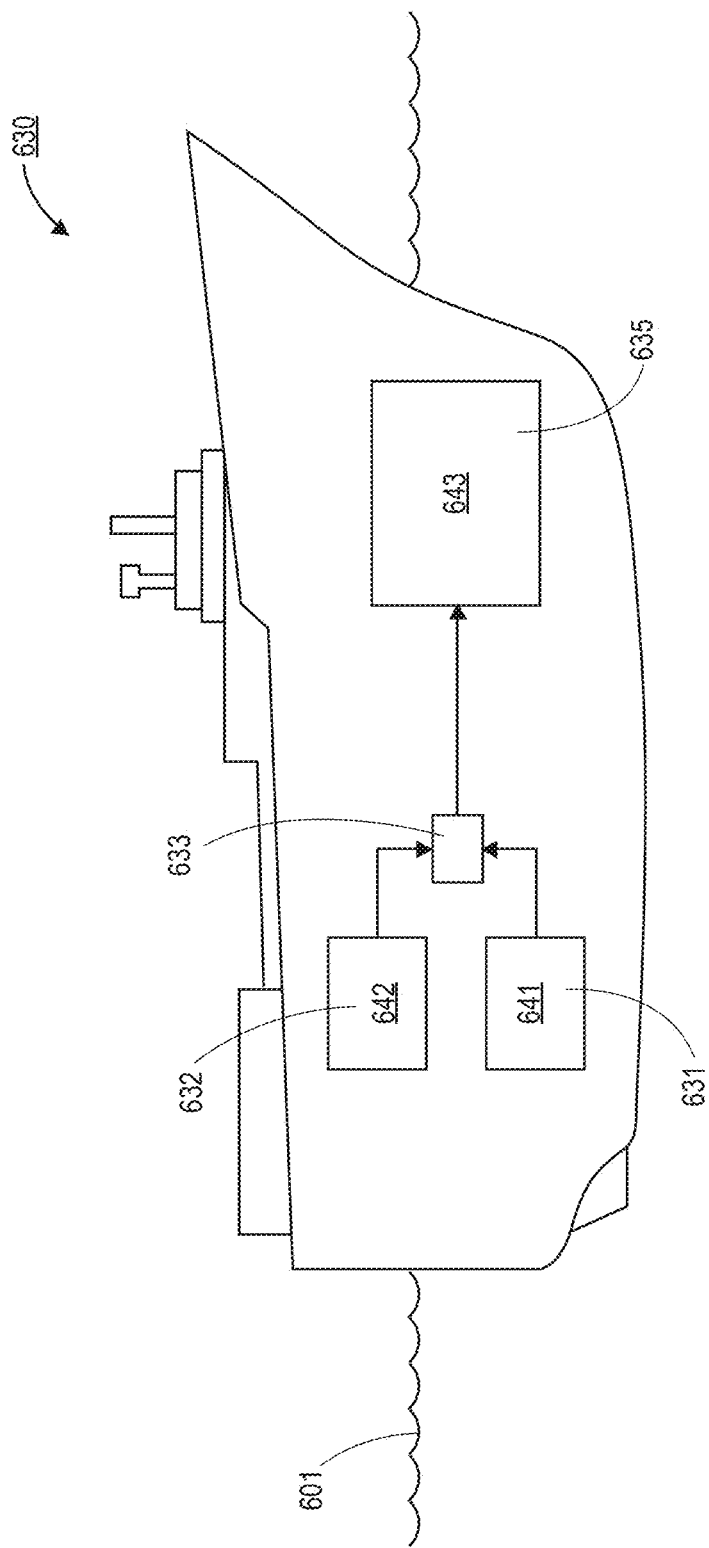
FIG. 24 is a schematic side view of a ninth embodiment of the current disclosure.
Figure 25:
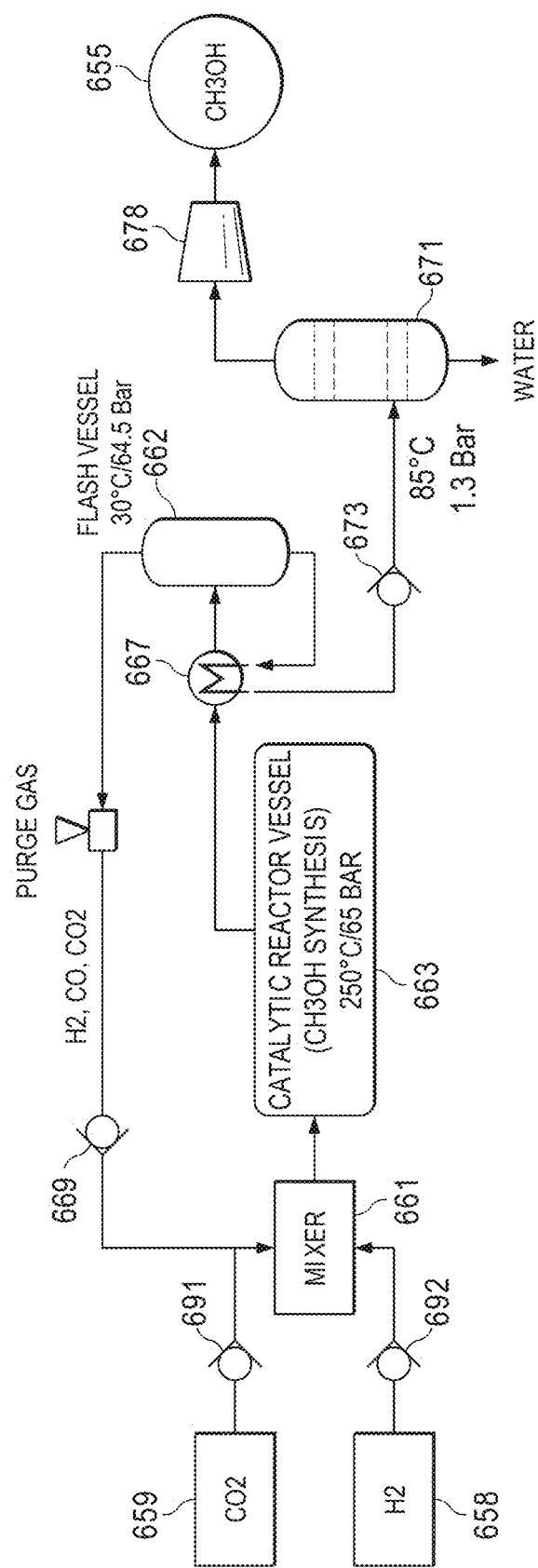
FIG. 25 is a process flow diagram of a chemical process of a tenth embodiment of the current disclosure.

In the embodiment shown in FIG. 22, the energy product 508 is generated at the first free-floating body 501 and subsequently transported to land 518. That is, the energy product 508 may not undergo any subsequent processing after it has been produced. However, in other embodiments, the energy product 508 may be further processed in order to generate an alternative product before reaching land 518 (or near land). For example, the initial energy product 508 may be filtered, compressed (e.g., from gas to liquid), used in a reaction as a precursor, or otherwise processed before reaching land 518 or near land. For example, hydrogen gas may be used as a precursor in order to generate a more energy dense substance or fuel, such as methanol, or algae can be processed into algae oil. These processing operations may be implemented on the first free-floating body 501, on the second free-floating body 580, or on a combination of both the first free-floating body 501 and the second free-floating body 580. Examples of such processing are shown in FIGS. 23-25.

Figure 23:
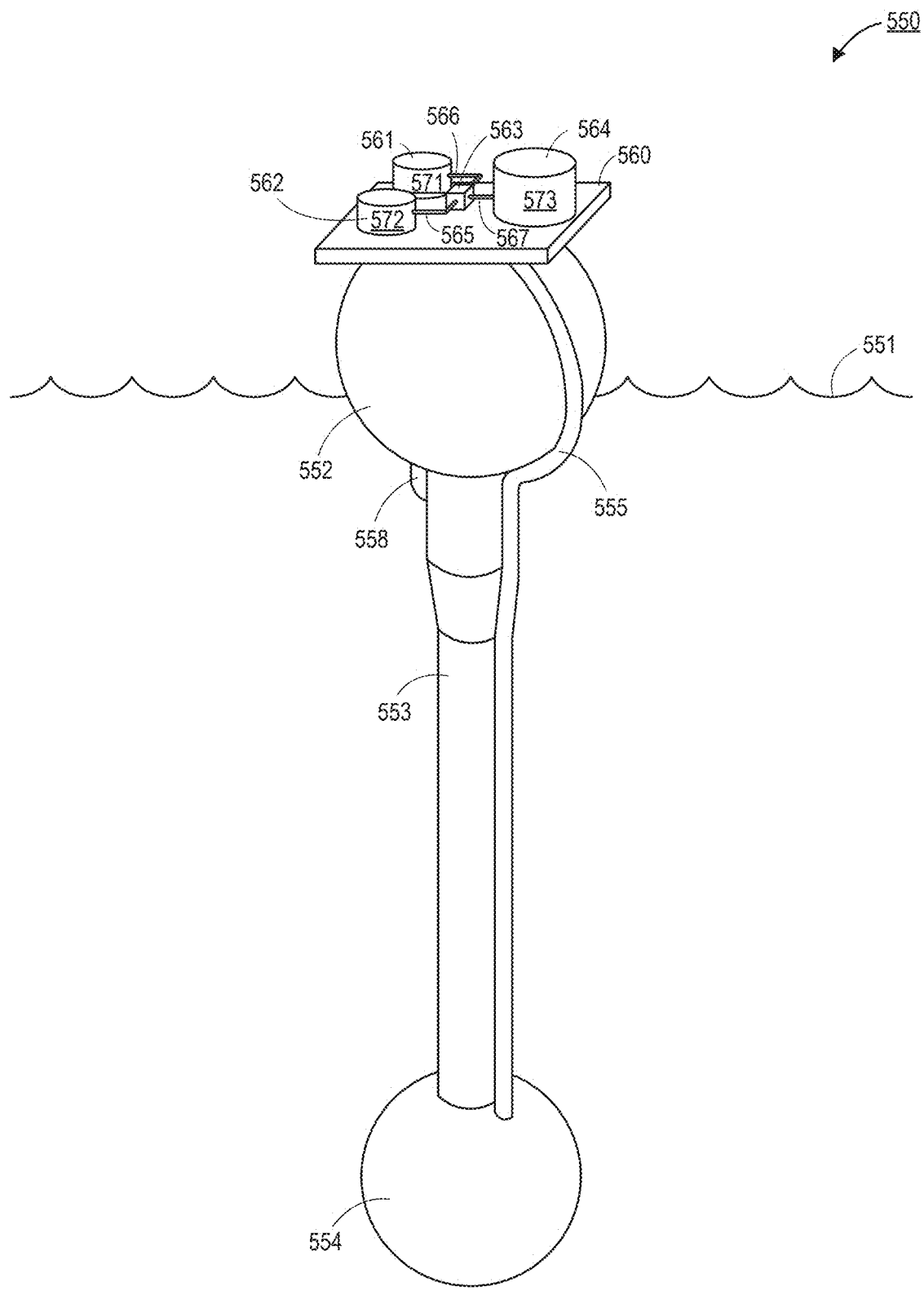
FIG. 23 is a side perspective view of a eighth embodiment of the current disclosure.

Referring now to FIG. 23 a side perspective view of an embodiment 550 with a recirculating inertial hydrodynamic pump and an integrated processing plant on a platform 560 is shown, in accordance with an embodiment. The embodiment 550 floats adjacent to an upper surface 551 of a body of water over which waves tend to pass. The embodiment 550 comprises an upper hollow chamber 552. In an embodiment a central inertial tube (not visible) is coupled to the upper hollow chamber 552. A lower hollow chamber 554 may be provided at a bottom of central inertial tube. An annular return channel 553 may surround the central inertial tube. A turbine pipe 558 coupling the upper hollow chamber 552 to the annular return channel 553 may comprise a pressure regulator (such as a turbine or the like), which is not visible in FIG. 23. A gas effluent pipe 555 may fluidly couple the lower hollow chamber 554 to an upper effluent gas chamber (not visible in FIG. 23). The recirculating inertial hydrodynamic pump of embodiment 550 may be similar in configuration and operation to any of the embodiments described in greater detail herein. Further other inertial hydrodynamic pump architectures (such as one similar to embodiment 100 in FIG. 1) may be integrated with a processing plant as well.

As described in other embodiments, an energy product 571 may be generated by way of conversion of wave energy into electrical power. In some embodiments, the energy product 571 may be a gas or other fluid, such as hydrogen gas. The energy product 571 may be stored in a first storage container 561. Embodiment 550 depicts the first storage container 561 for the energy product 571 being on the platform 560. Though other implementations may include the first storage container 561 being integrated into the upper hollow chamber 552, being external to the embodiment 550 (e.g., being attached or otherwise coupled to an external surface of the embodiment 550), or positioned in the approximate area of the embodiment 550 (e.g., on a second floating platform that is at least temporarily coupled to the embodiment 550).

In an embodiment, the energy product 571 in the first storage container 561 may be used as a precursor for a chemical reaction. In an additional embodiment, a second precursor 572 may be stored in a second storage container 562. In the instance of a chemical reaction to convert hydrogen gas into methanol, the second precursor 572 may comprise $CO_2$ or another carbon containing source. The second precursor 572 may also be generated as an energy product on the embodiment 550, or the second precursor 572 may be periodically replenished by a vessel, or the like. The energy product 571 may flow from the first storage container 561 into a reaction apparatus 563 through pipe 566, and the second precursor 572 may flow from the second storage container 562 into the reaction apparatus 563 through pipe 565. The reacted product 573 (e.g., a second energy product) may flow through pipe 567 into a third storage container 564. The reacted product 573 may be periodically removed from the third storage container 564 for transport to an alternative location (e.g., another storage location or use facility, either on the body of water 551 or on land). While a simple reaction process is shown in FIG. 23, it is to be appreciated that any suitable conversion, filtering, compression, reaction, treatment, or the like may be implemented on the embodiment 550.

Referring now to FIG. 24 a side view schematic of a vessel 630 that may be used to transport an energy product from a WEC (not shown) to land (not show) is shown. For example, vessel 630 may be similar to the second free-floating body 580 in FIG. 22. The vessel 630 may include a first storage container 631 for storing an energy product 641. The energy product 641 may be transported into the first storage container 631 from a WEC, or from another vessel (not shown) that obtained the energy product 641 from a WEC. For example, the energy product 641 may comprise hydrogen or any other energy product described in greater detail herein. The vessel 630 may also comprise a second storage container 632 for storing an additional precursor 342. In the case of hydrogen to methanol conversion, the additional precursor 642 may comprise carbon (e.g., $CO_2$). In an embodiment, the energy product 641 and the precursor 642 are flown into a reaction apparatus 633. The combined energy product 641 and precursor 642 may react in the reaction apparatus 633 to form a reacted product 643 that is transported to a third storage container 635. The reacted product 643 may be transported by the vessel 630 to an alternative storage or use facility (either on land or on the water 601). While a simple reaction process is shown in FIG. 24, it is to be appreciated that any suitable conversion, filtering, compression, reaction, treatment, or the like may be implemented on the vessel 630.

Referring now to FIG. 25 a diagram providing a more detailed explanation of a reaction process that may be used to convert a first energy product into a second energy product is shown, in accordance with an embodiment. The conversion depicted in FIG. 25 can be implemented on a WEC (e.g., similar to the embodiment 550 in FIG. 23), on a transport vessel (e.g., similar vessel 630 to FIG. 24), partially on the WEC and partially on the transport vessel, or partially on a first transport vessel and partially on a second transport vessel. In the embodiment shown in FIG. 25, a detailed process by which methanol ($CH_3OH$) is synthesized from, by, and/or through, $CO_2$ hydrogenation is shown. In an embodiment, $CO_2$ is stored in $CO_2$ tank 659 and $H_2$ is stored in $H_2$ tank 658. One or both of the $CO_2$ and the $H_2$ may be energy products generated by a WEC. The $CO_2$ and $H_2$ are pumped with pump 691 and pump 692 and combined in a mixer 661 with a recirculated stream from flash vessel 662. The mixed stream (of $CO_2$ and $H_2$ gases) is pumped to a catalytic reactor vessel 663 where an exothermic reaction takes place, and the temperature and pressure can reach 250° C. and 65 bar, respectively, or higher. The post-reaction stream exits the catalytic reactor vessel 663 and passes through heat exchanger 667 and then enters flash vessel 662 where the temperature and pressure will be approximately 30.0° C. and 64.5 bar, respectively.

A stream of $H_2$, CO and $CO_2$ from flash vessel 662 is recirculated back to mixer 661 by pump 669 after being purged of a small amount of gas to further purify the stream. The liquid stream from flash vessel 662 enters heat exchanger 667 which is then pumped to distillation tower 671 by pump 673. The crude $CH_3OH$ stream entering distillation tower 671 can be at a temperature and pressure of 85° C. and 1.3 bar, respectively. A final separation of $CH_3OH$ and water takes place within distillation tower 671. Gaseous $CH_3OH$ is pumped to methanol ballast sphere 655 via a compressor pump 678 where the $CH_3OH$ is cooled to liquefaction. Water extracted from the crude aqueous $CH_3OH$ is released from a bottom of the distillation tower 671. Other processes for synthesizing methanol from $CO_2$ and $H_2$ are known in the prior art and can be used in place of the one shown. Embodiments utilizing, incorporating, and/or including, such other methanol synthesis processes and/or associated mechanism and equipment are included within the scope of the present disclosure. Further, while methanol synthesis is provided as one example, conversion or reaction of any energy products using any suitable chemical reactions, processes, treatments, filtering, or the like may be used.

In the several of the previous embodiments, while energy products are defined as being physical items (e.g., fuels, chemicals, biological goods, etc.), embodiments are not limited to such configurations. For example, electrical power derived by a WEC described herein may be used to power one or more computational systems. These systems may be used in order to provide computational work that has a monetary or social value. For example, computational work can be used to host a data center, implement block-chain mining, training machine learning (ML) or artificial intelligence (AI) algorithms, or the like. An example of such a system is provided in FIG. 26

Figure 26:
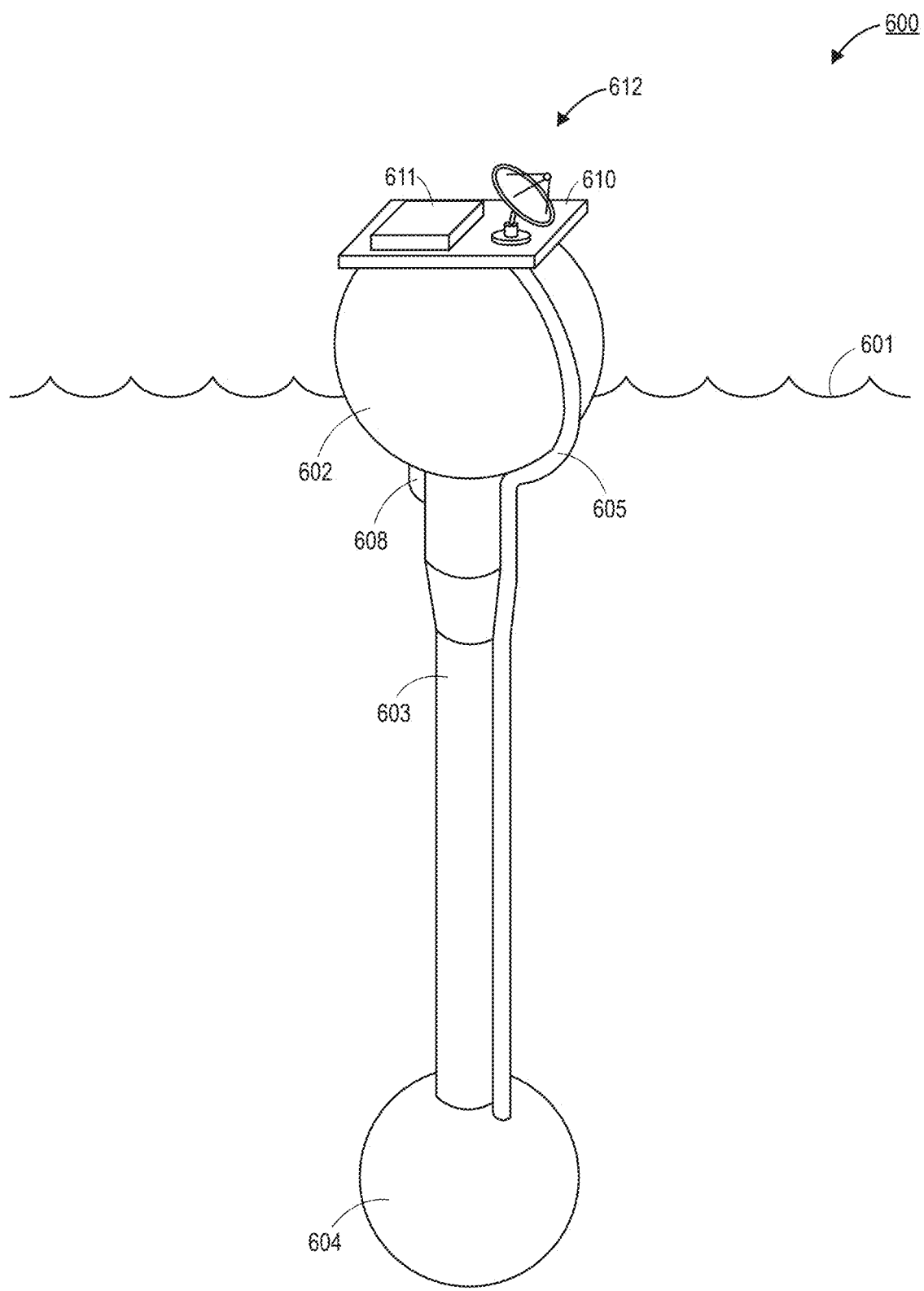
FIG. 26 is a side perspective view of an eleventh embodiment of the current disclosure.

Referring now to FIG. 26 a side perspective view of an embodiment 600 that includes a recirculating inertial hydrodynamic pump and an integrated computing system 611 on a platform 610 at the top of the embodiment 600 is shown, in accordance with an embodiment. The embodiment 600 floats adjacent to an upper surface 601 of a body of water over which waves tend to pass. The embodiment 600 comprises an upper hollow chamber 602. In an embodiment a central inertial tube (not visible) is coupled to the upper hollow chamber 602. A lower hollow chamber 604 may be provided at a bottom of central inertial tube. An annular return channel 603 may surround the central inertial tube. A turbine pipe 608 coupling the upper hollow chamber 602 to the annular return channel 603 may comprise a pressure regulator (such as a turbine or the like), which is not visible in FIG. 26. A gas effluent pipe 605 may fluidly couple the lower hollow chamber 604 to an upper effluent gas chamber (not visible in FIG. 26). The recirculating inertial hydrodynamic pump of embodiment 600 may be similar in configuration and operation to any of the embodiments described in greater detail herein. Further other inertial hydrodynamic pump architectures (such as one similar to embodiment 100 in FIG. 1) may be integrated with a computing system 611 as well. As described in other embodiments, an energy product may be generated by way of conversion of wave energy into electrical power. In some embodiments, the energy product may be a gas or other fluid, such as hydrogen gas. In some instances, the energy product may be stored in a chamber (not visible) internal to the embodiment 600 or external to the embodiment 600.

In an embodiment, a platform 610 may be provided over a top of the embodiment 600. A computing system 611 may be provided on the platform and include an enclosure to protect components from water and the elements. Any number of computational systems (e.g., processors, graphics processors, etc.), memories, and/or the like may be housed within the enclosure. The computing system 611 may be configured with a plurality of processing systems integrated with each other in order to perform complex computer processing operations. As noted above, the computing system 611 may be optimized and/or configured to implement one or more of data center hosting, implementing block-chain mining, training ML or AI algorithms, or the like. The outcome of the computational work (e.g., block-chain coins or tokens, trained algorithms, data center capacity, etc.) can be transmitted to external devices over a wireless network through one or more antennas 612, or other wireless systems. As noted above, the computing system may be powered by energy generated by the embodiment 600 through conversion of wave energy into electrical power, or through conversion of the energy product stored in a chamber back into electrical power (e.g., through the use of a hydrogen fuel cell or the like).

Figure 27:
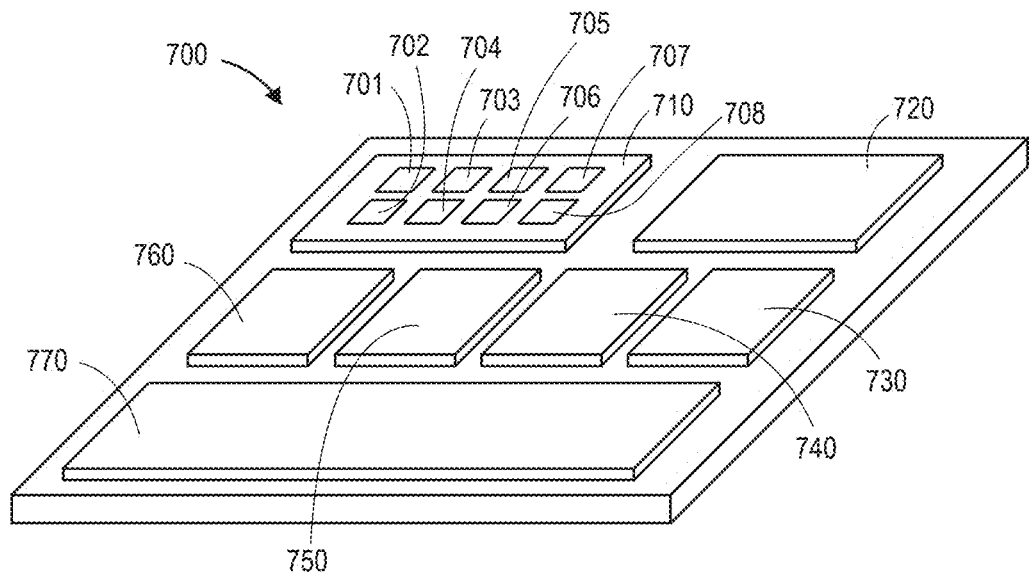
FIG. 27 is a perspective view of a computing system that may be integrated with any of the embodiments of the current disclosure.

Referring now to FIG. 27 a perspective view of an computing system 700 that may be integrated with a WEC, such as those described in greater detail herein, is shown, in accordance with an embodiment. The computing system 700 may comprise an array of electronics, hardware, and/or software that are configured to control one or more aspects of the wave-energy generation device. While the components illustrated in FIG. 27 are shown on a single board, it is to be appreciated that components may be on separate boards, structures, or the like. The computing system 700 may be housed within a water tight chamber or enclosure provided on the WEC.

Computing system 700 may comprise a computing device 710. The computing device 710 houses a board. The board may include a number of components, including but not limited to a processor 701. The processor 701 may include, but is not limited to, a central processing unit (CPU), a graphics processing unit (GPU), an application-specific integrated circuit (ASIC), a field programmable gate array (FPGA), and/or the like. The processor 701 is physically and electrically coupled to the board. Other components of computing device 710 include, but are not limited to, memory 703, such as volatile memory (e.g., DRAM), non-volatile memory (e.g., ROM), flash memory, a mass storage device (such as hard disk drive, compact disk (CD), digital versatile disk (DVD), and so forth). The computing device may comprise a communications chipset 704, a digital signal processor 705, a chipset 706, an antenna 707, and/or an input/out device 708.

Computing system 700 may comprise a communications device 720. The communications device 720 enables wireless communications for the transfer of data to and from the computing system 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communications device 820 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing system 700 may include a plurality of communications devices 720. For instance, a first communications device 720 may be dedicated to shorter range wireless communications such as Wi-Fi and Bluetooth and a second communications device 720 may be dedicated to longer range wireless communications such as GPS, EDGE, GPRS, CDMA, WiMAX, LTE, Ev-DO, and others. The communications device 720 may be communicatively coupled to one or more antennas, satellite dishes, or other device to broadcast and/or receive wireless communications. The antennas or the like may be external to the enclosure, or the antennas may be within the enclosure.

Computing system 700 may also comprise a server rack 730. The server rack 730 may comprise a plurality of processors with associated hardware and software. The server rack 730 may execute computational work in order to provide a revenue generating service. The server rack 730 may be powered through energy generated by the WEC, such as those described in greater detail herein. While a constant power supply may be desired, computing system 700 may still function with an intermittent or non-constant power supply provided by wave-energy generation. To deal with the variable power supply, server rack 730 may include controllers that adjust clock speed for the processors. This allows for power consumption to be directly controlled to coincide with available power. In some instances, the server rack 730 may perform data center operations or tasks. The server rack 730 may host and/or deliver content, or otherwise provide a link between consumers and centralized data storage. In some instances, the server rack 730 may perform services in conjunction with block-chain technologies, such as cryptocurrency mining. The server rack 730 may perform services such as ML or AI training as well.

Computing system 700 may include a positioning system 740. The positioning system 740 may include one or more modules, components, and/or apparatuses for determining a geolocation of the wave-energy generation device. In some instances, the positioning system 740 may comprise a GPS, a compass, an accelerometer, a gyroscope, and/or the like. The positioning system 740 may include a processor and/or controller to enable navigation for the wave-energy generation device. For example, actuators may be controlled in order to steer or direct the wave-energy generation device in a particular direction. Propulsion devices (e.g., propellers, water get flows, etc.) on the WEC may also be powered and/or directed by components of the positioning system 740.

Computing system 700 may include a sensor module 750. The sensor module 750 may include processors, memory, and associated hardware and software to control and/or record data from one or more sensors that monitor various aspects of the WEC. Sensors may comprise, but are not limited to, a pressure sensor, a gas composition sensor, a water level sensor, a temperature sensor, a fluid flow rate sensor, an electrical current sensor, a power sensor, a camera, an optical sensor, or the like. The physical sensors may be distributed throughout the WEC, and the controlling circuitry/software may be provided in the sensor module 750 within the embodiment 700.

Computing system 700 may include an interface module 750. The interface module 750 may comprise one or more components used to interface with the wave-energy generation device. The interface module 750 may include one or more input devices. For example, a keyboard, a mouse, a touchscreen display, or the like may be provided in the interface module 750. Output devices, such as a display screen, a speaker, or the like may also be provided in the interface module 750. The interface module 750 may further comprise a camera, a video camera, a biometric screening device, or the like.

Computing system 700 may include a battery module 770. The battery module 770 may include any type of battery. The battery may include a rechargeable battery, such as a lithium based battery (e.g., a lithium-ion battery). The battery of the battery module 770 may be charged by electricity generated by the WEC. The battery module 770 may be used as a store of power in order to power one or more electrical components of the embodiment 800, or any other powered device of the wave-energy generation device. The battery module 770 may be used in order to normalize power delivery to electrical components. For example, the battery module may supply power in order to equalize total power delivery when the wave-energy generation device provides variable power over time.

Referring now to FIG. 28 a perspective view of a server rack 730 that may be integrated into a WEC, such as those described in greater detail herein. As shown, the server rack 730 may include a plurality of server blades 735 that are provided on a rack 732. The server blades 735 may be communicatively coupled to each other through the rack 732 and/or associated cabling, in order to provide enhanced processing power. The server blades 735 may include processors, such as, but not limited to, central processing units (CPUs), graphics processing units (GPUs), application-specific integrated circuits (ASICs), field programmable gate arrays (FPGAs), and/or the like.

In some instances the server rack 730 is communicatively coupled to an antenna 737 to enable wireless communication. The antenna 737 may include a parabolic dish antenna or any other antenna configuration. The ability to wirelessly transmit data from the server rack 730 allows for data to be processed remotely at the source of power generation (e.g., in the ocean) while still being useful to the end consumer. The data delivery, hosting, computation, and the like can be executed at lower energy costs using such wave-energy generation devices. Further, the server rack 730 can be passively cooled by the body of water surrounding the wave-energy generation device (e.g., the server rack 730 can be in a water tight enclosure that is submersed in water). In some instances, the server rack 730 functions as a cryptocurrency mining rig that is powered through the energy produced by the WEC.

Figure 29:
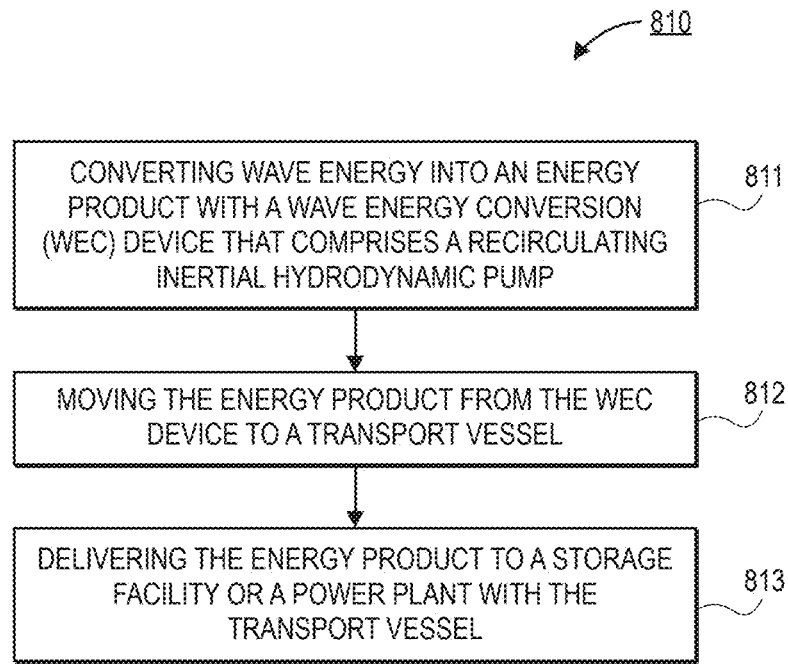
FIG. 29 is a process flow diagram depicting a process of a twelfth embodiment of the current disclosure.

FIG. 29 is a process flow diagram of a process 810 for generating an energy product with a WEC and transporting the energy product to an alternative location. In an embodiment, the process 810 may begin with operation 811, which comprises converting wave energy into an energy product with a WEC that comprises a recirculating inertial hydrodynamic pump. The WEC may be similar to any of the WECs described in greater detail herein. The energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the energy product may be made using any process described herein. For example, electrical power generated by the WEC can be used in order to produce the energy product.

In an embodiment, the process 810 may continue with operation 812, which comprises moving the energy product from the WEC to a transport vessel. The transport vessel may be similar to any vessel described herein. For example, the transport vessel may comprise a boat, a submersible, an aerial vehicle, or any other vessel that is capable of controlled motion on, through, and/or over the body of water on which the WEC floats. The energy product may be delivered or moved (actively or passively) to the transport vessel through any mechanism, such as a hose, a pipe, a cable, or the like.

In an embodiment, the process 810 may continue with operation 813, which comprises moving the energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the WEC and deliver it to the second vessel. The second vessel may then take the energy product towards shore.

Figure 30:
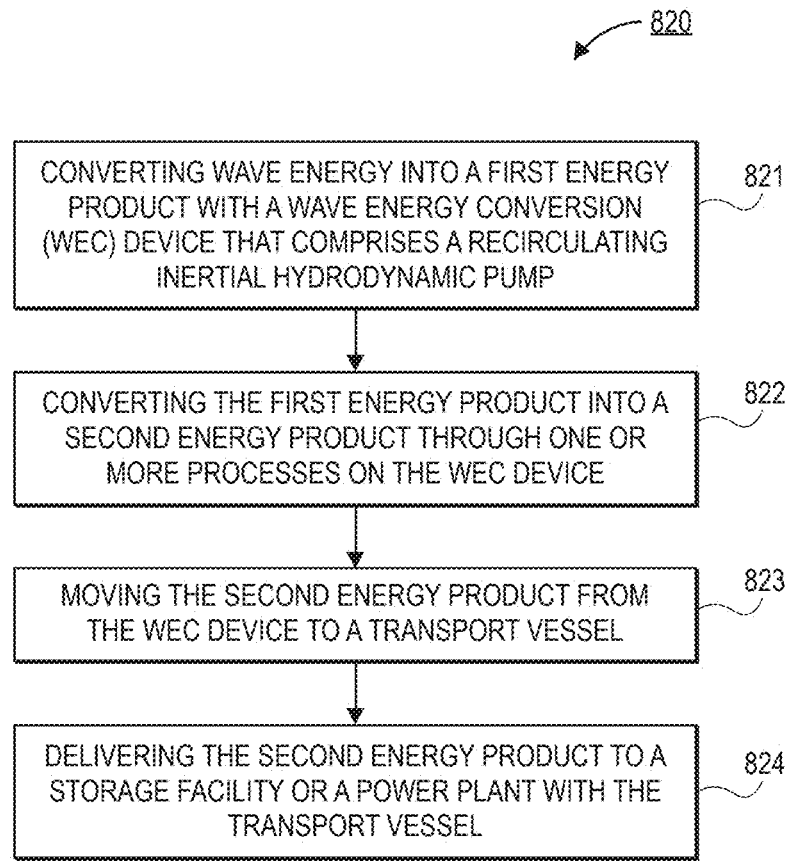
FIG. 30 is a process flow diagram depicting a process of a thirteenth embodiment of the current disclosure.

FIG. 30 is a process flow diagram of a process 820 for converting a first energy product into a second energy product and transporting the second energy product to a storage facility or power plant. In an embodiment, the process 820 may begin with operation 821, which comprises converting wave energy into a first energy product with a WEC that comprises a recirculating inertial hydrodynamic pump. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 820 may continue with operation 822, which comprises converting the first energy product into a second energy product through one or more processes on the WEC. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 25 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the WEC. For example, a processing plant may be provided on the WEC, similar to what is shown in FIG. 23.

In an embodiment, the process 820 may continue with operation 823, which comprises moving the second energy product from the WEC to a transport vessel. The transport vessel may be similar to any vessel described herein. For example, the transport vessel may comprise a boat, a submersible, an aerial vehicle, or any other vessel that is capable of controlled motion on, through, and/or over the body of water on which the WEC floats. The second energy product may be delivered or moved (actively or passively) to the transport vessel through any mechanism, such as a hose, a pipe, a cable, or the like.

In an embodiment, the process may continue with operation 824, which comprises delivering the second energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the second energy product from the WEC and deliver it to the second vessel. The second vessel may then take the second energy product towards shore.

Figure 31:
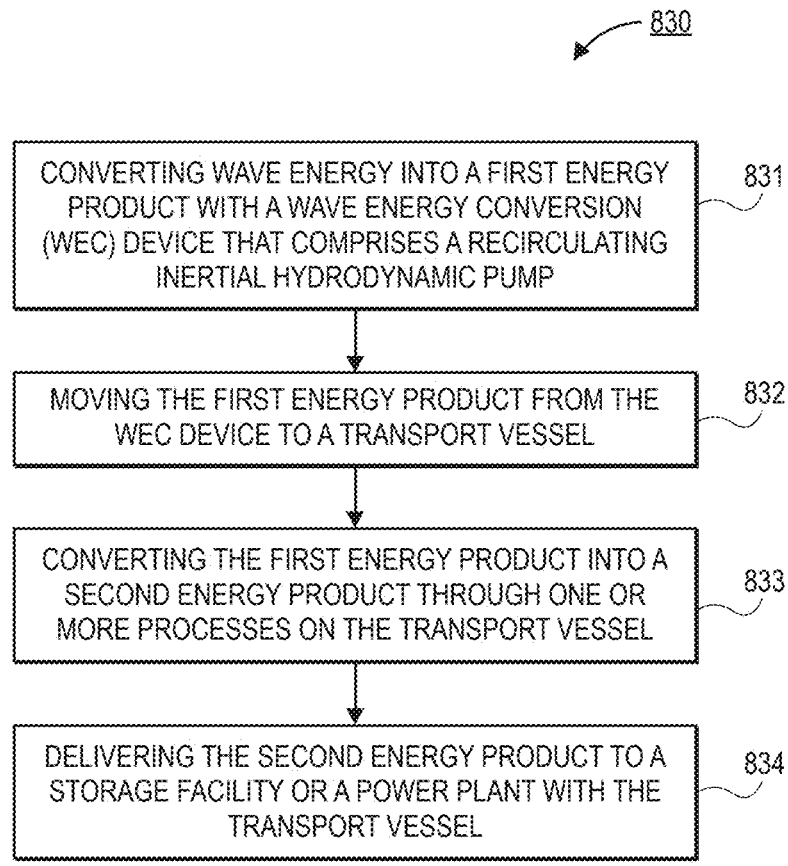
FIG. 31 is a process flow diagram depicting a process of a fourteenth embodiment of the current disclosure.

FIG. 31 is a process flow diagram of a process 830 for converting a first energy product into a second energy product and transporting the second energy product to storage facility or power plant. In an embodiment, the process 830 may begin with operation 831, which comprises converting wave energy into a first energy product with a WEC that comprises a recirculating inertial hydrodynamic pump. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 830 may continue with operation 832, which comprises moving the first energy product from the WEC to a transport vessel. The transport vessel may be similar to any vessel described herein. For example, the transport vessel may comprise a boat, a submersible, an aerial vehicle, or any other vessel that is capable of controlled motion on, through, or over the body of water on which the WEC floats. The first energy product may be delivered or moved (actively or passively) to the transport vessel through any mechanism, such as a hose, a pipe, a cable, or the like.

In an embodiment, the process 830 may continue with operation 833, which comprises converting the first energy product into a second energy product through one or more processes on the transport vessel. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 25 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the transport vessel. For example, a processing plant may be provided on the transport vessel, similar to what is shown in FIG. 24.

In an embodiment, the process 830 may continue with operation 834, which comprises delivering the second energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the WEC and deliver it to the second vessel. The second vessel may then take the energy product towards shore.

Figure 32:
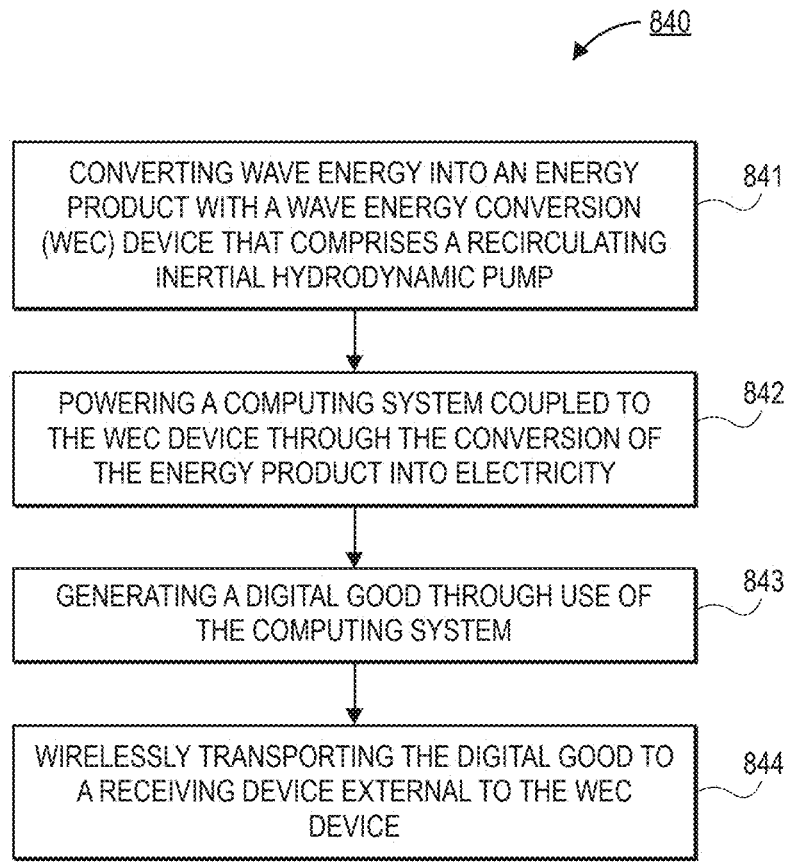
FIG. 32 is a process flow diagram depicting a process of a fifteenth embodiment of the current disclosure.

FIG. 32 is a process flow diagram of a process 840 for using a WEC to power a computing system (either directly or through use of an energy product) in order to generate digital goods. In an embodiment, the process 840 may begin with operation 841, which comprises converting wave energy into an energy product with a WEC that comprises a recirculating inertial hydrodynamic pump. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 840 may continue with operation 842, which comprises powering a computer system coupled to the WEC through the conversion of the energy product into electricity. For example, the energy product may be a fuel (e.g., hydrogen) that can be consumed to generate electricity. This may provide a more stable and consistent power supply than relying on the direct conversion of wave energy to electricity to power the computer system. Though, in some embodiments, the WEC may directly power the computer system without the need to generate an intervening energy product to store energy for future use.

In an embodiment, the process 840 may continue with operation 843, which may comprise generating a digital good through use of the computing system. In an embodiment, the digital good may include a block-chain based coin, a trained ML algorithm, a trained AI algorithm, a software product, a digital token, server capacity, or the like. The digital good may be stored on a non-transitory computer readable medium (e.g., a memory, a disk drive, a CD, a DVD, or other storage medium) in some embodiments.

In an embodiment, the process 840 may continue with operation 844, which comprises wirelessly transporting the digital good to a receiving device external to the WEC. The receiving device may be a second non-transitory computer readable medium provided at a location remote from the WEC. For example, the receiving device may be located on land or near land (e.g., up to 100 kilometers from land, up to 40 kilometers from land, up to 1 kilometer from land, up to 500 meters from land, or up to 50 meters from land). In an embodiment, the wireless transfer of the digital good may be transmitted through an antenna or other device for connecting to a wireless network. While wireless transport of the digital good may be faster, physical transport of the digital good stored on a non-transitory computer readable medium may also be provided by way of a vessel, a wired connection, or the like.

While the foregoing disclosure has described various embodiments, it is understood that the invention is not limited to any specific embodiment or depiction herein. A person of ordinary skill in the art would readily appreciate modifications and substitutions herein, and the scope of the invention includes all such modifications and substitutions. Accordingly, the scope of the invention should not be construed to be limiting by the foreign description except where expressly so stated, but rather the invention's scope is properly determined by the appended claims, using the common and ordinary meanings of the words therein consistent with, but not limited by, the descriptions and figures of this disclosure.

EXAMPLES

Example 1: a buoyant wave energy converter, comprising: an upper chamber having a first fluid reservoir and a first gas pocket; a lower chamber having a second fluid reservoir and a second gas pocket; an injection tube between and fluidly coupled to the upper chamber and the lower chamber, the injection tube to impel a fluid from the second fluid reservoir into the first fluid reservoir when the upper chamber, the lower chamber and the injection tube oscillate about a waterline with the upper chamber adjacent to the waterline and the lower chamber submerged below the waterline and vertically beneath the upper chamber; and an effluent tube fluidly coupled to the upper chamber and the injection tube, the effluent tube to return the fluid from the first fluid reservoir to the injection tube.

Example 2: the buoyant wave energy converter of Example 1, further comprising: a pressure-regulator in the effluent tube between the first fluid reservoir and the injection tube.

Example 3: the buoyant wave energy converter of Example 2, wherein the pressure-regulator comprises a fluid or hydrokinetic turbine.

Example 4: the buoyant wave energy converter of Example 2 or Example 3, wherein the pressure-regulator comprises a filter.

Example 5: the buoyant wave energy converter of Examples 1-4, further comprising: a gas chamber on the upper chamber, the gas chamber fluidly coupled to the lower chamber by a gas tube.

Example 6: the buoyant wave energy converter of Example 5, further comprising: an effluent gas regulation valve in the gas tube, the effluent gas regulation valve to control a flow of gas between the second gas pocket and the gas chamber.

Example 7: the buoyant wave energy converter of Examples 1-6, wherein the injection tube has a frustoconical constriction portion.

Example 8: the buoyant wave energy converter of Examples 1-7, wherein the injection tube is a cylindrical tube.

Example 9: the buoyant wave energy converter of Examples 1-8, wherein the effluent tube comprises an annular portion co-axial with the injection tube.

Example 10: the buoyant wave energy converter of Example 9, wherein the annular portion of the effluent tube is fluidly coupled to the injection tube through one or more openings in the injection tube.

Example 11: the buoyant wave energy converter of Examples 1-10, further comprising: one or more additional effluent tubes coupled to the upper chamber and the lower chamber to return the fluid from the first fluid reservoir to the injection tube.

Example 12: the buoyant wave energy converter of Examples 1-11, wherein a bottom of the effluent tube is coupled to the injection tube between the upper chamber and the lower chamber.

Example 13: the buoyant wave energy converter of Examples 1-12, further comprising: a ballast coupled to the wave energy convert at or below a vertical midpoint of the buoyant wave energy converter.

Example 14: the buoyant wave energy converter of Example 13, wherein the bottom of the effluent tube is coupled to the injection tube at an approximate midpoint of the injection tube between the upper chamber and the lower chamber.

Example 15: a method of converting wave energy, the method comprising: placing a buoyant wave energy converter in a body of water, the buoyant wave energy converter comprising an upper chamber having a first fluid reservoir and a first gas pocket, a lower chamber having a second fluid reservoir and a second gas pocket, an injection tube between and fluidly coupled to the upper chamber and the lower chamber, the injection tube to impel a fluid from the second fluid reservoir into the first fluid reservoir when the upper chamber, the lower chamber and the injection tube oscillate about a waterline with the upper chamber adjacent to the waterline and the lower chamber submerged below the waterline and vertically beneath the upper chamber, and an effluent tube fluidly coupled to the upper chamber and the injection tube, the effluent tube to return the fluid from the first fluid reservoir to the injection tube; capturing energy from waves of the body of water with the buoyant wave energy converter; and using the captured energy to generate a chemical.

Example 16: the method of Example 15, wherein capturing energy from the waves of the body of water with the buoyant wave energy converter comprises impelling the fluid from the second fluid reservoir into the first fluid reservoir to create a pressure differential between the upper chamber and the lower chamber.

Example 17: the method of Example 16, wherein capturing energy from the waves of the body of water with the buoyant wave energy converter comprises impelling the fluid from the first fluid reservoir through a turbine.

Example 18: the method of Example 17, wherein the turbine is a fluid or hydrokinetic turbine.

Example 19: the method of Examples 15-18, wherein the chemical is hydrogen gas.

Example 20: the method of Examples 15-18, wherein the chemical is methanol.

Example 21: the method of Examples 15-18, wherein the chemical is HCl.

Example 22: the method of Examples 15-21, wherein buoyant wave energy converter further comprises a gas chamber on the upper chamber, the gas chamber fluidly coupled to the lower chamber by a gas tube.

Example 23: a buoyant wave energy apparatus that floats adjacent to an upper surface of a body of water over which waves pass, the apparatus comprising: upper and lower chambers and an inertial tube connecting the upper and lower chambers, an upper inertial tube mouth positioned within the upper chamber, a lower inertial tube mouth positioned within the lower chamber, wherein the upper and lower chambers each enclose a liquid reservoir, wherein the lower inertial tube mouth is to be submerged below a free surface of the liquid reservoir of the lower chamber, wherein a pressurized gas pocket is at least partially enclosed within the lower chamber and has sufficient pressure to elevate liquid in the inertial tube to a height that lies between the height of the free surface of the liquid reservoir of the lower chamber and the height of a free surface of the liquid reservoir of the upper chamber in the absence of wave-induced oscillations, wherein wave-driven oscillations of the body of water result in periodic ejections of liquid from the upper inertial tube mouth, and the ejected liquid collects in the liquid reservoir of the upper chamber, wherein liquid of the liquid reservoir of the upper chamber flows to and through a turbine as it returns to the inertial tube between the upper and lower chambers via a return conduit, the return conduit comprising at least one liquid effluent pipe, and wherein liquid that has returned to the inertial tube via the return conduit recirculates into, and up through, the inertial tube in response to the wave-driven oscillations of the body of water.

What is claimed is:

1. A buoyant wave energy converter, comprising:
   an upper chamber adapted to confine a first fluid reservoir and a gas pocket;
   an injection tube fluidly coupled to the upper chamber, wherein the injection tube is adapted to impel a fluid into the first fluid reservoir when the buoyant wave energy converter oscillates about a waterline with the upper chamber adjacent to the waterline;
   an annular working-fluid return channel around the injection tube, wherein an upper end of the annular working-fluid return channel is fluidly coupled to the upper chamber and adapted to exchange gas with the gas pocket;
   a working-fluid turbine pipe adapted to fluidly couple the upper chamber to the annular working-fluid return channel;
   a turbine in the working-fluid turbine pipe, wherein the turbine is adapted to generate electricity from a flow of the fluid through the working-fluid turbine pipe; and
   a working-fluid return opening that fluidly couples the annular working-fluid return channel to the injection tube, and wherein the working-fluid return opening is adapted to recycle the fluid from the annular working-fluid return channel to the injection tube.

2. The buoyant wave energy converter of claim 1, further comprising:
   a plurality of working-fluid return openings that fluidly couple the annular working-fluid return channel to the injection tube.

3. The buoyant wave energy converter of claim 1, wherein the working-fluid return opening is below a midpoint between an upper end and a lower end of the annular working-fluid return channel.

4. The buoyant wave energy converter of claim 1, wherein the turbine comprises a fluid turbine or hydrokinetic turbine.

5. The buoyant wave energy converter of claim 1, wherein the injection tube has a frustoconical constriction portion.

6. The buoyant wave energy converter of claim 1, wherein the injection tube is a cylindrical tube.

7. The buoyant wave energy converter of claim 1, further comprising:
   a plurality working-fluid turbine pipes adapted to fluidly couple the upper chamber to the annular working-fluid return channel.

8. The buoyant wave energy converter of claim 1, wherein a bottom of the working-fluid turbine pipe is coupled to the annular working-fluid return channel at an approximate midpoint of the annular working-fluid return channel.

9. The buoyant wave energy converter of claim 1, wherein the fluid comprises fresh water or seawater.

10. The buoyant wave energy converter of claim 1, further comprising:
a computing system within an enclosure on the buoyant wave energy converter.

11. The buoyant wave energy converter of claim 10, wherein the computing system is configured with a plurality of processing systems integrated with each other in order to perform complex computer processing operations.

12. The buoyant wave energy converter of claim 10, wherein the computing system is configured to implement one or more of data center hosting, implementing block chain mining, training machine learning (ML) algorithms, or training artificial intelligence (AI) algorithms.

13. The buoyant wave energy converter of claim 10, wherein the computing system is adapted to be powered by the electricity generated by the turbine.

14. A method of converting wave energy, the method comprising:
capturing energy from waves of a body of water with a buoyant wave energy converter, the buoyant wave energy converter comprising an upper chamber adapted to confine a first fluid reservoir and a gas pocket, an injection tube fluidly coupled to the upper chamber, wherein the injection tube is adapted to impel a fluid into the first fluid reservoir when the buoyant wave energy converter oscillates about a waterline with the upper chamber adjacent to the waterline, an annular working-fluid return channel around the injection tube, wherein an upper end of the annular working-fluid return channel is fluidly coupled to the upper chamber and adapted to exchange gas with the gas pocket, a working-fluid turbine pipe adapted to fluidly couple the upper chamber to the annular working-fluid return channel, and a turbine in the working-fluid turbine pipe, wherein the turbine is adapted to generate electricity from a flow of the fluid through the working-fluid turbine pipe, and a working-fluid return opening that fluidly couples the annular working-fluid return channel to the injection tube, and wherein the working-fluid return opening is adapted to recycle the fluid from the annular working-fluid return channel to the injection tube; and
using the captured energy to power a computing system coupled to the buoyant wave energy converter.

15. The method of claim 14, wherein using the captured energy to power the computing system comprises producing a digital good.

16. The method of claim 14, wherein using the captured energy to power the computing system comprises executing a computational algorithm.

17. The method of claim 16, wherein executing the computational algorithm produces a proof-of-work mechanism for a cryptocurrency.

18. The method of claim 16, wherein executing the computational algorithm produces a trained machine learning algorithm.

19. The method of claim 14, wherein the computing system is in an enclosure on the buoyant wave energy converter.

20. The method of claim 14, wherein the computing system is configured with a plurality of processing systems integrated with each other in order to perform complex computer processing operations.

21. The method of claim 14, wherein the computing system is configured to implement one or more of data center hosting, implementing block chain mining, training machine learning (ML) algorithms, or training artificial intelligence (AI) algorithms.

22. The method of claim 14, wherein the turbine comprises a fluid or hydrokinetic turbine.

23. The method of claim 14, wherein the electricity is stored as the captured energy in a battery.

24. The method of claim 14, wherein the electricity is directly used as the captured energy to power the computing system.

25. A method of converting wave energy, the method comprising:
capturing energy from waves of a body of water with a buoyant wave energy converter, the buoyant wave energy converter comprising an upper chamber adapted to confine a first fluid reservoir and a gas pocket, an injection tube fluidly coupled to the upper chamber, wherein the injection tube is adapted to impel a fluid into the first fluid reservoir when the buoyant wave energy converter oscillates about a waterline with the upper chamber adjacent to the waterline, an annular working-fluid return channel around the injection tube, wherein an upper end of the annular working-fluid return channel is fluidly coupled to the upper chamber and adapted to exchange gas with the gas pocket, a working-fluid turbine pipe adapted to fluidly couple the upper chamber to the annular working-fluid return channel, and a turbine in the working-fluid turbine pipe, wherein the turbine is adapted to generate electricity from a flow of the fluid through the working-fluid turbine pipe, and a working-fluid return opening that fluidly couples the annular working-fluid return channel to the injection tube, and wherein the working-fluid return opening is adapted to recycle the fluid from the annular working-fluid return channel to the injection tube; and
using the captured energy to generate a chemical.

26. The method of claim 25, wherein the chemical is hydrogen gas.

27. The method of claim 25, wherein the chemical is methanol.

28. The method of claim 25, wherein the chemical is HCl.

29. The method of claim 25, wherein the electricity is stored as the captured energy in a battery.

30. The method of claim 25, wherein the electricity is directly used as the captured energy to generate the chemical.

* * * * *